United States Patent

Kitaguchi et al.

[11] Patent Number: 6,038,074
[45] Date of Patent: Mar. 14, 2000

[54] THREE-DIMENSIONAL MEASURING APPARATUS AND METHOD, IMAGE PICKUP APPARATUS, AND APPARATUS AND METHOD FOR INPUTTING IMAGE

[75] Inventors: Takashi Kitaguchi; Norihiko Murata, both of Kanagawa, Japan

[73] Assignee: Ricoh Company, Ltd., Tokyo, Japan

[21] Appl. No.: 09/081,020

[22] Filed: May 19, 1998

[30] Foreign Application Priority Data

May 20, 1997 [JP] Japan ................................. 9-144498
Aug. 20, 1997 [JP] Japan ................................. 9-237854
Oct. 20, 1997 [JP] Japan ................................. 9-303371

[51] Int. Cl.[7] ............................ G02B 27/10; G01C 11/12
[52] U.S. Cl. ............................. 359/618; 356/2; 356/147; 356/376; 128/916; 128/661.09
[58] Field of Search ......................... 359/618; 356/2, 356/139, 140, 147, 149, 376, 379; 128/916, 661.09

[56] References Cited

U.S. PATENT DOCUMENTS

| | | |
|---|---|---|
| 5,216,476 | 6/1993 | Lanckton ................................. 356/2 |
| 5,622,174 | 4/1997 | Yamazaki ......................... 128/661.09 |
| 5,675,407 | 10/1997 | Geng ..................................... 356/147 |
| 5,805,289 | 9/1998 | Corby, Jr. et al ...................... 356/376 |
| 5,831,735 | 11/1998 | Corby, Jr. ............................. 356/376 |
| 5,871,019 | 2/1999 | Belohlavek ............................ 128/916 |

FOREIGN PATENT DOCUMENTS

| | | |
|---|---|---|
| 5-196437 | 8/1993 | Japan . |
| 6-129833 | 5/1994 | Japan . |
| 6-141228 | 5/1994 | Japan . |
| 7-181024 | 7/1995 | Japan . |
| 7-244735 | 9/1995 | Japan . |
| 9-90530 | 4/1997 | Japan . |

*Primary Examiner*—Loha Ben
*Attorney, Agent, or Firm*—Oblon, Spivak, McClelland, Maier & Neustadt, P.C.

[57] ABSTRACT

Images of an object viewed from a plurality of points of view is input through an image inputting unit. Change of orientation of the image inputting means, occurring when the images of the object are input, is detected. Change of position of point of view, occurring when the images of the object are input, is detected. Characteristic points are extracted from the image which is input previously, each of the characteristic points corresponding to a respective one of objects points on the object. Corresponding points are extracted from the image which is input currently, each of the corresponding points corresponding to a respective one of the characteristic points. The three-dimensional position of each of the object points is calculated, based on the change of orientation and the change of position of point of view of the image inputting unit and the data of the characteristic points and the corresponding points.

54 Claims, 20 Drawing Sheets

101 IMAGE PICKUP PORTION

THREE-DIMENSIONAL MEASURING APPARATUS AND METHOD, IMAGE PICKUP APPARATUS, AND APPARATUS AND METHOD FOR INPUTTING IMAGE

BACKGROUND OF THE INVENTION

1. Field of the Invention

The present invention relates to a three-dimensional-position measuring method and a three-dimensional-position measuring apparatus.

The present invention also relates to a three-dimensional shape measuring method and a three-dimentional-shape measuring apparatus for measuring the position of an object and a three-dimensional-shape of the object using visual information of the three-dimensional object.

The present invention also relates to an image pickup (or picture taking) apparatus and a method for synthesizing respective picked-up images (or taken pictures) into one image (or picture), the respective picked-up images (or taken pictures) having been picked up (or taken) in a manner in which a portion of each image corresponds to a portion of another image, these images (or pictures) being images (pictures) present on an object plane to be input. Such an apparatus and a method enable picking up an image (or taking a picture) in a case where the object plane, an image (or picture) of which is to be input, is large or in a case where an object having the object plane, an image (or picture) of which is to be input, cannot be moved.

2. Descriptions of the Related Art

In various fields such as surveying, production of a CAD model and so forth, measurement of a three-dimensional shape of an object has been demanded. As a method for measuring a three-dimensional shape, there is an active method in which a reference pattern or the like is projected on an object, and an image of distortion of the pattern is picked up. However, according to such a method, the object may be affected by projection of the reference pattern, and the effect of the reference pattern varies in accordance with the environment. Because such demerits exist, application of such a method is significantly limited. A passive method, by which an object is not affected, for measuring the shape of an object has been also used. Such a method for measuring a three-dimensional shape is a method in which, basically, corresponding points are extracted from images which have been picked up from two different points of view. Then, the three-dimensional position of the corresponding points is calculated in accordance with the principle of triangulation. In this method, two image pickup apparatuses are fixed and the images of an object are obtained from two different points of view. In another method, one image pickup apparatus is moved on rails a predetermined distance and images of an object are obtained from two different points of view. In these two methods, the relationship of the positions of the two different points of view and the change of the orientation of the image pickup apparatus(es) are treated as already-known information. Instead, there is another method in which an image pickup apparatus is moved in a condition where the apparatus is held by hands of a person, and the relationship of the positions of two different points of view and the change of the orientation of the image pickup apparatus(es) are treated as not-already-known information.

In methods such as those described above in which the relationship of the positions of two different points of view and the change of the orientation of image pickup apparatus(es) are treated as already-known information, a measuring apparatus therefor should be a large-scale apparatus. Therefore, application of such a method is limited. In the method in which the relationship of the positions of two different points of view and the change of the orientation of image pickup apparatus(es) are treated as not-already-known information, the method can be applied to various uses because an object is not affected by such a method and a measuring apparatus therefor can be a small-scale apparatus. As disclosed in, for example, Japanese Laid-Open Patent Application Nos.5-196437, 6-129833, 7-181024, 7-244735 and so forth, various measuring methods and measuring apparatuses have been developed.

In the method disclosed in Japanese Laid-Open Patent Application No.5-196437, an image of a measurement point on an object is picked up by a camera in orthogonal projection, the orientation of the camera at the current time is obtained from a three-axis gyro fixed to the camera, and the thus-obtained information is supplied to a three-dimensional-information measuring apparatus. Thus, the three-dimensional information of the object is measured. In the method disclosed in Japanese Laid-Open Patent Application No.6-129833, using moving image information of an object, images of which have been picked up by a monocular camera, the motion of the camera is obtained, and the three-dimensional shape of the object is calculated. In the method disclosed in Japanese Laid-Open Patent Application No.7-181024, an optical flow, which indicates movement between images, is obtained from a plurality of images of an object, picked up by image pickup means in a manner in which the points of view of the image pickup means are different. Then, based on the optical flow, distance information is calculated. Further, in this method, the distance information is directly calculated by using a formula for a relationship between the time difference and the space gradient of the images and by using the movement information of the image pickup means itself. Then, these ways for obtaining the distance information are combined, and the three-dimensional shape is measured. The apparatus disclosed in the Japanese Laid-Open Patent Application 7-244735 obtains three-dimensional information as a result of temporally combining distance information obtained by using moving image information and movement of a camera.

However, in the case where an integral value of output from an acceleration sensor or a gyro is used for obtaining position change or orientation change as disclosed in Japanese Laid-Open Patent Application Nos.5-196437 and 7-181024, because of use of the integral value, reliability of the information of the thus-obtained position change or orientation change is low. In the case where only image information is used as disclosed in Japanese Laid-Open Patent Application No.6-129833, it is difficult to extract precise corresponding points. In the case where, as disclosed in Japanese Laid-Open Patent Application No.7-244735, the movement speed of the image pickup apparatus is sensed, and the thus-obtained information is used in order to improve the measurement accuracy, the orientation change of the image pickup apparatus is not sensed. Because information concerning the orientation change is important for extracting corresponding points and shape measurement, significant improvement of the measurement accuracy cannot be expected.

An apparatus for inputting and restoring characters or a photograph present on a plane simply and with high accuracy is demanded. When an image of an ordinary size such as an image drawn on a paper sheet of A4 size, A3 size or the like is input, inputting the image with high accuracy can be performed by a copying machine, a scanner or the like.

However, a copying machine, a scanner and so forth cannot be used for inputting, with high accuracy, a larger image, an image drawn on a medium which cannot be moved or the like, such as information drawn on a larger paper sheet, information drawn on a wall, information drawn on a panel or the like. As apparatuses and a method for inputting a larger image, an image drawn on a medium which cannot be moved, or the like, using an electronic camera, an electronic camera disclosed in Japanese Laid-Open Patent Application No.6-141228 and a panorama image synthesizing apparatus and a method for producing a panorama image disclosed in Japanese Laid-Open Patent Application No.9-90530 have been developed.

The electronic camera disclosed in Japanese Laid-Open Patent Application No.6-141228 forms the image of an object on an image pickup element via an image pickup lens and a mirror, picks up an image of the object intermittently several times in a manner in which a portion of a previously picked-up image is the same as a portion of a currently picked-up image. The electronic camera moves in a manner in which the currently picked-up image is appropriately connected with the previously picked-up image. In the panorama image synthesizing apparatus and the method for producing a panorama image disclosed in Japanese Laid-Open Patent Application No.9-90530, parameters for synthesizing images are calculated, and the images are synthesized based on the calculated parameters. Thereby, it is attempted to obtain a synthesized image with high accuracy using separate images picked up by the electronic camera.

However, in the electronic camera disclosed in Japanese Laid-Open Patent Application No.6-141228, the mirror and a mechanism for driving the mirror are needed. Thereby, the scale of an apparatus therefor is large. Accordingly, it is difficult to install the apparatus in an electronic camera of an ordinary size.

Further, when an image on a paper sheet or a panel is picked up, the distance between a camera and an object is short. Therefore, in the panorama image synthesizing apparatus and the method for producing a panorama image disclosed in Japanese Laid-Open Patent Application No.9-90530, due to influence of perspective projection due to translation operation of the camera, distortion of the synthesized image occurs. Further, an image rotates because a person holds the electronic camera, and the image rotation causes distortion of the synthesized image.

SUMMARY OF THE INVENTION

An object of the present invention is to provide a three-dimensional-shape measuring method and a three-dimensional-shape measuring apparatus by which the above-described demerits can be eliminated and a three-dimensional shape and motion of pickup means can be measured with high accuracy using a simple arrangement.

Another object of the present invention is to solve the above-described demerits and to achieve simple and high-accuracy picking up of an image and synthesizing of picked-up images by reducing distortion occurring when separate images are synthesized.

A first three-dimensional-shape measuring method, according to the present invention, comprises the steps of:
a) inputting images of an object to be measured viewed from different first and second points of view through image inputting means;
b) extracting a plurality of characteristic points from the input image of the object viewed from the first point of view;
c) extracting corresponding points from the input image of the object viewed from the second point of view, the corresponding points corresponding to the characteristic points, respectively;
d) inputting the gravity direction with respect to the orientation of the image inputting means for each point of view from which the image inputting means views the object so as to input the image of the object;
e) inputting the rotation angle about the gravity direction of the image inputting means for each point of view from which the image inputting means views the object so as to input the image of the object;
f) detecting the orientation of the image inputting means, for each point of view from which the image inputting means views the object, so as to input the image of the object, using the gravity direction and the rotation angle about the gravity direction;
g) calculating vectors of lines of sight for the first and second points of view, respectively, the vectors of lines of sight passing through the characteristic points and corresponding points, respectively, using the data of the characteristic points and corresponding points, and the orientations of the image inputting means;
h) calculating a translational-motion direction vector extending from the first point of view to the second point of view, using the vectors of lines of sight; and
i) calculating the three-dimensional positions of object points on the object, using the translational-motion direction vector and the vectors of lines of sight, so as to obtain the three-dimensional shape of the object.

A second three-dimensional-shape measuring method, according to the present invention, comprises the steps of:
a) inputting images of an object to be measured viewed from different first and second points of view through image inputting means;
b) extracting a plurality of characteristic points from the input image viewed from the first point of view;
c) extracting corresponding points from the input image viewed from the second point of view, the corresponding points corresponding to the characteristic points, respectively;
d) inputting the gravity direction with respect to the orientation of the image inputting means for each point of view from which the image inputting means views the object so as to input the image of the object;
e) inputting the rotation angle about the gravity direction of the image inputting means for each point of view from which the image inputting means views the object so as to input the image of the object;
f) detecting the orientation of the image inputting means, for each point of view from which the image inputting means views the object, so as to input the image of the object, using the gravity direction and the rotation angle about the gravity direction;
g) calculating vectors of lines of sight for the first and second points of view, respectively, the vectors of lines of sight passing through the characteristic points and corresponding points, respectively, using the data of the characteristic points and corresponding points, and the orientations of the image inputting means;
h) calculating a translational-motion direction vector extending from the first point of view to the second point of view, using the vectors of lines of sight;
i) repeating correction of the positions of the corresponding points using the translational-motion direction vector, calculation of the vectors of lines of sight using the corrected positions of the corresponding points and calculation of the translational-motion direction vector using the calculated vectors of lines of sight, until the amount of change of the positions of the corresponding points when the positions of the corresponding points are corrected becomes less than a fixed value or the number of the repetitions reaches a fixed value; and j) calculating the three-dimensional positions of object points on the object, using the translational-motion direction vector and the vectors of lines of sight, finally obtained in the step i), so as to obtain the three-dimensional shape of the object.

A third three-dimensional-shape measuring method, according to the present invention, comprises the steps of:

a) inputting images of an object to be measured viewed from different first and second points of view through image inputting means;

b) extracting a plurality of characteristic points from the input image viewed from the first point of view;

c) extracting a plurality of candidates of each corresponding point from the input image viewed from the second point of view, each corresponding point corresponding to a respective one of the characteristic points;

d) inputting the gravity direction with respect to the orientation of the image inputting means for each point of view from which the image inputting means views the object so as to input the image of the object;

e) inputting the rotation angle about the gravity direction of the image inputting means for each point of view from which the image inputting means views the object so as to input the image of the object;

f) detecting the orientation of the image inputting means, for each point of view from which the image inputting means views the object, so as to input the image of the object, using the gravity direction and the rotation angle about the gravity direction;

g) calculating vectors of lines of sight for the first and second points of view, respectively, the vectors of lines of sight passing through the characteristic points and corresponding points, respectively, using the data of the characteristic points and corresponding points, and the orientations of the image inputting means;

h) calculating a translational-motion direction vector extending from the first point of view to the second point of view, using the vectors of lines of sight;

i) repeating correction of the position of each corresponding point among the candidates using the translational-motion direction vector, calculation of the orientation of the image inputting means for the second point of view using the corrected corresponding points, calculation of the vectors of lines of sight for the second point of view using the thus-calculated orientation of the image inputting means and calculation of the translational-motion direction vector using the thus-calculated vectors of lines of sight for the second point of view and the vectors of lines of sight for the first point of view, until the amount of change of the positions of the corresponding points when the positions of the corresponding points are corrected becomes less than a fixed value or the number of the repetitions reaches a fixed value; and j) calculating the three-dimensional positions of object points on the object, using the translational-motion direction vector and the vectors of lines of sight finally obtained in the step i), so as to obtain the three-dimensional shape of the object to be measured.

A fourth three-dimensional-shape measuring method, according to the present invention, comprises the steps of:

a) inputting images of an object to be measured viewed from different first and second points of view through image inputting means;

b) extracting a plurality of characteristic points from the input image viewed from the first point of view;

c) extracting corresponding points from the input image viewed from the second point of view, the corresponding points corresponding to the characteristic points, respectively;

d) inputting the gravity direction with respect to the orientation of the image inputting means for each point of view from which the image inputting means views the object so as to input the image of the object;

e) inputting the rotation angle about the gravity direction of the image inputting means for each point of view from which the image inputting means views the object so as to input the image of the object;

f) detecting the orientation of the image inputting means, for each point of view from which the image inputting means views the object, so as to input the image of the object, using the gravity direction and the rotation angle about the gravity direction;

g) calculating vectors of lines of sight for the first and second points of view, respectively, the vectors of lines of sight passing through the characteristic points and corresponding points, respectively, using the data of the characteristic points and corresponding points, and the orientations of the image inputting means;

h) calculating a translational-motion direction vector extending from the first point of view to the second point of view, using the vectors of lines of sight;

i) repeating detection of erroneous correspondences between characteristic points and corresponding points, respectively, using the translational-motion direction vector, removal of the characteristic points and the corresponding points, the correspondences therebetween having been determined to be erroneous, respectively, and calculation of the translational-motion direction vector using the remaining characteristic points and corresponding points, until it is determined that the translational-motion direction vector has converged; and j) calculating the three-dimensional positions of object points on the object, using the translational-motion direction vector and the vectors of lines of sight, finally obtained in the step i), so as to obtain the three-dimensional shape of the object to be measured.

A first three-dimensional-shape measuring apparatus, according to the present invention comprises:

image inputting means for inputting images of an object to be measured viewed from different first and second points of view;

correspondence relationship extracting means for extracting a plurality of characteristic points from the input image viewed from the first point of view, the correspondence relationship extracting means also extracting corresponding points from the input image viewed from the second point of view, the corresponding points corresponding to the characteristic points, respectively;

gravity-direction detecting means for detecting the gravity direction with respect to the orientation of the image inputting means for each point of view from which the image inputting means views the object so as to input the image of the object;

means for detecting the rotation angle about the gravity direction of the image inputting means for each point of views from which the image inputting means views the object so as to input the image of the object;

orientation calculating means for calculating the orientation of the image inputting means, for each point of view from which the image inputting means views the object, so as to input the image of the object, using the gravity direction and the rotation angle about the gravity direction;

means for calculating vectors of lines of sight for the first and second points of view, respectively, the vectors of lines of sight passing through the characteristic points and corresponding points, respectively, using the data of the characteristic points and corresponding points, and the orientations of the image inputting means;

translational-motion calculating means for calculating a translational-motion direction vector extending from the first point of view to the second point of view, using the vectors of lines of sight; and three-dimensional-position calculating means for calculating the three-dimensional positions of object points on the object, using the translational-motion direction vector and the vectors of lines of sight, so as to obtain the three-dimensional shape of the object.

A second three-dimensional-shape measuring apparatus, according to the present invention, comprises:

image inputting means for inputting images of an object to be measured viewed from different first and second points of view;

correspondence relationship extracting means for extracting a plurality of characteristic points from the input image viewed from the first point of view, the correspondence relationship extracting means also extracting corresponding points from the input image viewed from the second point of view, the corresponding points corresponding to the characteristic points, respectively;

gravity-direction detecting means for detecting the gravity direction with respect to the orientation of the image inputting means for each point of view from which the image inputting means views the object so as to input the image of the object;

means for inputting the rotation angle about the gravity direction of the image inputting means for each point of view from which the image inputting means views the object so as to input the image of the object;

orientation calculating means for calculating the orientation of the image inputting means, for each point of view from which the image inputting means views the object, so as to input the image of the object, using the gravity direction and the rotation angle about the gravity direction;

means for calculating vectors of lines of sight for the first and second points of view, respectively, the vectors of lines of sight passing through the characteristic points and corresponding points, respectively, using the data of the characteristic points and corresponding points, and the orientations of the image inputting means;

translational-motion calculating means for calculating a translational-motion direction vector extending from the first point of view to the second point of view, using the vectors of lines of sight, the means for calculating vectors of lines of sight correcting the positions of the corresponding points using the translational-motion direction vector, and calculating the vectors of lines of sight using thus-corrected positions of the corresponding points;

convergence-signal generating means for generating a convergence signal when the amount of change of the positions of the corresponding points when the positions of the corresponding points are corrected becomes less than a fixed value or the number of repetitions reaches a fixed value during the repetitions of correction of the positions of the corresponding points using the translational-motion direction vector, calculation of the vectors of lines of sight using the corrected positions of the corresponding points and calculation of the translational-motion direction vector using the thus-calculated vectors of lines of sight; and three-dimensional-position calculating means for calculating the three-dimensional positions of object points on the object, using the translational-motion direction vector and the vectors of lines of sight, obtained when the convergence-signal generating means generates the convergence signal, so as to obtain the three-dimensional shape of the object to be measured.

A third three-dimensional-shape measuring apparatus, according to the present invention, comprises:

image inputting means for inputting images of an object to be measured viewed from different first and second points of view;

correspondence relationship extracting means for extracting a plurality of characteristic points from the input image viewed from the first point of view, the correspondence relationship extracting means also extracting a plurality of candidates of each corresponding point from the input image viewed from the second point of view, each corresponding point corresponding to a respective one of the characteristic points;

gravity-direction detecting means for detecting the gravity direction with respect to the orientation of the image inputting means for each point of view from which the image inputting means views the object so as to input the image of the object;

means for detecting the rotation angle about the gravity direction of the image inputting means for each point of view from which the image inputting means views the object so as to input the image of the object;

orientation calculating means for calculating the orientation of the image inputting means, for each point of view from which the image inputting means views the object, so as to input the image of the object, using the gravity direction and the rotation angle about the gravity direction;

means for calculating vectors of lines of sight for the first and second points of view, respectively, the vectors of lines of sight passing through the characteristic points and corresponding points, respectively, using the data of the characteristic points and corresponding points, and the orientations of the image inputting means;

translational-motion calculating means for calculating a translational-motion direction vector extending from the first point of view to the second point of view, using the vectors of lines of sight, the means for calculating vectors of lines of sight correcting each corresponding point among the candidates thereof using the translational-motion direction vector and calculating the vectors of lines of sight using the corrected corresponding points and the characteristic points;

convergence-signal generating means for generating a convergence signal when the amount of change of the positions of the corresponding points when the positions of the corresponding points are corrected becomes less than a fixed value or the number of repetitions reaches a fixed value during the repetitions of correction of the positions of the corresponding points using the translational-motion direction vector, calculation of the orientation of the image inputting means for the second point of view using the corrected corresponding points, calculation of the vectors of lines of sight for the second point of view using the thus-calculated orientation of the image inputting means and calculation of the translational-motion direction vector using the thus-calculated vectors of lines of sight for the second point of view and the vectors of lines of sight for the first point of view; and three-dimensional-point calculating means for calculating the three-dimensional positions of object points on the object, using the translational-motion direction vector and the vectors of lines of sight obtained when the convergence-signal generating means generates the convergence signal, so as to obtain the three-dimensional shape of the object.

The convergence-signal generating means may generate the convergence signal when the amount of the change of the translational-motion direction vector comes to be less than a fixed value during the repetitive calculation of the translational-motion direction vector.

A fourth three-dimensional-shape measuring apparatus, according to the present invention comprises:

image inputting means for inputting images of an object to be measured viewed from different first and second points of view;

correspondence relationship extracting means for extracting a plurality of characteristic points from the input image viewed from the first point of view, the correspondence relationship extracting means also extracting corresponding points from the input image viewed from the second point of view, the corresponding points corresponding to the characteristic points, respectively;

gravity-direction detecting means for detecting the gravity direction with respect to the orientation of the image inputting means for each point of view from which the image inputting means views the object so as to input the image of the object;

means for detecting the rotation angle about the gravity direction of the image inputting means for each point of view from which the image inputting means views the object so as to input the image of the object;

orientation calculating means for calculating the orientation of the image inputting means, for each point of view from which the image inputting means views the object, so as to input the image of the object, using the gravity direction and the rotation angle about the gravity direction;

means for calculating vectors of lines of sight for the first and second points of view, respectively, the vectors of lines of sight passing through the characteristic points and corresponding points, respectively, using the data of the characteristic points and corresponding points, and the orientations of the image inputting means;

translational-motion calculating means for calculating a translational-motion direction vector extending from the first point of view to the second point of view, using the vectors of lines of sight;

erroneous correspondence detecting means for detecting erroneous correspondences between characteristic points and corresponding points, respectively, using the translational-motion direction vector;

erroneous correspondence removing means for removing of the characteristic points and the corresponding points, the correspondences therebetween having been determined to be erroneous, respectively;

convergence-signal generating means for generating a convergence signal when it is determined that the translational-motion direction vector has converged during repetitions of the detection of the erroneous correspondences between characteristic points and corresponding points, respectively, using the translational-motion direction vector, the removal of the characteristic points and the corresponding points, the correspondences therebetween having been determined to be erroneous, respectively, and the calculation of the translational-motion direction vector using the remaining characteristic points and corresponding points; and three-dimensional-position calculating means for calculating the three-dimensional positions of object points on the object, using the translational-motion direction vector and the vectors of lines of sight, obtained when the convergence signal is generated, so as to obtain the three-dimensional shape of the object.

The convergence-signal generating means may detect the convergence of the translational-motion direction vector using an error curve which expresses the changes of the translational-motion direction vector T during the repetitive calculation of the translational-motion direction vector.

The gravity-direction detecting means may comprise three-axis acceleration sensors.

The gravity-direction detecting means may detect the gravity direction using the input images.

The means for detecting rotation angles about the gravity direction may comprise magnetism sensors.

The means for detecting the rotation angle about the gravity direction may comprise magnetism sensors and the gravity-direction detecting means.

The correspondence relationship extracting means further may calculate the values of weights for the respective characteristic points and corresponding points; and the translational-motion calculating means may calculate the translational-motion direction vector in consideration of the values of the weights for the respective characteristic points and corresponding points.

An image pickup apparatus, according to the present invention, comprises:

an image pickup portion which picks up images of an object plane to be input from a plurality of points of view in a manner in which a portion of each picked-up image corresponds to a portion of another picked-up image;

a motion detecting portion which detects change of the orientation and change of the position of point of view of the image pickup portion, occurring when the image pickup portion picks up the images of the object plane from the respective points of view;

a correspondence relationship extracting portion which extracts characteristic points from one of the picked-up images, the characteristic points corresponding to object points on the object plane, respectively, the corresponding relationship extracting portion also extracting corresponding points from another one of the picked-up images, which is picked up immediately after the one of the picked-up images from which the characteristic points are extracted is picked up, the corresponding points corresponding to the characteristic points, respectively;

a three-dimensional-position measuring portion which calculates the three-dimensional positions of the object points, based on the detected change of the orientation, the detected change of the position of point of view, the data of the extracted characteristic points and corresponding points;

a plane calculating portion which assumes that the calculated positions of the object points are present on the same plane and calculates an equation of the plane which fits the calculated positions of the object points, based on the calculated three-dimensional positions of the object points;

a projection calculating portion which performs a calculation so as to virtually project the respective images picked up by the image pickup portion on the same arbitrary virtual image plane so as to synthesize the respective images picked up from the plurality of points of view on the virtual image plane, based on the detected change of the orientation and the detected change of the position of the point of view, and the calculated an equation of the plane.

Thereby, the image of the entire object plane to be input is obtained.

Another image pickup apparatus, according to the present invention, comprises:

an image pickup portion which picks up images of an object plane to be input from a plurality of points of view in a manner in which a portion of each picked-up image corresponds to a portion of another picked-up image;

an orientation detecting portion which detects the orientation of the image pickup portion, in which the image pickup portion picks up the image of the object plane from each point of view;

a correspondence relationship extracting portion which extracts characteristic points from one of the picked-up images, the characteristic points corresponding to object points on the object plane, respectively, the corresponding relationship extracting portion also extracting corresponding points from another one of the picked-up images, which is picked up immediately after the one of the picked-up images from which the characteristic points are extracted is picked up, the corresponding points corresponding to the characteristic points, respectively;

a translational-motion detecting portion which detects a translational-motion direction vector for the respective object points, based on the detected orientations, and the data of the extracted characteristic points and corresponding points;

a three-dimensional-position measuring portion which calculates the three-dimensional positions of the respective object points, based on the detected orientations, the data of the extracted characteristic points and corresponding points, and the detected translational-motion direction vector;

a plane calculating portion which assumes that the calculated positions of the object points are present on the same plane and calculates an equation of the plane which fits the calculated positions of the object points, based on the calculated three-dimensional positions of the object points;

a projection calculating portion which performs a calculation so as to virtually project the respective images picked up by the image pickup portion on the same arbitrary virtual image plane so as to synthesize the respective images picked up from the plurality of points of view on the virtual image plane, based on the detected orientations, the detected translational-motion direction vector, and the calculated an equation of the plane.

Thereby, the influence of the change of the orientation of the image pickup portion is removed and the images picked up from the plurality of points of view are precisely synthesized.

Further, as a result of the orientation detecting portion being provided with a magnetism detecting portion which detects magnetism in one of two-axis directions and three-axis directions, orthogonal to each other, the orientation of the image pickup portion in which each image is picked up is easily and precisely detected.

Further, as a result of the orientation detecting portion being provided with a magnetism detecting portion which detects the magnetism in one of two-axis directions and three-axis directions, orthogonal to each other, and a gravity-direction detecting portion which detects the gravity direction, the orientation of the image pickup portion in which each image is picked up is more precisely detected.

Further, as a result of the orientation detecting portion being provided with an angular-speed detecting portion which detects the rotation angular speeds of the image pickup portion about one of two-axis directions and three-axis directions, orthogonal to each other, respectively, the orientation of the image pickup portion in which each image is picked up is easily detected even in a case where detection of the magnetism is difficult.

Further, as a result of an adjusting portion being provided which performs fine adjustment of the position, at which each picked-up image is to be projected, and the scale of each picked-up image to be projected, in a manner in which the cross-correlation value between the corresponding portions of the respective picked-up images, which portions are superimposed on the virtual image plane, is maximized when the respective images picked up by the image pickup portion are projected on the virtual image plane, a distortion-free, high-accuracy image of the entire object plane to be input is obtained.

An image inputting method, according to the present invention, comprises the steps of:

a) inputting images of an object plane to be input viewed from a plurality of points of view in a manner in which a portion of each input image corresponds to a portion of another input image;

b) detecting change of the orientation and change of the position of point of view, occurring when the step a) is performed;

c) extracting characteristic points from one of the input images, the characteristic points corresponding to object points on the object plane, respectively;

d) extracting corresponding points from another one of the input images, which is input immediately after the one of the input images from which the characteristic points are extracted is input, the corresponding points corresponding to the characteristic points, respectively;

e) calculating the three-dimensional positions of the object points, based on the detected change of the orientation, the detected change of the position of point of view, the data of the extracted characteristic points and corresponding points;

f) assuming that the calculated positions of the object points are present on the same plane and calculating an equation of the plane which fits the calculated positions of the object points, based on the calculated three-dimensional positions of the object points; and g) performing a calculation so as to virtually project the respective images input in the step a) on the same arbitrary virtual image plane so as to synthesize the respective images, viewed from the plurality of points of view so as to be input, on the virtual image plane, based on the detected change of the orientation and the detected change of the position of the point of view, and the calculated equation of the plane.

Another image inputting method, according to the present invention, comprises the steps of:

a) inputting images of an object plane to be input viewed from a plurality of points of view in a manner in which a portion of each input image corresponds to a portion of another input image;

b) detecting the orientations, in which the step a) is performed;

c) extracting characteristic points from one of the input images, the characteristic points corresponding to object points on the object plane, respectively;

d) extracting corresponding points from another one of the input images, which is input immediately after the one of the picked-up images from which the characteristic points are extracted is input, the corresponding points corresponding to the characteristic points, respectively;

e) detecting a translational-motion direction vector for the respective object points, based on the detected orientations, and the data of the extracted characteristic points and corresponding points;

f) calculating the three-dimensional positions of the respective object points, based on the detected orientations, the data of the extracted characteristic points and corresponding points, and the detected translational-motion direction vector;

g) assuming that the calculated positions of the object points are present on the same plane and calculating an equation of the plane which fits the calculated positions of the object points, based on the calculated three-dimensional positions of the object points;

h) performing a calculation so as to virtually project the respective images input in the step a) on the same arbitrary virtual image plane so as to synthesize the respective images, viewed from the plurality of points of view, so as to be input, on the virtual image plane, based on the detected orientations, the detected translational-motion direction vector, and the calculated equation of the plane.

Further, fine adjustment of the position, at which each input image is to be projected, and the scale of each input image to be projected, is performed, in a manner in which the cross-correlation value between the corresponding portions of the respective input images, which portions are superimposed on the virtual image plane, is maximized when the respective images input in the step a) are projected on the virtual image plane.

Other objects and further features of the present invention will become more apparent from the following detailed description when read in conjunction with the accompanying drawings.

BRIEF DESCRIPTIONS OF THE DRAWINGS

DETAILED DESCRIPTIONS OF THE PREFERRED EMBODIMENTS

Figure 1:
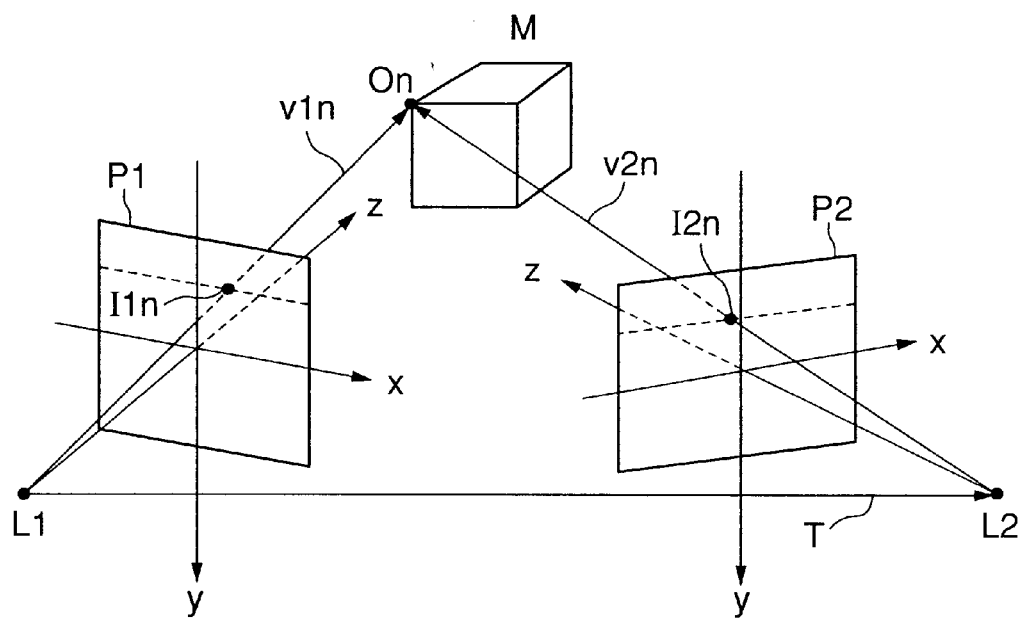
FIG. 1 illustrates a principle of operations of the first, second, third and fourth embodiments of the present invention.

A three-dimensional-shape measuring apparatus according to the present invention includes a monocular image-pickup (or picture-taking) portion comprising, for example, a digital camera, a correspondence relationship extracting portion, a gravity-direction detecting portion, a portion for detecting rotation angles about the gravity direction, an orientation calculating portion, a portion for calculating vectors of lines of sight, a translational-motion calculating portion and a three-dimensional-shape calculating portion. The monocular image-pickup portion picks up an image (or takes a picture) of an object to be measured from different first and second points of view, and sends the thus-obtained images to the correspondence relationship extracting portion. The correspondence relationship extracting portion extracts characteristic points from the image obtained from the first point of view, and extracts the corresponding points from the image obtained from the second point of view. Then, the orientation calculating portion calculates the orientations of the monocular image-pickup portion, in which orientations the images are picked up from the first and second points of view, respectively, using the inclinations with respect to the gravity direction detected by the gravity-direction detecting portion and the rotation angles about the gravity direction detected by the portion for detecting rotation angles about the gravity direction, in which inclinations and rotation angles the images are picked up from the first and second points of view, respectively. Using the data of the orientations of the monocular image-pickup portion, in which orientations the images are picked up from the first and second points of view, respectively, and the characteristic points and the corresponding points, the portion for calculating vectors of lines of sight calculates the vectors of the lines of sight passing through the characteristic points and corresponding points, respectively. Using the data of the vectors of the lines of sight passing through the characteristic points and corresponding points, respectively, the translational-motion calculating portion calculates a translational-motion-direction vector extending from the first point of view to the second point of view. Using the calculated translational-motion-direction vector and the vectors of the lines of sight, in accordance with the principle of triangulation, the three-dimensional-shape calculating portion calculates the three-dimensional coordinate values of the object points on the object which correspond to the characteristic points, respectively. Thus, the three-dimensional-shape calculating portion outputs the data of the three-dimensional shape of the three-dimensional shape of the object. Thus, by combining the information of the gravity direction, the information of the rotation angle about the gravity direction and the image information obtained from the two points of view, a high-accuracy three-dimensional-shape measurement can be achieved and the apparatus can be miniaturized.

Further, it is possible to correct the extracted corresponding points using the translational-motion-direction vector, and again calculate the translational-motion-direction vector using the corrected corresponding points. In detail, the portion for calculating vectors of lines of sight, using the calculated translational-motion-direction vector, obtains an epipolar line for each corresponding point. Then, using the thus-calculated epipolar lines, the portion for calculating vectors of lines of sight corrects the positions of the corresponding points. Then, the portion for calculating vectors of lines of sight calculates the new vectors of lines of sight using the position data of the corrected corresponding points, and calculates the translational-motion-direction vector again. The correction of the corresponding points and the calculation of the translational-motion-direction vector are repeated until the positions of the corresponding points converge into fixed positions or the number of calculations reaches a certain value. Then, using the thus-obtained translational-motion-direction vector and the vectors of lines of sight, in accordance with the principle of triangulation, the three-dimensional-shape calculating portion calculates the three-dimensional coordinate values of the object points on the object which correspond to the characteristic points, respectively. Thus, the three-dimensional-shape calculating portion outputs the data of the three-dimensional shape of the object. By performing the repetitive calculations for adjusting the translational-motion-direction vector and the corresponding points, a higher-accuracy three-dimensional-shape measurement can be achieved.

Further, it is possible to extract a plurality of candidates of the corresponding point for each characteristic point. Then, the optimum corresponding point is selected from the plurality of candidates by means of repetitive calculations of the translational-motion-direction vector and corrections of the corresponding point among the plurality of candidates. Thus, the translational-motion-direction vector and the corresponding points are adjusted by means of the repetitive calculations. Thereby, a further-higher-accuracy three-dimensional-shape measurement can be achieved.

Figure 2:
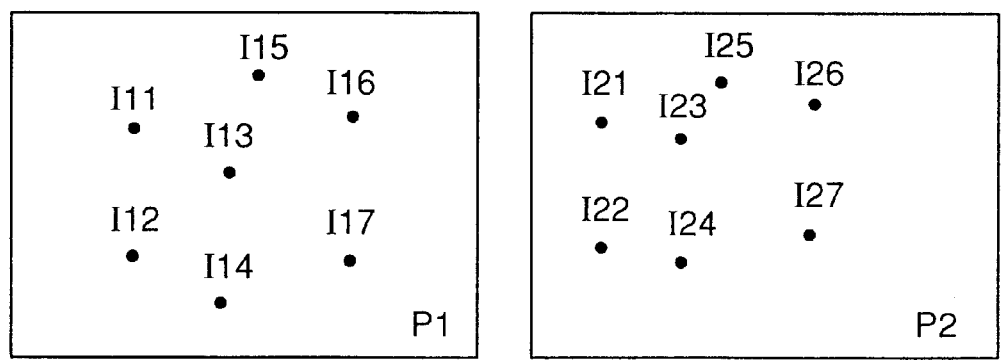
FIG. 2 shows correspondence between characteristic points and corresponding points on image planes.
Figure 3:
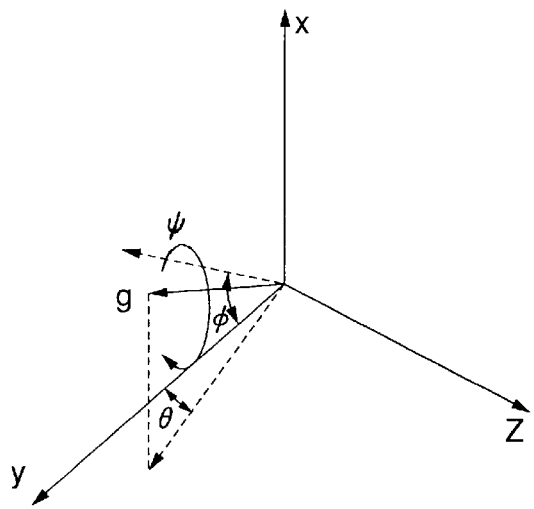
FIG. 3 illustrates relationship between the gravity direction and an image pickup system.

In order to describe the preferred embodiments of the present invention, the operation principle of the embodiments will now be described with reference to FIGS. 1, 2 and 3. As shown in FIG. 1, by moving an image pickup (or picture taking) system, images (or pictures) of an object to be measured M are obtained (or taken) from two points of view: a first point of view L1 and a second point of view L2. An object point On on the object to be measured M is detected as a characteristic point I1n on an image plane P1 of the first point of view L1, and is detected as a corresponding point I2n, corresponding to the characteristic point I1n, on an image plane P2 of the second point of view L2. As shown in FIG. 2, the characteristic points I1n on the image plane P1 and the respective corresponding points I2n on the image plane P2 are extracted for a plurality of object points On. In FIG. 2, the characteristic points I11 through I17 on the image plane P1 correspond to the corresponding points I21 through I27 on the image plane P2, respectively. (In this example, the plurality of object points On correspond to the vertexes of the object M.) Then, the inclination of the orthogonal coordinate system of the image pickup system with respect to the world coordinate system is extracted in a form of two components: the inclination with respect to the gravity direction and the rotation angle about the gravity direction, when the respective images are picked up (or pictures are taken) from the first point of view L1 and from the second point of view, one axis of the world coordinate system extending in the gravity direction. Then, as shown in FIG. 3, for example, it is assumed that a unit vector extending in the gravity direction, that is, a vector extending in the gravity direction with respect to the image pickup system, when an image is picked up from a certain point of view, is: g=(gx, gy, gz), and the rotation angle about the gravity direction is $\psi$. Then, the angles $\theta$ and $\phi$ at which the coordinate axes of the image pickup system incline from the gravity-directional unit vector g can be expressed as follows: tan $\theta$=(gz/gy), tan $\phi$=(gx/gy$\theta$), respectively, where 'gy$\theta$' is the y component of the gravity-directional unit vector g when the gravity-directional unit vector g is rotated through the angle $\theta$ about the x axis. This method is applied for the coordinate system of the image pickup system for the first point of view L1 and the coordinate system of the image pickup system for the second point of view L2. As a result, the orientation ($\theta$1, $\phi$1 and $\psi$1) of the image pickup system, that is, the inclination of the coordinate system of the image pickup system, in which inclination the image is picked up from the first point of view L1, with respect to the world coordinate system is obtained. Similarly, the orientation (θ2, φ2 and ψ2) of the image pickup system, that is, the inclination of the coordinate system of the image pickup system, in which inclination the image is picked up from the second point of view L2 with respect to the world coordinate system is obtained. Therefore, the vector of line of sight v1n passing through the characteristic point I1n on the image plane P1 and the vector of line of sight v2n passing through the characteristic point I1n on the image plane P2 can be expressed in the world coordinate system. Further, the translational-motion-direction vector T of the image pickup system obtained as a result of the optical center of the image pickup system being moved from the first point of view L1 to the second point of view L2 can be determined as the vector such that the sum of the scalar triple products (v1n×T, v2n) of the vectors of lines of sight v1n, v2n and the translational-motion-direction vector T for the respective object points On (n=1, 2, 3, . . . , 7, in the example shown in FIG. 2) is minimized. By using the thus-obtained translational-motion-direction vector T and the vectors of lines of sight v1n and v2n, in accordance with the principle of triangulation, the three-dimensional coordinate values of each object point On on the object M corresponding to the respective characteristic point I1n can be calculated.

Figure 4:
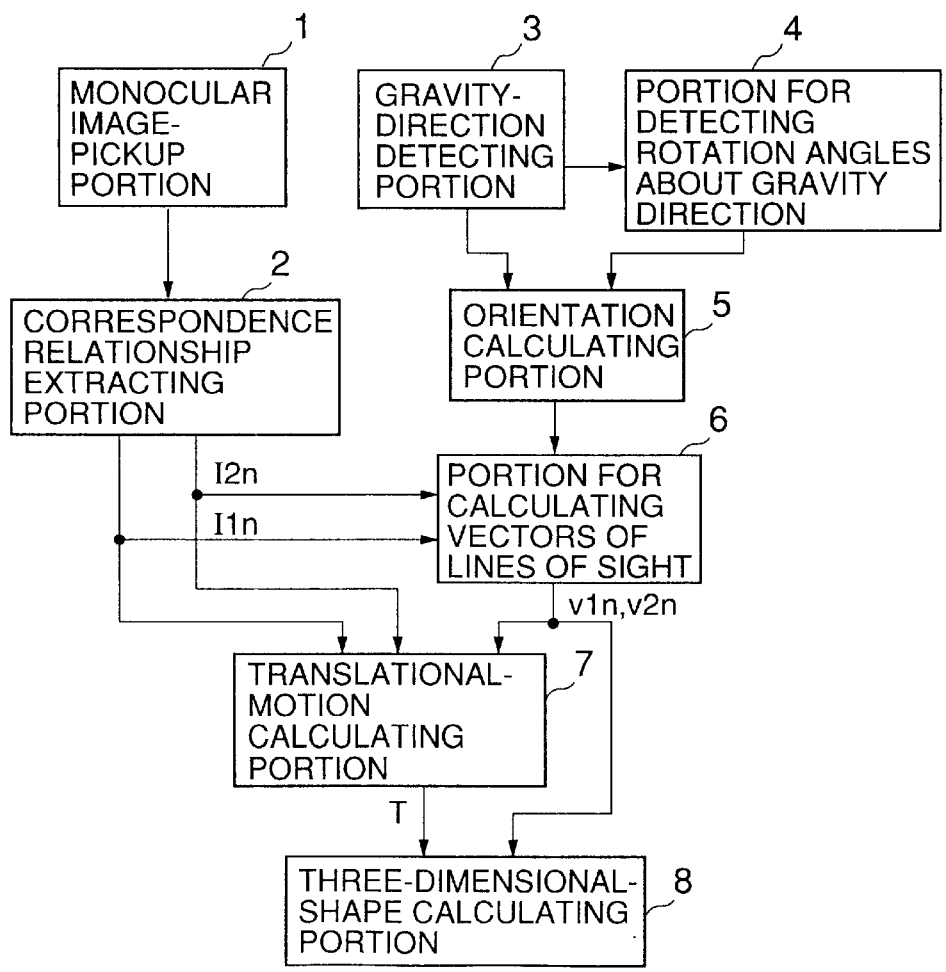
FIG. 4 shows a block diagram of the first embodiment of the present invention.

A three-dimensional-shape measuring apparatus in a first embodiment of the present invention, based on the above-described principle, includes, as shown in FIG. 4, which shows a block diagram of the apparatus, a monocular image-pickup (or picture-taking) portion 1, a correspondence relationship extracting portion 2, a gravity-direction detecting portion 3, a portion for detecting rotation angles about the gravity direction 4, an orientation calculating portion 5, a portion for calculating vectors of lines of sight 6, a translational-motion calculating portion 7 and a three-dimensional-shape calculating portion 8. The monocular image-pickup portion 1 comprises, for example, a digital camera, and, as shown in FIG. 1, picks up the images (or takes the pictures) of the object to be measured M from the first point of view L1 and from the second point of view L2. The correspondence relationship extracting portion 2 extracts a plurality of characteristic points I1n of the image picked up from the first point of view L1, and extracts the corresponding points I2n, corresponding to the plurality of characteristic points I1n, of the image picked up from the second point of view L2.

The gravity-direction detecting portion 3 comprises, for example, acceleration sensors for detecting accelerations for three orthogonal axes, respectively, and detects the inclinations of the orthogonal coordinate system of the monocular image-pickup portion 1 with respect to the gravity direction when the images are picked up from the first point of view L1 and from the second point of view L2. When the inclination of the orthogonal coordinate system of the monocular image-pickup portion 1 is detected, as shown in FIG. 1, the orthogonal coordinate system is determined so that each of the x axis and the y axis extends on the image plane and the z axis extends in the direction of the optical axis perpendicular to the image plane. Then, the acceleration sensors are set so that the accelerations for the x, y, z axes are detected thereby, respectively. The ratio of the signal values output from the respective acceleration sensors can be used to express the direction vector extending in the gravity direction with respect to the monocular image-pickup portion 1. The portion for detecting rotation angles about the gravity direction 4 comprises, for example, magnetism sensors for measuring the magnetic forces along the three orthogonal axes, respectively. The portion for detecting rotation angles about the gravity direction 4 detects the rotation angle of the orthogonal coordinate system of the monocular image-pickup portion 1 about the gravity direction, for each of the time when the image is picked up from the first point of view L1 and the time when the image is picked up from the second point of view L2, using the direction indicated by the magnetism sensors and the gravity direction. Thereby, the respective angles constituting the rotation matrix which indicates the change in the orientation of the monocular image-pickup portion 1 with respect to the world coordinate system is obtained. In detail, the direction (expressed by the angles θ and φ in the case where the direction is indicated in the manner in FIG. 3) of one axis (the y axis in the case of FIG. 3) of the monocular image-pickup portion 1 with respect to the gravity direction is obtained. Further, the angle (the angle ψ in the case where the angle is indicated in the manner in FIG. 3) of another axis (in the case of FIG. 3, the x axis or the z axis) of the monocular image-pickup portion 1, after being rotated through the angles θ and φ, with respect to the plane component of the magnetism perpendicular to the gravity direction is obtained.

The orientation calculating portion 5 calculates the orientations of the monocular image-pickup portion 1, in which orientations the images are picked up from the first point of view L1 and from the second point of view L2, respectively, using the inclinations of the monocular image-pickup portion 1 detected by the gravity-direction detecting portion 3 and the rotation angles about the gravity direction detected by the portion for detecting rotation angles about the gravity direction 4, in which inclinations and rotation angles the images are picked up from the first point of view L1 and from the second point of view L2. The portion for calculating vectors of lines of sight 6 calculates the vectors of lines of sight v1n and v2n passing through the respective characteristic points I1n and the respective corresponding points I2n, respectively, using the orientation values, obtained when the images are picked up from the first point of view L1 and from the second point of view L2, respectively, and the characteristic points I1n and the corresponding points I2n. The translational-motion calculating portion 7 calculates the translational-motion-direction vector T extending from the first point of view L1 to the second point of view L2, using the vectors of lines of sight v1n, v2n. The three-dimensional-shape calculating portion 8 calculates the three-dimensional positions of the respective object points On using the translational-motion-direction vector T and the vectors of lines of sight v1n, v2n. Thus, the three-dimensional-shape calculating portion 8 obtains the data of the three-dimensional shape of the object M.

Figure 5:
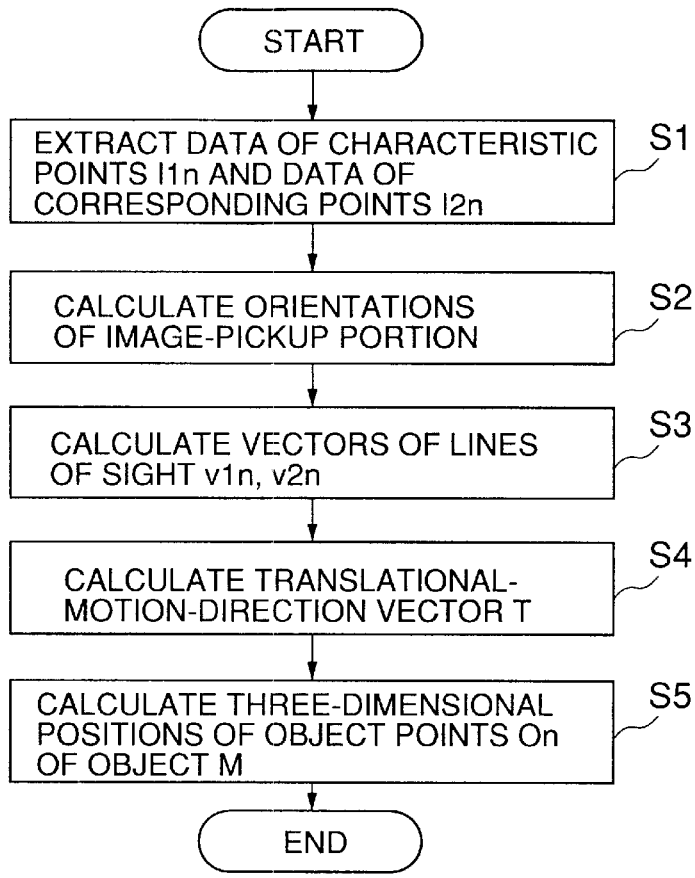
FIG. 5 shows a flowchart of operations of the first embodiment of the present invention.

The operations of the above-described first embodiment will now be described with reference to FIG. 5 which shows a flowchart of the operations. First, the monocular image-pickup portion 1 sends the data of the images to the correspondence relationship extracting portion 2, the images having been picked up, as shown in FIG. 1, from the different points of views: the first point of view L1 and the second point of view L2. The correspondence relationship extracting portion 2 extracts the characteristic points I1n (n=1, 2, 3, . . . , 7, in the example of FIG. 2) on the image picked up from the first point of view L1 and extracts the corresponding points I2n (n=1, 2, 3, . . . , 7, in the example of FIG. 2) on the image picked up from the second point of view L2 (in a step S1). There are various methods for extracting the characteristic points I1n and the corresponding points I2n. For example, the following procedure is used for this purpose: two-dimensional differential filtering is performed on the image picked up from the first point of view L1. Then, the points in the image, which have high differential values, respectively, are extracted as the characteristic points I1n. Then, an image area surrounding a certain characteristic point I1n is extracted, and an image area in the image picked up from the second point of view L2, the most similar to the extracted image area in the image picked up from the first point of view L1, is searched for. A correlation method is used for this purpose. In the correlation method, cross-correlations between the image area surrounding the characteristic point I1n extracted from the image picked up from the first point of view L1 and each of image areas in the image picked up from the second point of view L2 are calculated. Then, the image area of the image picked up from the second point of view L2, with which the cross-correlation is highest, is extracted. The center of the thus-extracted image area is determined as the corresponding point I2n. This processing is performed for all of the characteristic points I1n of the image picked up from the first point of view L1. However, when no similar image area is found from the image picked up from the second point of view L2, the certain characteristic point I1n is removed from the characteristic points I1n.

After the characteristics points I1n (n=1, 2, 3, ... , 7, in the example of FIG. 2) and the corresponding points I2n (n=1, 2, 3, ... , 7, in the example of FIG. 2) are extracted, the orientation calculating portion 5 calculates the orientations of the monocular image-pickup portion 1, in which orientations the images are picked up from the first point of view L1 and from the second point of view L2, respectively, using the inclinations of the monocular image-pickup portion 1 with respect to the gravity direction detected by the gravity-direction detecting portion 3 and the rotation angles about the gravity direction of the monocular image-pickup portion 1 detected by the portion for detecting the rotation angles about the gravity direction 4, in which inclinations and rotation angles the images are picked up from the first point of view L1 and from the second point of view L2, respectively (in a step S2). Using the data of the orientations of the monocular image-pickup portion 1, in which orientations the images are picked up from the first and second points of view L1, L2, respectively, the characteristic points I1n and the corresponding points I2n, the portion for calculating vectors of lines of sight 6 calculates the vectors of lines of sight v1n, v2n (n=1, 2, 3, ... , 7, in the example of FIG. 2) which pass through the characteristic points I1n and the corresponding points I2n, respectively (in a step S3). Using the data of the vectors of lines of sight v1n, v2n, the translational-motion calculating portion 7 calculates the translational-motion-direction vector T (in a step S4). The three-dimensional-shape calculating portion 8 calculates, in accordance with the principle of triangulation, the three-dimensional coordinate values of the object points On (n=1, 2, 3, ... , 7, in the example of FIG. 2), which correspond to the characteristic points I1n, respectively, using the translational-motion-direction vector T and the vectors of lines of sight v1n, v2n. Thus, the data of the three-dimensional shape of the object M is obtained and is output by the three-dimensional-shape calculating portion 8 (in a step S5).

Thus, by combining the information of the inclinations with respect to the gravity direction and the information of the rotation angles about the gravity direction of the monocular image-pickup portion 1, and the information concerning the images picked up from the first and second points of view L1, L2, a high-accuracy three-dimensional-shape measurement can be achieved, and the apparatus can be miniaturized.

In the above-described first embodiment, the translational-motion-direction vector T is calculated by using the extracted corresponding points I2n. However, it is also possible to correct the extracted corresponding points I2n using the calculated translational-motion-direction vector T, and calculate the translational-motion-direction vector T again using the corrected corresponding points I2n.

Figure 6:
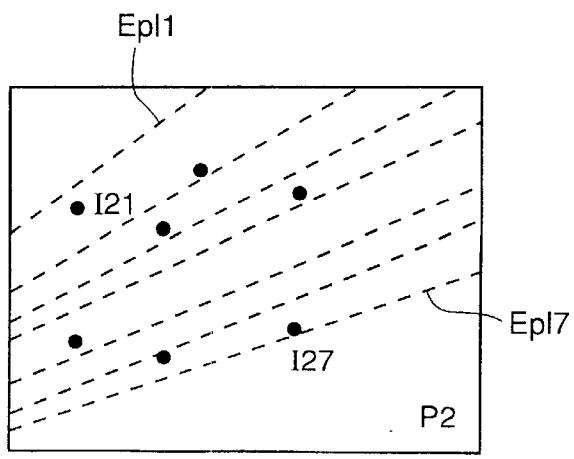
FIG. 6 illustrates epipolar lines.

In a second embodiment of the present invention, the extracted corresponding points I2n are corrected by using the calculated translational-motion-direction vector T, and the translational-motion-direction vector T is calculated again by using the corrected corresponding points I2n. In order to describe the second embodiment, the principle of the correction operation will now be described. In the above-described first embodiment, using the translational-motion-direction vector T calculated by the translational-motion calculating portion 7 and the vectors of lines of sight v1n, v2n calculated by the portion for calculating vectors of lines of sight 6, as shown in FIG. 6, epipolar lines Ep1n (n=1, 2, 3, ... , 7, in the example of FIG. 6) can be drawn for the corresponding points I2n, respectively. Each epipolar line Ep1n is the line of intersection at which the plane (that is, the epipolar plane) including the three points (the first point of view L1 (optical center), the second point of view L2 (optical center) and a respective one of the object points On) and the image plane P2 intersect. Each epipolar line Ep1n is obtained as a result of a straight line passing through the first point of view L1 (optical center) and a respective one of the characteristic points I1n being projected on the image plane P2. Ideally, each corresponding point I2n should be present on a respective one of the epipolar lines Ep1n. Accordingly, it can be supposed that each corresponding point I2n is present in the vicinity of a respective one of the epipolar lines Ep1n. Therefore, each corresponding point I2n is corrected to approach a respective one of the epipolar lines Ep1n. Then, using the thus-corrected corresponding points I2n, the translational-motion-direction vector T is calculated again. By repeating the calculation of the translational-motion-direction vector T and the correction of the corresponding points I2n, final corresponding points I2n and translational-motion-direction vector T can be obtained.

Figure 7:
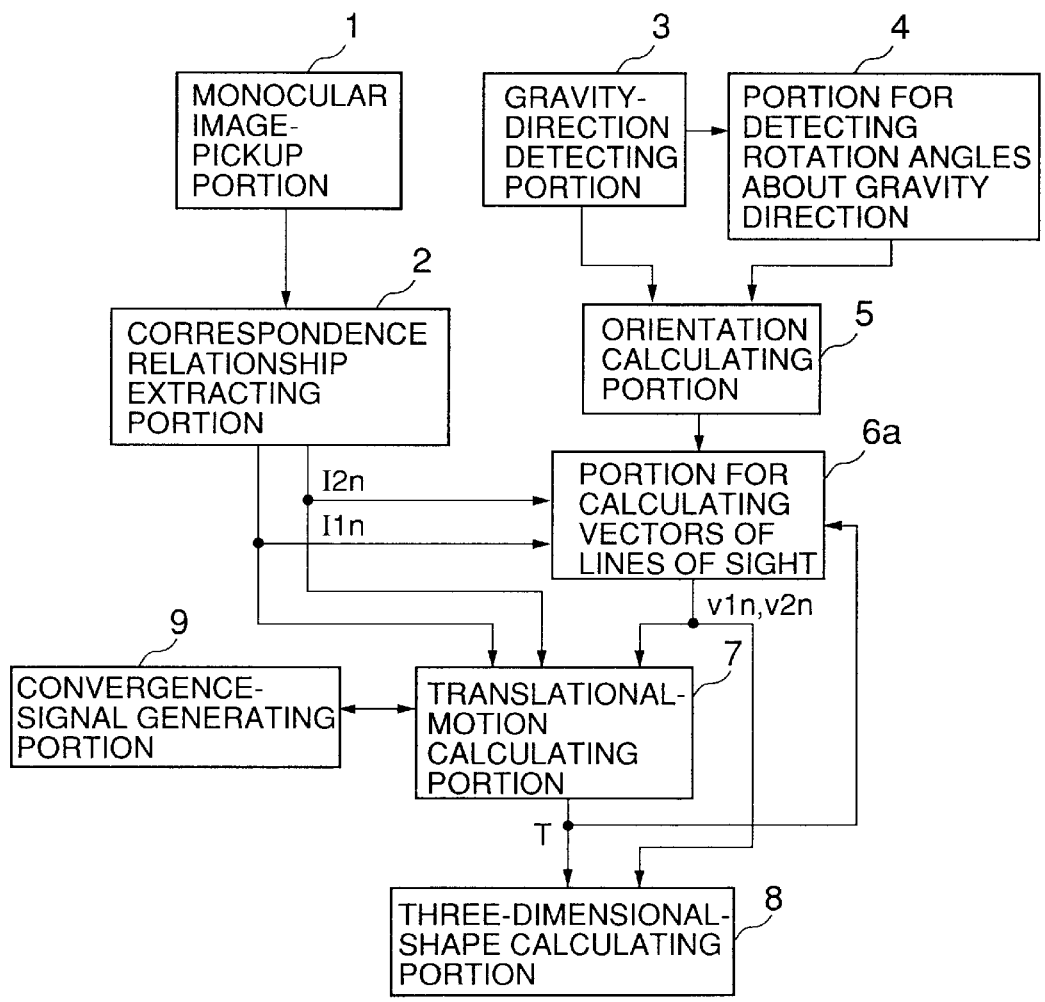
FIG. 7 shows a block diagram of the second embodiment of the present invention.

A three-dimensional-shape measuring apparatus in the second embodiment using the above-described principle of the correction operation has, as shown in FIG. 7 which shows a block diagram of the apparatus, an arrangement the same as the arrangement of the three-dimensional-shape measurement apparatus in the first embodiment shown in FIG. 4, except for a portion for calculating vectors of lines of sight 6a and a convergence-signal generating portion 9. The portion for calculating vectors of lines of sight 6a calculates the vectors of lines of sight v1n, v2n (n=1, 2, 3, ... , 7, in the example of FIG. 2), which pass through the characteristic points I1n and the corresponding points I2n, respectively, using the data of the orientations of the monocular image-pickup portion 1, in which orientations the images are picked up from the points of view L1, L2, respectively, the characteristic points I1n and the corresponding points I2n. Also, the portion for calculating vectors of lines of sight 6a corrects the positions of the corresponding points I2n using the translational-motion-direction vector T calculated by the translational-motion calculating portion 7, and calculates the vectors of lines of sight v2n, which pass through the corrected corresponding points I2n, respectively. The convergence-signal generating portion 9 calculates the amounts of change of the positions of the corresponding points I2n in correcting the corresponding points I2n. The convergence-signal generating portion generates a convergence signal for informing that each of the amounts of change of the corresponding points I2n in correcting the corresponding points I2n has come to be lower than a fixed value or the number of the repetitive collections of the corresponding positions I2n and calculations of the translational-motion-direction vector T has reached a fixed value.

Figure 8:
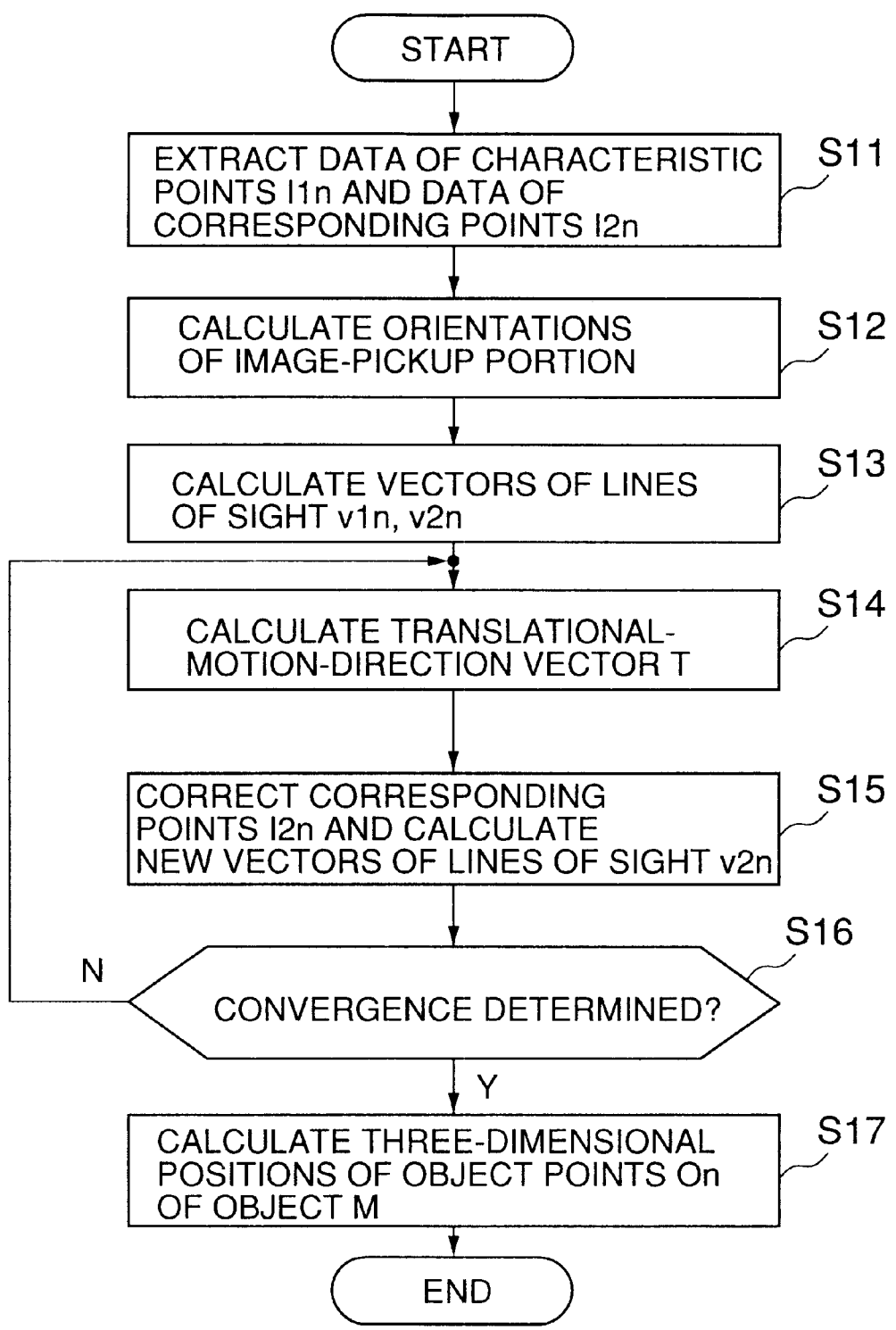
FIG. 8 shows a flowchart of operations of the second embodiment of the present invention.

The operations of the second embodiment will now be described with reference to FIG. 8, which shows a flowchart of the operations. The monocular image-pickup portion 1 sends the data of the images to the correspondence relationship extracting portion 2, the images having been picked up from the different points of views: the first point of view L1 and the second point of view L2. The correspondence relationship extracting portion 2 extracts the characteristic points I1n (n=1, 2, 3, ... , 7, in the example of FIG. 2) on the image picked up from the first point of view L1 and extracts the corresponding points I2n (n=1, 2, 3, ... , 7, in the example of FIG. 2) on the image picked up from the second point of view L2 (in a step S11). After the characteristics points I1n and the corresponding points I2n are extracted, the orientation calculating portion 5 calculates the orientations of the monocular image-pickup portion 1, in which orientations the images are picked up from the first point of view L1 and from the second point of view L2, respectively, using the inclinations of the monocular image-pickup portion 1 with respect to the gravity direction detected by the gravity-direction detecting portion 3 and the rotation angles about the gravity direction of the monocular image-pickup portion 1 detected by the portion for detecting the rotation angles about the gravity direction 4, in which inclinations and rotation angles the images are picked up from the first point of view L1 and from the second point of view L2, respectively (in a step S12). Using the data of the orientations of the monocular image-pickup portion 1, in which the images are picked up from the first and second points of view L1, L2, respectively, the characteristic points I1n and the corresponding points I2n, the portion for calculating vectors of lines of sight 6a calculates the vectors of lines of sight v1n, v2n (n=1, 2, 3, ... , 7, in the example of FIG. 2) which pass through the characteristic points I1n and the corresponding points I2n, respectively (in a step S13). Using the data of the vectors of lines of sight v1n, v2n, the translational-motion calculating portion 7 calculates the translational-motion-direction vector T (in a step S14). The portion for calculating vectors of lines of sight 6a uses the calculated translational-motion-direction vector T and corrects the positions of the corresponding points I2n. Then, the portion for calculating vectors of lines of sight 6a calculates new vectors of lines of sight v2n, which pass through the corrected corresponding points I2n, respectively (a step S15). The method for correcting the corresponding points I2n is, for example, that in which the foot of the perpendicular extending from each corresponding point I2n to a respective one of the epipolar lines Ep1n is determined as a new corresponding point I2n, or that in which a new corresponding point I2n is searched for in the vicinity of a respective one of the epipolar lines Ep1n. Then, using the corrected corresponding points I2n, the translational-motion-direction vector T is calculated again by the translational-motion calculating portion 7. The correction of the corresponding points I2n and the calculation of the translational-motion-direction vector T are repeated until the corresponding points I2n converge to approximately fixed points, respectively, or the number of the repetitive corrections reaches a certain value (a step S16). This convergence control is performed by the convergence-signal generating portion 9. Then, when the corresponding points I2n converge to approximately fixed points, respectively, or the number of the repetitive corrections reaches the certain value, the convergence-signal generating portion 9 generates the convergence signal and sends the signal to the translational-motion calculating portion 7. The three-dimensional-shape calculating portion 8 calculates, in accordance with the principle of triangulation, the three-dimensional coordinate values of the object points On (n=1, 2, 3, ... , 7, in the example of FIG. 2) on the object M, which correspond to the characteristic points I1n, respectively, using the translational-motion-direction vector T, which has been output from the translational-motion calculating portion 7 when the convergence signal is sent to the translational-motion calculating portion 7, and the vectors of lines of sight v1n, v2n. Thus, the data of the three-dimensional shape of the object M is obtained by and is output from the three-dimensional-shape calculating portion 8 (in a step S17). Thus, by adjusting the translational-motion-direction vector T and the corresponding points I2n by performing the repetitive calculations and corrections, a higher-accuracy three-dimensional-shape measurement apparatus can be achieved.

In the above-described second embodiment, the extracted corresponding points I2n are corrected by using the translational-motion-direction vector T, and the translational-motion-direction vector T is again calculated by using the corrected corresponding points I2n. However, it is also possible to extract a plurality of candidates of the corresponding point I2n for each characteristic point I1n, select the optimum corresponding point I2n from among the plurality of candidates as a result of repeating the calculation of the translational-motion-direction vector T and the correction of the corresponding points I2n among the plurality of candidates, and thus adjust the translational-motion-direction vector T and the corresponding points I2n by performing repetitive calculations of the translational-motion-direction vector T and corrections (selections) of the corresponding points I2n.

A third embodiment of the present invention selects the optimum corresponding point I2n for each characteristic point I1n and adjusts the translational-motion-direction vector T and the corresponding points I2n. In order to describe the third embodiment, the principle of the operations of the third embodiment will now be described. When the characteristic points I1n on the image plane P1 and the corresponding points I2n on the image plane P2, of the plurality of object points On on the object M, as shown in FIG. 2, are extracted, a plurality of candidates of the corresponding point I2n are extracted for each characteristic point I1n. Specifically, when the corresponding point I2n is searched for, for each characteristic point I1n, the central points of a plurality of image areas having higher cross-correlations with the image area surrounding the characteristic point I1n are held as the candidates of the corresponding point I2n. Then, one of the plurality of candidates of the corresponding point I2n is selected for each characteristic point I1n. By using the selected corresponding points I2n, the translational-motion-direction vector T is calculated, and the epipolar lines Ep1n are drawn on the image plane P2. For each characteristic point I1n, the candidate of the plurality of candidates, the position of which is nearest to a respective one of the epipolar lines Ep1n, is then selected as the new corresponding point I2n. By using the thus-selected new corresponding points I2n, the translational-motion-direction vector T is calculated, and the epipolar lines Ep1n are again drawn on the image plane P2. By repeating the calculation of the translational-motion-direction vector T, the drawing of the epipolar lines Ep1n and the selection of the corresponding points I2n, the optimum corresponding points I2n and translational-motion-direction vector T can be obtained.

Figure 9:
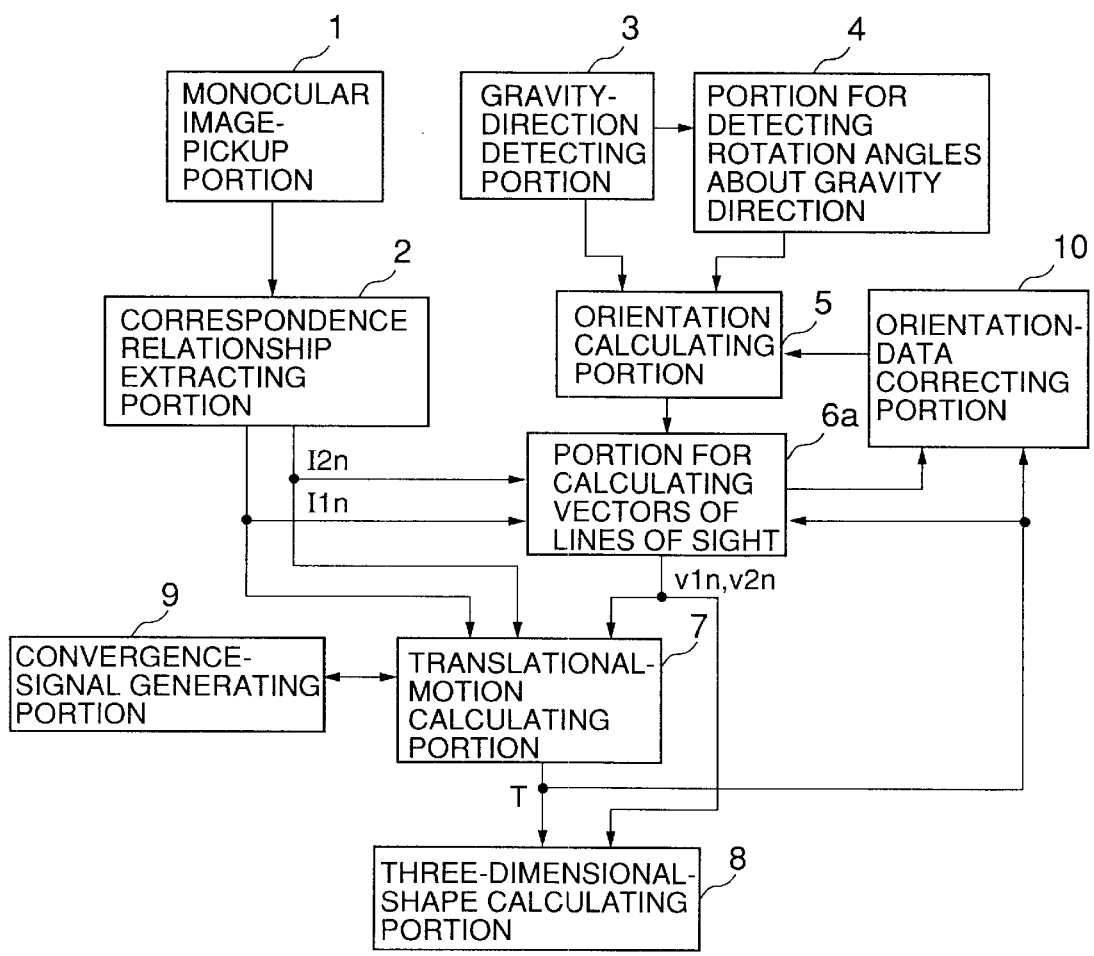
FIG. 9 shows a block diagram of the third embodiment of the present invention.

Thus, the three-dimensional-shape measuring apparatus in the third embodiment repeats the calculation of the translational-motion-direction vector T, the drawing of the epipolar lines Ep1n and the selection of the corresponding points I2n. As shown in FIG. 9, this three-dimensional-shape measuring apparatus includes the monocular image-pickup portion 1, the correspondence relationship extracting portion 2, the gravity-direction detecting portion 3, the portion for detecting rotation angles about the gravity direction 4, the orientation calculating portion 5, the portion for calculating vectors of lines of sight 6a, the translational-motion calculating portion 7, the three-dimensional-shape calculating portion 8, the convergence-signal generating portion 9 and a orientation-data correcting portion 10. When extracting the characteristic points I1n and the corresponding points I2n from the images picked up from the first point of view L1 and from the second point of view L2, respectively, the correspondence relationship extracting portion 2 extracts a plurality of candidates of the corresponding point I2n for each characteristic point I1n. The orientation-data correcting portion 10 calculates a correction value for the orientation of the monocular image-pickup portion 1, in which orientation the image is picked up from the second point of view L2, such that, by using the data of the orientation of the monocular image-pickup portion 1, in which orientation the image is picked up from the second point of view L2, corrected by using this correction value, the sum of the distances between the corresponding points I2n and the respective epipolar lines Ep1n is the minimum one. The orientation calculating portion 5 calculates the orientations of the monocular image-pickup portion 1, in which orientations the images are picked up from the first point of view L1 and from the second point of view L2, respectively, using the inclinations of the monocular image-pickup portion 1 with respect to the gravity direction detected by the gravity-direction detecting portion 3 and the rotation angles about the gravity direction of the monocular image-pickup portion 1 detected by the portion for detecting the rotation angles about the gravity direction 4, in which inclinations and rotation angles the images are picked up from the first point of view L1 and from the second point of view L2, respectively. Further, the orientation calculating portion 5 corrects the data of the orientation of the monocular image-pickup portion 1, in which orientation the image is picked up from the second point of view L2, using the correction value calculated by the orientation-data correcting portion 10, the inclination of the monocular image-pickup portion 1 with respect to the gravity direction detected by the gravity-direction detecting portion 3 and the rotation angle about the gravity direction of the monocular image-pickup portion 1 detected by the portion for detecting the rotation angles about the gravity direction 4, in which inclination and rotation angle the image is picked up from the second point of view L2.

Figure 10:
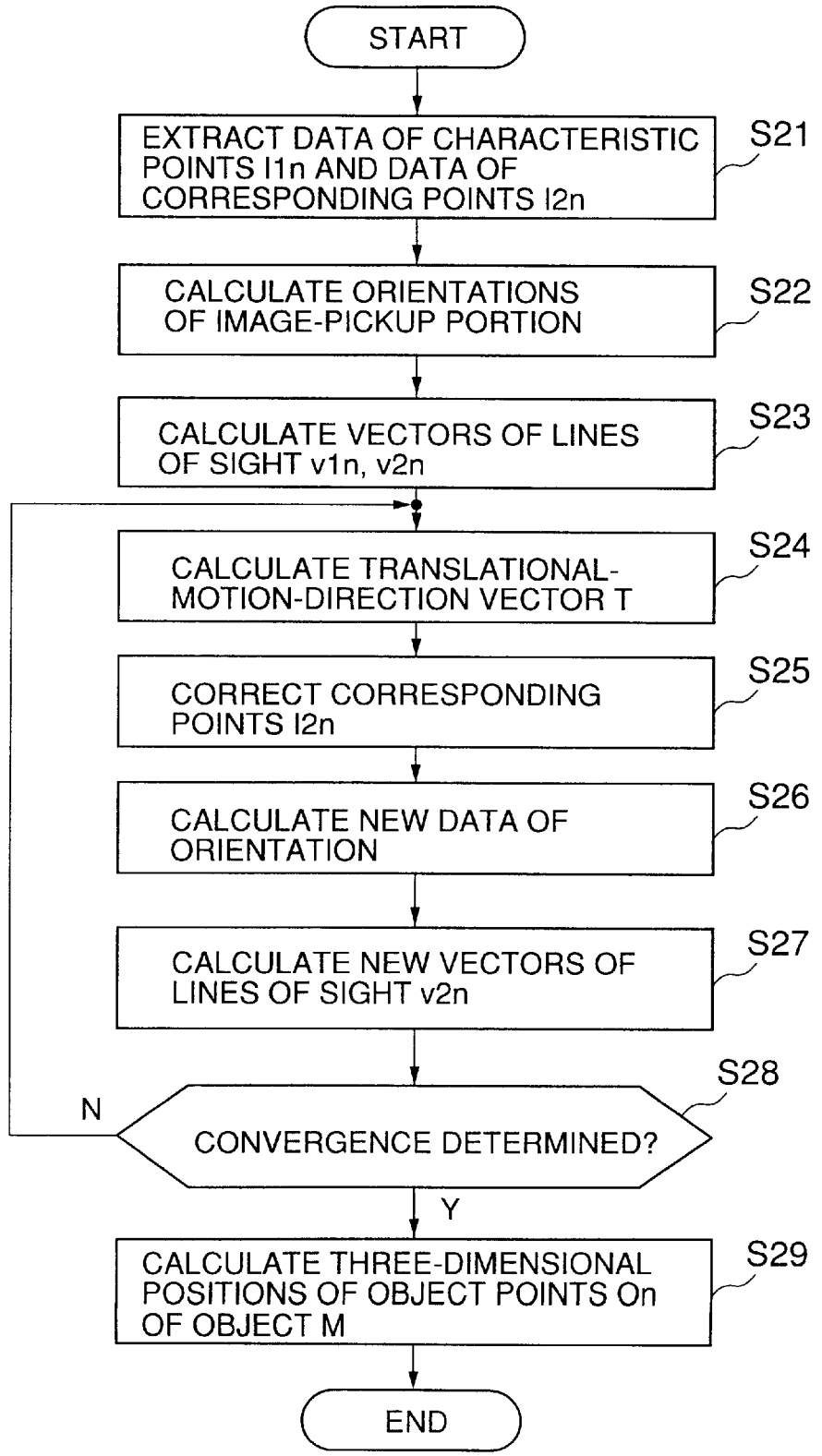
FIG. 10 shows a flowchart of operations of the third embodiment of the present invention.

The operations of the third embodiment will now be described with reference to FIG. 10 which shows a flowchart of the operations. The monocular image-pickup portion 1 sends the data of the images to the correspondence relationship extracting portion 2, the images having been picked up from the different points of views: the first point of view L1 and the second point of view L2. The correspondence relationship extracting portion 2 extracts the characteristic points I1n (n=1, 2, 3, ..., 7, in the example of FIG. 2) on the image picked up from the first point of view L1 and extracts a plurality of candidates of the corresponding point I2n (n=1, 2, 3, ..., 7, in the example of FIG. 2) for each characteristic point I1n on the image picked up from the second point of view L2. Specifically, when the corresponding point I2n is searched for, for each characteristic point I1n, the central points of a plurality of image areas having higher cross-correlations with the image area surrounding the characteristic point I1n are held as the candidates of the corresponding point I2n (in a step S21). After the characteristics points I1n and the candidates of the corresponding points I2n are extracted, the orientation calculating portion 5 calculates the orientations of the monocular image-pickup portion 1, in which orientations the images are picked up from the first point of view L1 and from the second point of view L2, respectively, using the inclinations of the monocular image-pickup portion 1 with respect to the gravity direction detected by the gravity-direction detecting portion 3 and the rotation angles about the gravity direction of the monocular image-pickup portion 1 detected by the portion for detecting the rotation angles about the gravity direction 4, in which inclinations and rotation angles the images are picked up from the first point of view L1 and from the second point of view L2, respectively (in a step S22). The portion for calculating vectors of lines of sight 6a selects one of the plurality of candidates of the corresponding point I2n for each characteristic point I1n, as the corresponding point I2n. Using the data of the orientations of the monocular image-pickup portion 1, in which orientations the images are picked up from the first and second points of view L1, L2, respectively, the characteristic points I1n and the selected corresponding points I2n, the portion for calculating vectors of lines of sight 6a calculates the vectors of lines of sight v1n, v2n (n=1, 2, 3, ..., 7, in the example of FIG. 2) which pass through the characteristic points I1n and the corresponding points I2n, respectively (in a step S23). Using the data of the vectors of lines of sight v1n, v2n, the translational-motion calculating portion 7 calculates the translational-motion-direction vector T (in a step S24). The portion for calculating vectors of lines of sight 6a uses the calculated translational-motion-direction vector T and corrects the positions of the corresponding points I2n. The method for correcting the corresponding points I2n is that in which, as shown in FIG. 6, using the calculated translational-motion-direction vector T, the epipolar lines Ep1n are drawn on the image plane P2 of the second point of view L2. Then, for each characteristic point I1n, the candidate of the plurality of candidates of the corresponding point I2n, which candidate is located nearest to a respective one of the epipolar lines Ep1n, is selected as the new corresponding point I2n. When the data of the orientation of the monocular image-pickup portion 1, in which orientation the image is picked up from the second point of view L2, is changed, the epipolar lines Ep1n move on the image plane P2. Therefore, the orientation-data correcting portion 10 calculates a correction value for the orientation, in which orientation the image is picked up from the second point of view L2, such that, by using the data of the orientation of the monocular image-pickup portion 1, in which orientation the image is picked up from the second point of view L2, corrected by using this correction value, the sum of the distances between the new corresponding points I2n and the respective epipolar lines Ep1n is the minimum one, using the steepest descent method or the like. The orientation calculating portion 5 calculates new data of the orientation of the monocular image-pickup portion 1, in which orientation the image is picked up from the second point of view L2, using the correction value calculated by the orientation-data correcting portion 10, the inclination of the monocular image-pickup portion 1 with respect to the gravity direction detected by the gravity-direction detecting portion 3 and the rotation angle about the gravity direction of the monocular image-pickup portion 1 detected by the portion for detecting the rotation angles about the gravity direction 4, in which inclination and rotation angle the image is picked up from the second point of view L2 (in a step S26). Then, the portion for calculating vectors of lines of sight 6a calculates new vectors of lines of sight v2n using the new data of the orientation of the monocular image-pickup portion 1, in which orientation the image is picked up from the second point of view L2 (in a step S27). Then, using the vectors of lines of sight v1n and the new vectors of lines of sight v2n, the translational-motion-direction vector T is calculated again by the translational-motion calculating portion 7. The selection of the corresponding points I2n, calculation of the correction value of the orientation of the monocular image-pickup portion 1, in which orientation the image is picked up from the second point of view L2, and the calculation of the translational-motion-direction vector T are repeated until the corresponding points I2n converge to approximately fixed points, respectively, or the number of the repetitive corrections reaches a certain value (a step S28). This convergence control is performed by the convergence-signal generating portion 9. Then, when the corresponding points I2n converge to approximately fixed points, respectively, or the number of the repetitive corrections reaches the certain value, the convergence-signal generating portion 9 generates the convergence signal and sends the signal to the translational-motion calculating portion 7. The three-dimensional-shape calculating portion 8 calculates, in accordance with the principle of triangulation, the three-dimensional coordinate values of the object points On (n=1, 2, 3, ..., 7, in the example of FIG. 2) on the object M, which correspond to the characteristic points I1n, respectively, using the translational-motion-direction vector T, which has been output from the translational-motion calculating portion 7 when the convergence signal is sent to the translational-motion calculating portion 7, and the vectors of lines of sight v1n, v2n. Thus, the data of the three-dimensional shape of the object M is obtained by and is output from the three-dimensional-shape calculating portion 8 (in a step S29).

Thus, by extracting a plurality of candidates of the corresponding point I2n for each characteristic point I1n, and adjusting the translational-motion-direction vector T and the corresponding points I2n by performing the repetitive selections of the corresponding points I2n, calculation of the correction value for the data of the orientation of the monocular image-pickup portion 1, in which orientation the image is picked up from the second point of view L2, and calculation of the translational-motion-direction vector T, a further-higher-accuracy three-dimensional-shape measurement apparatus can be achieved.

In each of the second and third embodiments, the convergence signal is output when the convergence state of the corresponding points I2n is confirmed by the convergence-signal generating portion 9. However, it is also possible that the convergence is detected by using an error curve which expresses the changes of the translational-motion direction vector T during the repetitive calculation of the translational-motion direction vector. Specifically, for example, the convergence signal may be output when it is confirmed by the convergence-signal generating portion 9 that the translational-motion-direction vector T has become approximately a fixed vector.

Figure 11:
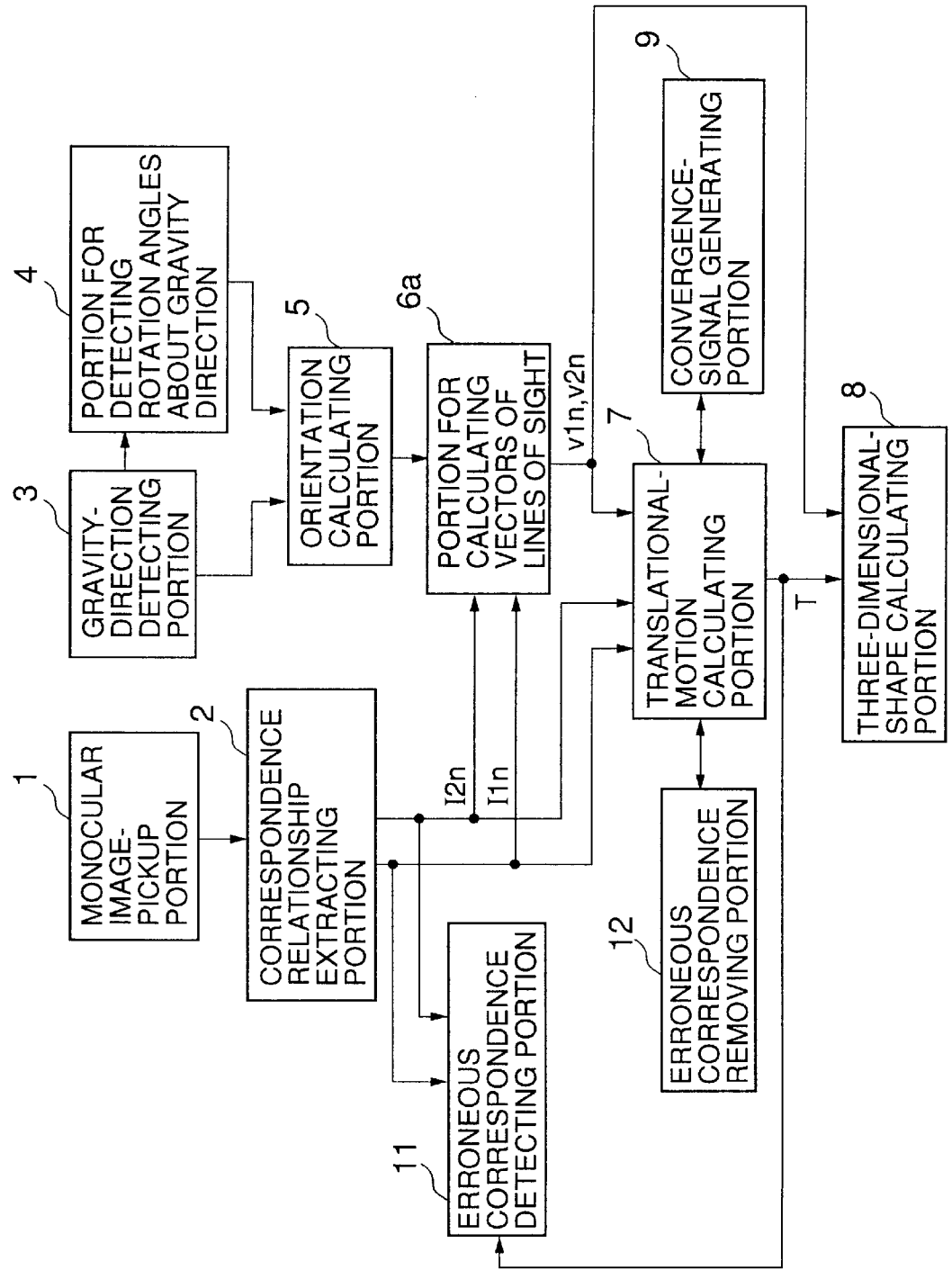
FIG. 11 shows a block diagram of the fourth embodiment of the present invention.

A three-dimensional-shape measuring apparatus in a fourth embodiment of the present invention removes erroneous correspondences between the extracted characteristic points I1n and corresponding points I2n, causes the translational-motion-direction vector T to converge to approximately a fixed vector and measures a three-dimensional shape. As shown in FIG. 11 which shows a block diagram of the apparatus, the three-dimensional-shape measuring apparatus in the fourth embodiment has an arrangement the same as the arrangement of the three-dimensional-shape measuring apparatus shown in FIG. 4 except that an erroneous correspondence detecting portion 11, an erroneous correspondence removing portion 12 and the convergence-signal generating portion 9 are provided. The erroneous correspondence detecting portion 11 detects erroneous correspondences between the characteristic points I1n and the corresponding points I2n extracted from the images picked up from the first point of view L1 and from the second point of view L2, respectively, using the translational-motion-direction vector T which is repetitively calculated by the translational-motion calculating portion 7. The erroneous correspondence removing portion 12 removes the characteristic points and the corresponding points, the correspondences between which are erroneous, respectively. The convergence-signal generating portion 9 detects convergence of the translational-motion-direction vector T. When detecting the convergence of the translational-motion-direction vector T, the convergence-signal generating portion 9 outputs the convergence signal.

Figure 12:
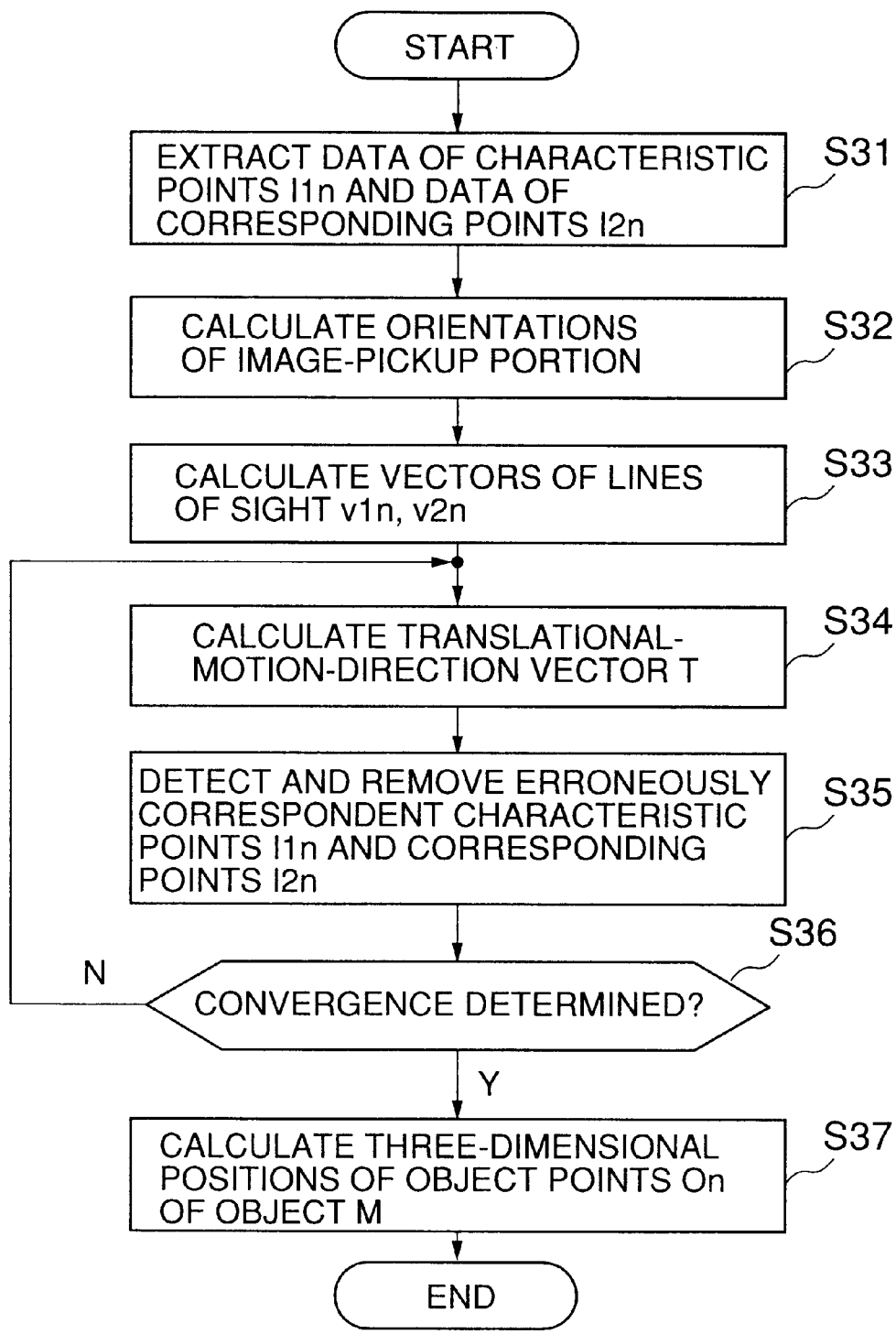
FIG. 12 shows a flowchart of operations of the fourth embodiment of the present invention.

With reference to FIG. 12 which shows a flowchart of operations of the fourth embodiment, the operations of the fourth embodiment will now be described. The monocular image-pickup portion 1 sends the images picked up from the different first and second points of view L1, L2, respectively, to the correspondence relationship extracting portion 2. The correspondence relationship extracting portion 2 extracts the characteristic points I1n (n=1, 2, 3, ..., 7, in the example of FIG. 2) on the image picked up from the first point of view L1 and extracts the corresponding points I2n (n=1, 2, 3, ..., 7, in the example of FIG. 2) on the image picked up from the second point of view L2 (in a step S31). After the characteristics points I1n and the corresponding points I2n are extracted, the orientation calculating portion 5 calculates the orientations of the monocular image-pickup portion 1, in which orientations the images are picked up from the first point of view L1 and from the second point of view L2, respectively, using the inclinations of the monocular image-pickup portion 1 with respect to the gravity direction detected by the gravity-direction detecting portion 3 and the rotation angles about the gravity direction of the monocular image-pickup portion 1 detected by the portion for detecting rotation angles about the gravity direction 4, in which inclinations and rotation angles the images are picked up from the first point of view L1 and from the second point of view L2, respectively (in a step S32). Using the data of the orientations of the monocular image-pickup portion 1, in which orientations the images are picked up from the first and second points of view L1, L2, respectively, the characteristic points I1n and the corresponding points I2n, the portion for calculating vectors of lines of sight 6 calculates the vectors of lines of sight v1n, v2n (n=1, 2, 3, ..., 7, in the example of FIG. 2) which pass through the characteristic points I1n and the corresponding points I2n, respectively (in a step S33). Using the data of the vectors of lines of sight v1n, v2n, the translational-motion calculating portion 7 calculates the translational-motion-direction vector T (in a step S34). The translational-motion-direction vector T is obtained in the step S34 as a result of repetitive calculation being performed so that the sum of the scalar triple products (v1n33 T, v2n) of the vectors of lines of sight v1n, v2n and the translational-motion-direction vector T for the respective object points On (n=1, 2, 3, . . . , 7, in the example shown in FIG. 2) is minimized. When the number of the repetitions of the calculation has reached a fixed number, the erroneous correspondence detecting portion 11 detects the erroneous correspondences between the characteristic points I1n and the corresponding points I2n, respectively, using the translational-motion-direction vector T obtained when the number of the repetitions of the calculation has reached the fixed number. The characteristic points I1n and the corresponding points I2n, the correspondences between which have been determined to be erroneous, respectively, by the erroneous correspondence detecting portion 11, are removed by the erroneous correspondence removing portion 12 (in a step S35). The translational-motion calculating portion 7 calculates the translational-motion-direction vector T using the vectors of lines of sight v1n and v2n. The vectors of lines of sight v1n and v2n to be used by the translation-motion calculating portion 7 to calculate the translational-motion-direction vector T are those calculated by using the data of the characteristic points I1n and the corresponding points I2n, respectively, which have been obtained as a result of the characteristic points I1n and the corresponding points I2n, the correspondences therebetween having been determined erroneous by the erroneous correspondence detecting portion 11, being removed by the erroneous correspondence removing portion 12 in the step S35 (in steps S36, S34). This detection of the characteristic points I1n and the corresponding points I2n, the correspondences therebetween being determined to be erroneous, respectively is as follows: When the scalar triple product $Si=(v1i \times T, v2i)$ of the vectors of lines of sight v1i and v2i and the translational-motion-direction vector T is larger than a predetermined threshold value TH1, the correspondence between the characteristic point I1i and the corresponding point I2i is determined to be erroneous. When the detection and removal of the characteristic points I1n and the corresponding points I2n, the correspondences therebetween being determined to be erroneous, respectively, and the calculation of the translational-motion-direction vector T are repeated, the convergence signal generating portion 9 determines whether or not the translational-motion-direction vector T has converged (in a step S36). This determination of the convergence of the translational-motion-direction vector T is as follows: When the degree of convergence of the translational-motion-direction vector T, $D=(T_n-T_{n-1})^2$ is not smaller than a threshold value TH2, it is determined that the translational-motion-direction vector T has not converged. When the degree of convergence of the translational-motion-direction vector T, $D=(T_n-T_{n-1})^2$ is smaller than the threshold value TH2, it is determined that the translational-motion-direction vector T has converged. When the degree of convergence D has become smaller than the threshold value TH2, the convergence signal generating portion 9 determines that the translational-motion-direction vector T has converged and sends the convergence signal to the translational-motion calculating portion 7. Using the translational-motion-direction vector T, which has been determined to have converged, and the vectors of lines of sight v1n, v2n (n=1, 2, 3, . . . , 7, in the example of FIG. 2), the three-dimensional-shape calculating portion 8 calculates the three-dimensional positions of the object points On (n=1, 2, 3, . . . , 7, in the example of FIG. 2) and thus obtains the data of the three-dimensional shape of the object M (in step S37).

Because the translational-motion-direction vector T is calculated after the characteristic points I1n and the corresponding points I2n, the correspondences therebetween having been determined to be erroneous, are removed, even when the characteristic points I1n and the corresponding points I2n, the correspondences therebetween having been determined to be erroneous, are included in the extracted characteristic points I1n and corresponding points I2n, it is possible to measure a three-dimensional shape with a higher accuracy.

Each of the above embodiments includes the acceleration sensors for detecting the accelerations for the three orthogonal axes, respectively. However, it is also possible to detect the gravity direction using information of the images picked up by the monocular image-pickup portion 1. Generally, the monocular image-pickup portion 1 such as a digital camera or the like is not used in a manner in which the monocular image-pickup portion 1 is inclined significantly. Further, there are many cases in which an artificial object to be measured has a corner extending in the gravity direction. Therefore, it is possible to suppose that an edge, in the picked-up image, which is long approximately in the vertical direction, corresponds to an edge extending in the gravity direction on the object. Therefore, the rotation angle, through which the picked-up image is rotated so that this edge in the image comes to extend in the vertical direction, is obtained, and, using the thus-obtained rotation angle, the direction vector extending in the gravity direction can be obtained.

Further, the portion for detecting rotation angles about the gravity direction 4 of each of the above-described embodiments is provided with the magnetism sensors for measuring the magnetic forces for three orthogonal axes, respectively, and, using the direction vector extending in the gravity direction detected by the gravity-direction detecting portion 3 and the magnetic-field direction vector detected by the magnetism sensors, the rotation angle of the monocular image-pickup portion 1 about the gravity direction is detected. However, it is also possible that the rotation angle of the monocular image-pickup portion 1 about the gravity direction is detected using only the magnetism sensors. In this case, for example, the coordinate system of the monocular image-pickup portion 1 is set so that each of the x, y axes extends on the image plane and the z axis extend perpendicular to the image plane. Then, two-dimensional magnetism sensors are disposed in the monocular image-pickup portion 1 in a manner so that the direction of the magnetic force on the x-z plane is detected. It is assumed that, when the monocular image-pickup portion 1 such as a digital camera or the like is moved between the first point of view L1 and the second point of view L2, the monocular image-pickup portion 1 does not significantly incline, and each of the rotation about the x axis and the rotation about the z axis is small. As a result, the direction vector, detected by the two-dimensional magnetism sensors, having the components of the x axis and z axis, and having no component of the y axis, extends in the direction of the South Pole or the North Pole. Therefore, the rotation angle about the gravity direction can be obtained by using the angle at which the z axis of the monocular image-pickup portion 1 inclines to the direction vector detected by the two-dimensional magnetism sensors.

Further, when the correspondence relationship extracting portion 2 extracts the characteristic points I1n and the corresponding points I2n, it is preferable that, using the correlation values obtained when the corresponding points I2n are extracted (searched for), or the like, values of weights Wn for the characteristic points I1n and the corresponding points I2n are calculated, respectively, at the same time. Then, the translational-motion calculating portion 7 calculates the translational-motion-direction vector T in a manner in which a repetitive calculation is performed so that the sum of the scalar triple products, including the values of the weights Wn, Sn=Wn(v1n×T, v2n) for the respective object points On on the object M (n=1, 2, 3, . . . , 7, in the example of FIG. 2) is minimized. Thus, it is possible to measure the three-dimensional shape of the object with a higher accuracy.

Further, it is preferable to form the three-dimensional-shape apparatus such that it is possible to select whether the data of the three-dimensional shape calculated by the three-dimensional-shape calculating portion 8 is output or the data of the orientations calculated by the orientation calculating portion 5 and the translational-motion-direction vector T calculated by the translational-motion calculating portion 7 are output. Thereby, it is possible that only the data of the orientations and the translational-motion-direction vector T are output. As a result, when only the data of the camera motion is needed, the amount of the memory, the time required for the calculations, and power required for the calculations can be reduced.

Figure 13:
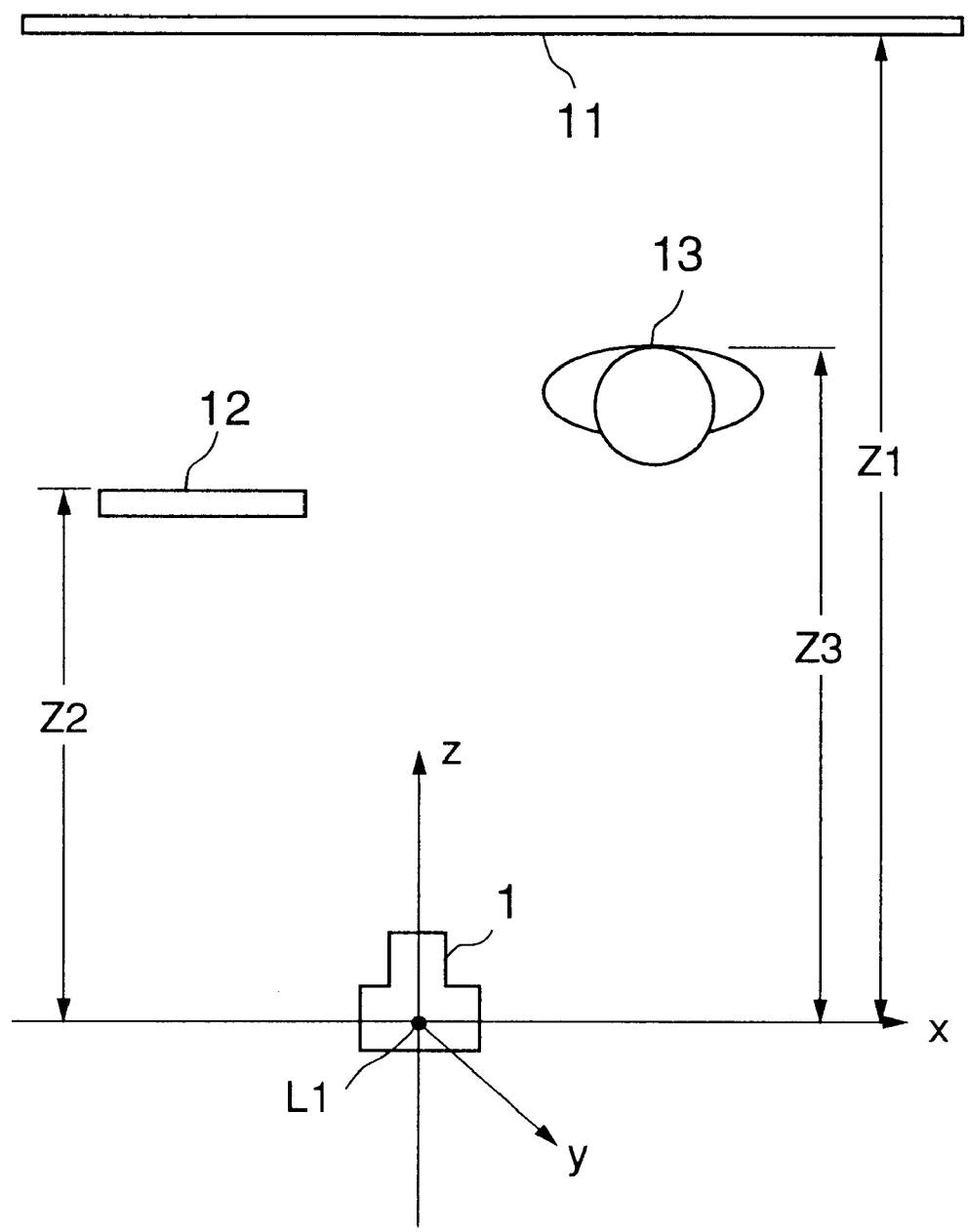
FIG. 13 shows an arrangement of a concrete example of the present invention.

A concrete example when the three-dimensional-shape measuring apparatus in the first embodiment measures the data of the three-dimensional-shape of objects will now be described. A digital camera is used as the monocular image-pickup portion 1. Three-axis acceleration sensors and three-axis magnetism sensors, as the gravity-direction detecting portion 3 and the portion for detecting rotation angles about the gravity direction 4, are loaded in the digital camera 1. Then, as shown in FIG. 13, a plane plate 12 and a human being 13 in front of a wall 11 are used as the objects to be measured. Then, the image is picked up by the digital camera 1 from the first point of view L1 and, after the digital camera 1 is moved, the image is picked up by the digital camera 1 from the second point of view L2. As shown in FIG. 13, the x axis extends in a direction parallel to the wall 11 and passes through the first point of view L1. The y axis extends in the gravity direction and passes through the first point of view L1. The z axis extends in the direction of the optical axis of the digital camera L1, in which direction of the optical axis the image is picked up from the first point of view L1, and the z axis passes through the first point of view L1. The distance Z1 between the x axis and the wall 11 is 400 cm, the distance Z2 between the x axis and the plane plate 12 is 250 cm, and the distance Z3 between the x axis and the human being 13 is 300 cm. The image is picked up by the digital camera 1 from the first point of view L1. Then, the digital camera 1 is caused to perform translational motion in the x-axis direction by 40 cm, in the y-axis direction by −7 cm, and is rotated about the x axis through an angle of −2 degrees and about the y axis through an angle of −8 degrees. Thus, the digital camera 1 is moved to the second point of view L2. The results of calculating the amounts of change of the position and the orientation of the digital camera 1 are as follows:

x-axis-directional movement: 39.9 cm;
y-axis-directional movement: −7.6 cm;
z-axis-directional movement: 0.6 cm;
about-x-axis rotation: −1.8 degrees;
about-y-axis rotation: −8.1 degrees;
about-z-axis rotation: −0.1 degree.

Figure 14:
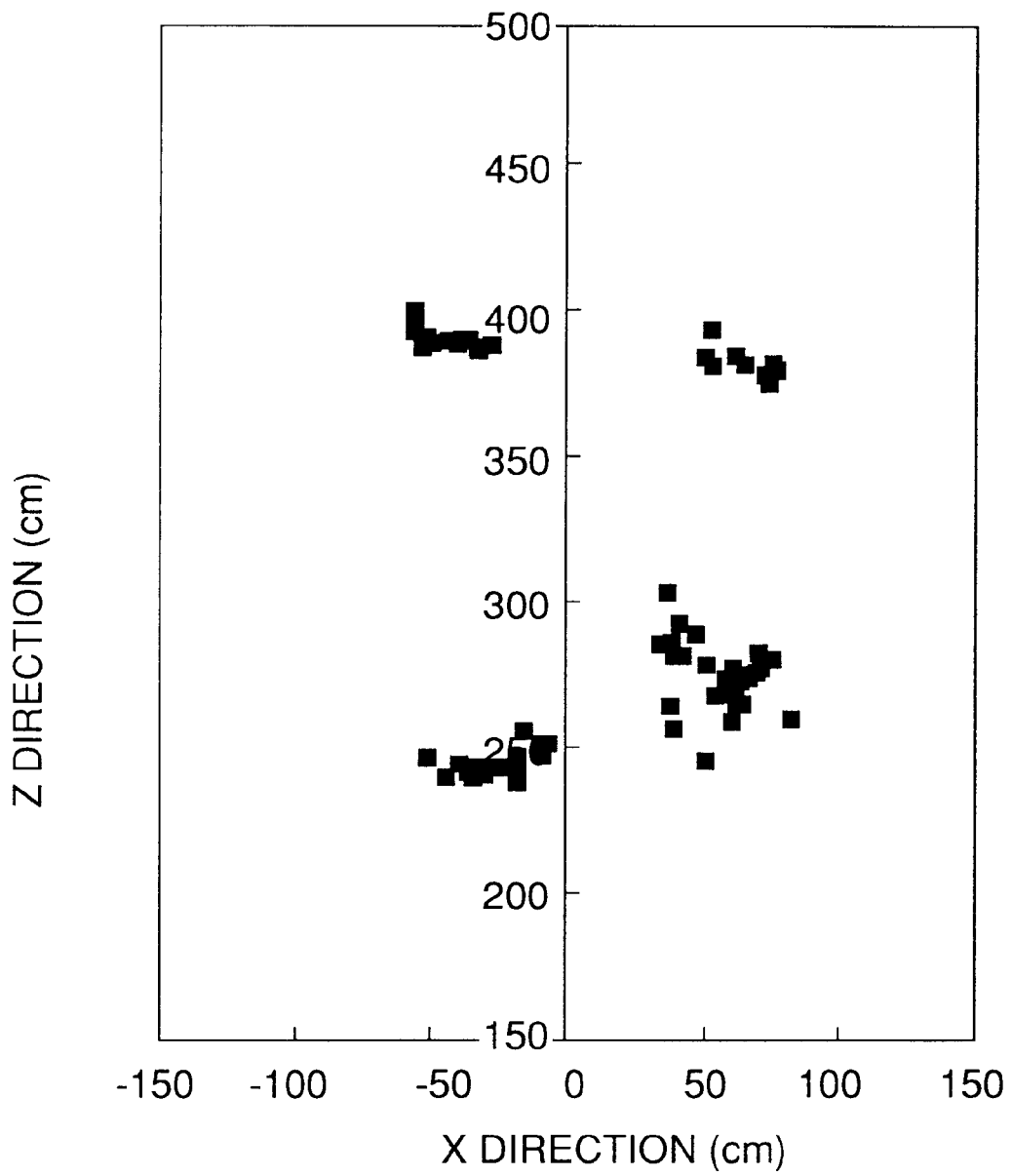
FIG. 14 shows the three-dimensional positions of object points on an object (corresponding to the characteristic points)

The three-dimensional positions of the object points on the objects (corresponding to the characteristic points) are shown in FIG. 14. It is understood, by seeing the above-mentioned calculated amounts of change of the position and the orientation of the digital camera 1 and FIG. 14, that the three-dimensional shapes of the objects can be measured. In this case, only the relative values of the positions of the object points on the objects and the movement of the camera 1 are obtained, and it is not possible to calculate the absolute values of the positions of the object points (corresponding to the characteristic points) shown in FIG. 14. However, when the absolute distance of the movement of the camera 1 or the absolute distance between one object point of the objects (corresponding to the characteristic points) and the camera is detected, the absolute values of the object points of the objects can be calculated. Therefore, the absolute value of the distance of the movement of the camera 1 is calculated by using the data detected by an acceleration sensor which the camera 1 is provided with. Then, using the thus-obtained absolute value, the absolute values of the respective object points (corresponding to the characteristic points) are obtained.

The above-described calculations performed by the three-dimensional-shape measuring apparatus of each embodiment can be performed by a general-purpose computer that is specially configured by software executed therein to carry out these calculations.

Thus, according to the present invention, by combining the information of the gravity direction, the information of the rotation angles about the gravity direction, and the information of the images picked up from the two points, a high-accuracy three-dimensional shape measurement can be achieved, and also, the apparatus therefor can be miniaturized.

Further, by performing adjustment by repeating the correction of the extracted corresponding points using the calculated translational-motion-direction vector, and the calculation of the translational-motion-direction vector using the thus-corrected corresponding points, a higher-accuracy three-dimensional-shape measurement can be achieved.

Further, by extracting candidates of the corresponding point for each characteristic point, selecting the optimum corresponding point for each characteristic point by repeating the calculation of the translational-motion-direction vector and the correction of the corresponding points, and thus adjusting the translational-motion-direction vector and the corresponding points, a further-higher-accuracy three-dimensional-shape measurement can be achieved.

Further, by removing the erroneously correspondent characteristic points and corresponding points, and, then, calculating the translational-motion-direction vector, even when the extracted characteristic points and corresponding points include the erroneously correspondent characteristic points and corresponding points, a three-dimensional shape can be measured with a higher accuracy.

Further, by determining convergence of the translational-motion-direction vector based on the translation-motion-direction vector when the correction of the translational-motion-vector is repeated, it is possible to perform a convergence determination with high speed.

Further, by detecting the gravity direction using acceleration sensors or the information of a picked-up image and/or detecting the rotation angles of the monocular image-pickup portion about the gravity direction using a magnetism sensor (s), the gravity direction and/or the rotation angles of the monocular image-pickup portion about the gravity direction can be detected with a simple arrangement in the three-dimensional-shape measurement.

Further, by calculating the values of the weights for the characteristic points I1n and the corresponding points I2n, respectively, by using the correlation values obtained when the corresponding points are extracted (searched for), and by calculating the translational-motion-direction vector using the thus-calculated values of the weights, it is possible to measure the three-dimensional shape of an object to be measured and the movement of the monocular image-pickup portion with higher accuracy.

An image pickup (or picture taking) apparatus and a method for synthesizing images picked up (or pictures taken) by an image pickup apparatus according to the present invention relate to an image pickup apparatus such as an electronic camera or the like and a method for synthesizing images picked up by such an image pickup apparatus, and, in particular, to such an apparatus and a method which enable picking up an image when an object, an image of which is to be picked up, is large or an object, an image of which is to be picked up, cannot be moved.

An image pickup (or picture taking) apparatus according to the present invention includes an image pickup (or picture taking) portion, a motion detecting portion, a correspondence relationship extracting portion, a three-dimensional-position measuring portion, a plane calculating portion and a projection calculating portion. The image pickup portion picks up images (or takes pictures) of an object plane to be input, from a plurality of (for example, two) points of view in a manner in which each image has a portion which corresponds to a portion of another image. The motion detecting portion detects the change of the orientation, that is, the angle of the image pickup portion, and the change of the position of the point of view of the image pickup portion when the image pickup portion picks up an image from each point of view. The correspondence relationship extracting portion extracts a plurality of characteristic points from a previously picked-up image, which points correspond to object points on the object plane to be input, respectively, and extracts corresponding points from a currently picked-up image, the corresponding points being points on the currently picked-up image which correspond the characteristic points on the previously picked-up image, respectively. The three-dimensional-position measuring portion calculates the three-dimensional position of each object point on the object plane to be input, based on the change of the orientation of the image pickup portion and the change of the position of the point of view of the image pickup portion detected by the motion detecting portion, and the characteristic points and the corresponding points extracted by the correspondence relationship extracting portion. In order to calculate the three-dimensional position of each object point of the object plane to be input, for example, based on the change of the orientation of the image pickup portion occurring when the image pickup portion moves from a position at which up an image is picked up from a previous point of view (referred to as a 'first point of view', hereinafter) to a position at which an image is picked up from a current point of view (referred to as a 'second point of view', hereinafter), the vector extending from the optical center of the first point of view of the image pickup portion to each characteristic point and the vector extending from the optical center of the second point of view of the image pickup portion to each corresponding point are calculated (hereinafter, these vectors being referred to as 'vectors of lines of sight'). Then, based on the data of the calculated vectors of lines of sight and the change of the position of the point of view of the image pickup portion, in accordance with the principle of triangulation, the three-dimensional position of each object point of the object plane to be input, is calculated.

The plane calculating portion assumes that the position of each object point, calculated by the three-dimensional-position measuring portion, is present on the same plane, and calculates an equation of the plane which fits the respective object points, based on the three-dimensional positions of the respective object points measured by the three-dimensional-position measuring portion, using, for example, the least-squares method. Based on the change of the orientation and the change of the position of the point of view detected by the motion detecting portion, and the equation of the plane calculated by the plane calculating portion, the projection calculating portion performs calculations so as to virtually project each image picked up by the image pickup portion on the same arbitrary virtual image plane, synthesizes the images picked up from the plurality of points of view, and thus restores the image of the object plane to be input.

Figure 15:
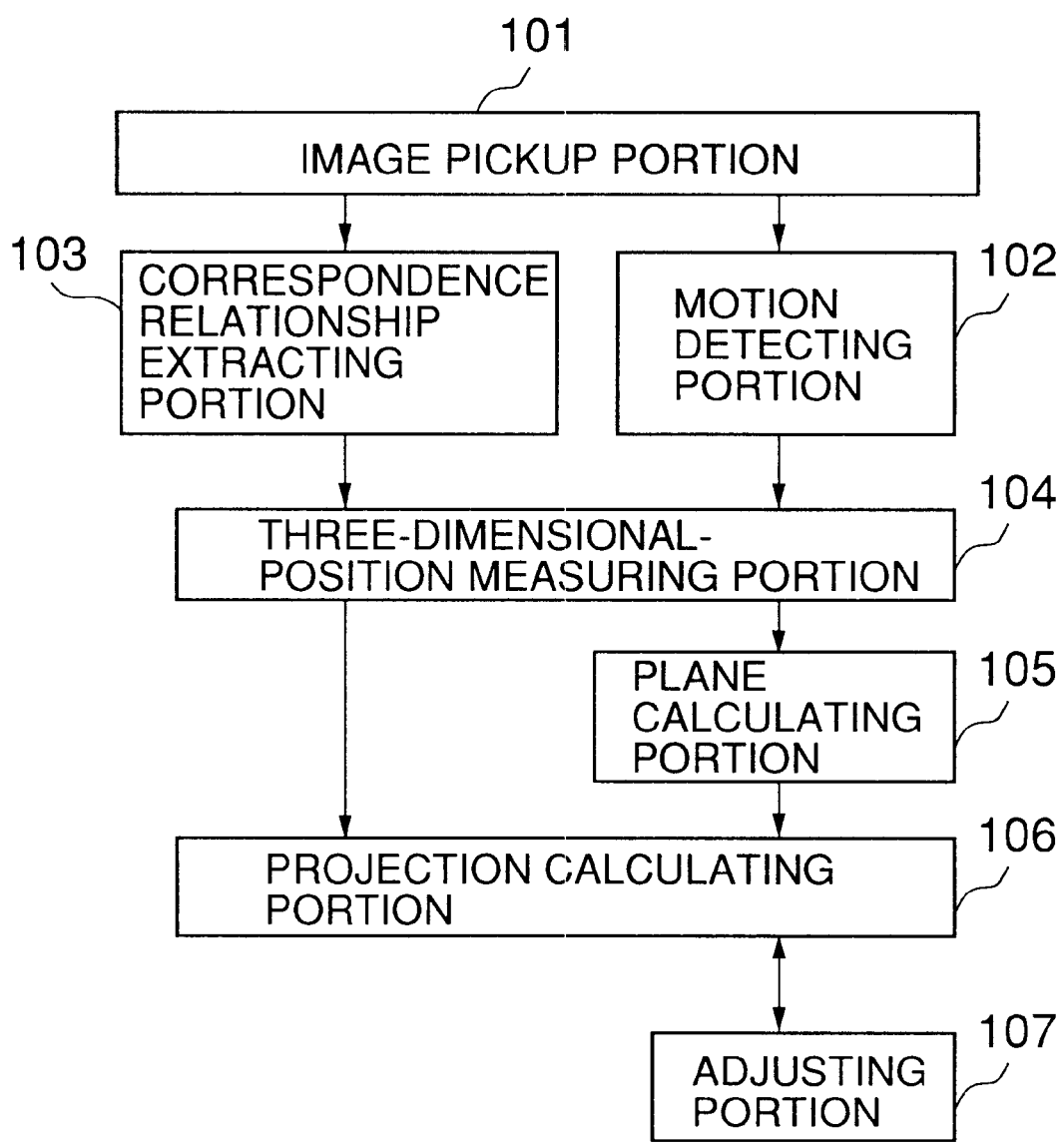
FIG. 15 shows a block diagram of an image pickup apparatus in a fifth embodiment of the present invention.
Figure 16A:
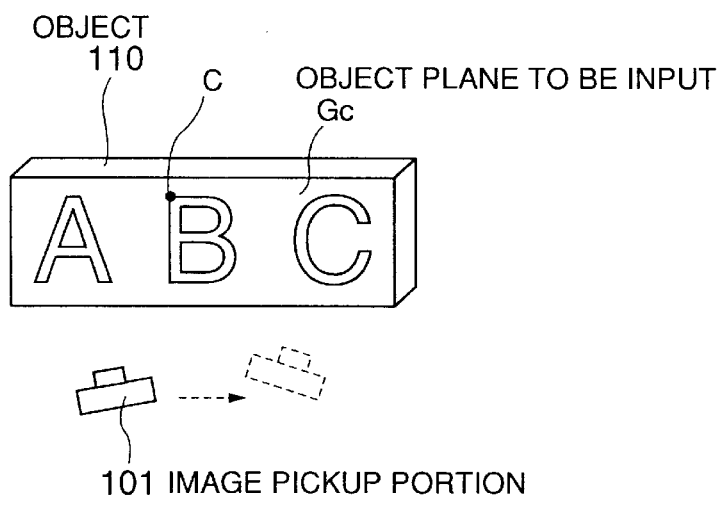
FIGS. 16A, 16B and 16C show a relationship of a first image and a second image with an object plane to be input.
Figure 16B:
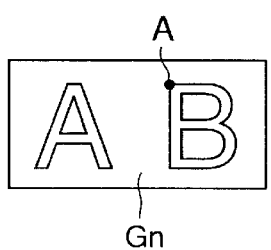
Figure 16C:
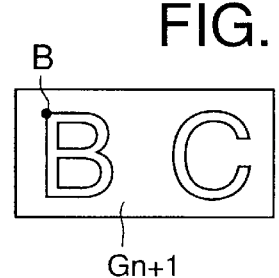

FIG. 15 shows a block diagram of an image pickup (or picture taking) apparatus in a fifth embodiment of the present invention. As shown in the figure, the image pickup apparatus includes, for example, an image pickup portion 101, a motion detecting portion 102, a correspondence relationship extracting portion 103, a three-dimensional-position measuring portion 104, a plane calculating portion 105, a projection calculating portion 106 and an adjusting portion 107. The image pickup portion 101 is provided with, for example, a CCD area sensor, and, for example, picks up images (or takes pictures) of an object plane to be input Gc, shown in FIG. 16A, from a plurality of (for example, two) points of view in a manner in which a portion of one picked-up image corresponds to a portion of another picked-up image, as shown in FIGS. 16B and 16C (in the example of FIGS. 16A, 16B and 16C, a portion including the alphabet letter 'B' of the image on the image plane Gn corresponds to a portion including the alphabet letter 'B' of the image on the image plane Gn+1). Hereinafter, in order to simplify descriptions, it is assumed that the image pickup portion 101 picks up images from two points of view. When a characteristic point of the image picked-up from a first point of view (referred to as a 'first image', hereinafter) is determined to be a point A shown in FIG. 16B, which point corresponds to an object point C on the object plane to be input Gc shown in FIG. 16A, the corresponding point, corresponding to the characteristic point A of the image picked-up from the first point of view, of the image picked-up from a second point of view (referred to as a 'second image', hereinafter) is determined to be a point B shown in FIG. 16C.

The motion detecting portion 102 detects the change of the orientation of the image pickup portion 101, that is, the angle of the image pickup portion 101, with respect to the object plane to be input Gc, and the change of the position of the point of view of the image pickup portion 101, occurring when the image pickup portion 101 picks up each image of the object plane to be input Gc. The correspondence relationship extracting portion 103 extracts a plurality of characteristic points Ai, which correspond to object points Ci on the object plane to be input Gc, respectively (where 'i' is an integer, and indicates an order of the object points Ci), from the first image, and extracts the corresponding points Bi from the second image, the corresponding points Bi of the second image corresponding to the characteristic points Ai of the first image, respectively. The three-dimensional-position measuring portion 104 calculates the three-dimensional position (Xio, Yio, Zio) of each object point Ci based on the change of the orientation and the change of the position of the point of view of the image pickup portion 101 detected by the motion detecting portion 102, and the data of the characteristic points Ai and the corresponding points Bi extracted by the correspondence relationship extracting portion 103. In order to calculate the three-dimensional position of each object point Ci, for example, the optical center O1 of the image plane (referred to as a 'first image plane', hereinafter) in the case where the first image is picked up by the image pickup portion 101 is treated as an origin, and, based on the change of the orientation of the image pickup portion 102 occurring when the image pickup portion 102 moves from the position at which the image pickup portion 102 picks up the first image to the position at which the image pickup portion picks up the second image, a vector v1$i$ extending from the optical center O1 of the first point of view to each characteristic point Ai and a vector v2$i$ extending from the optical center O2 of the second point of view to each corresponding point Bi (hereinafter, referred to as 'vectors of lines of sight') are calculated. Using the calculated vectors of lines of sight v1$i$ and v2$i$ and the change of the position of the point of view, in accordance with the principle of triangulation, the three-dimensional position (Xio, Yio, Zio) of each object point Ci is calculated.

Figure 17:
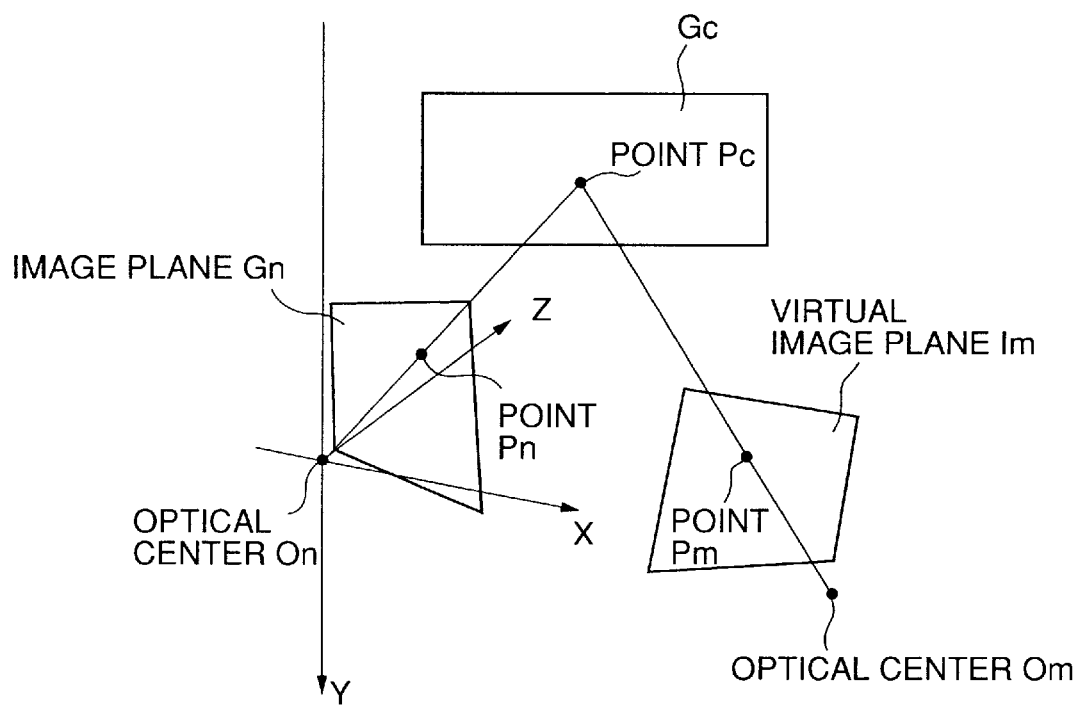
FIG. 17 illustrates a principle of projection of an image.

The plane calculating portion 105 assumes that the positions of the respective object points Ci, calculated by the three-dimensional-position measuring portion 104, are present on the same plane, and, based on the three-dimensional positions (Xio, Yio, Zio) of the respective object points Ci measured by the three-dimensional-position measuring portion 104, using, for example, the least-squares method, the plane calculating portion 105 calculates an equation of the plane which fits the respective object points Ci. Based on the change of the orientation and the change of the position of the point of view of the image pickup portion 101 detected by the motion detecting portion 102 and the equation of the plane calculated by the plane calculating portion 105, the projection calculating portion 106 performs calculations so as to virtually project each image picked up by the image pickup portion 101 on the same arbitrary virtual image plane, and synthesizes the respective images picked up from the two points of view. With reference to FIG. 17, operations of virtually projecting the respective images, picked up by the image pickup portion 101, on the same arbitrary virtual image plane will now be described.

Figure 18:
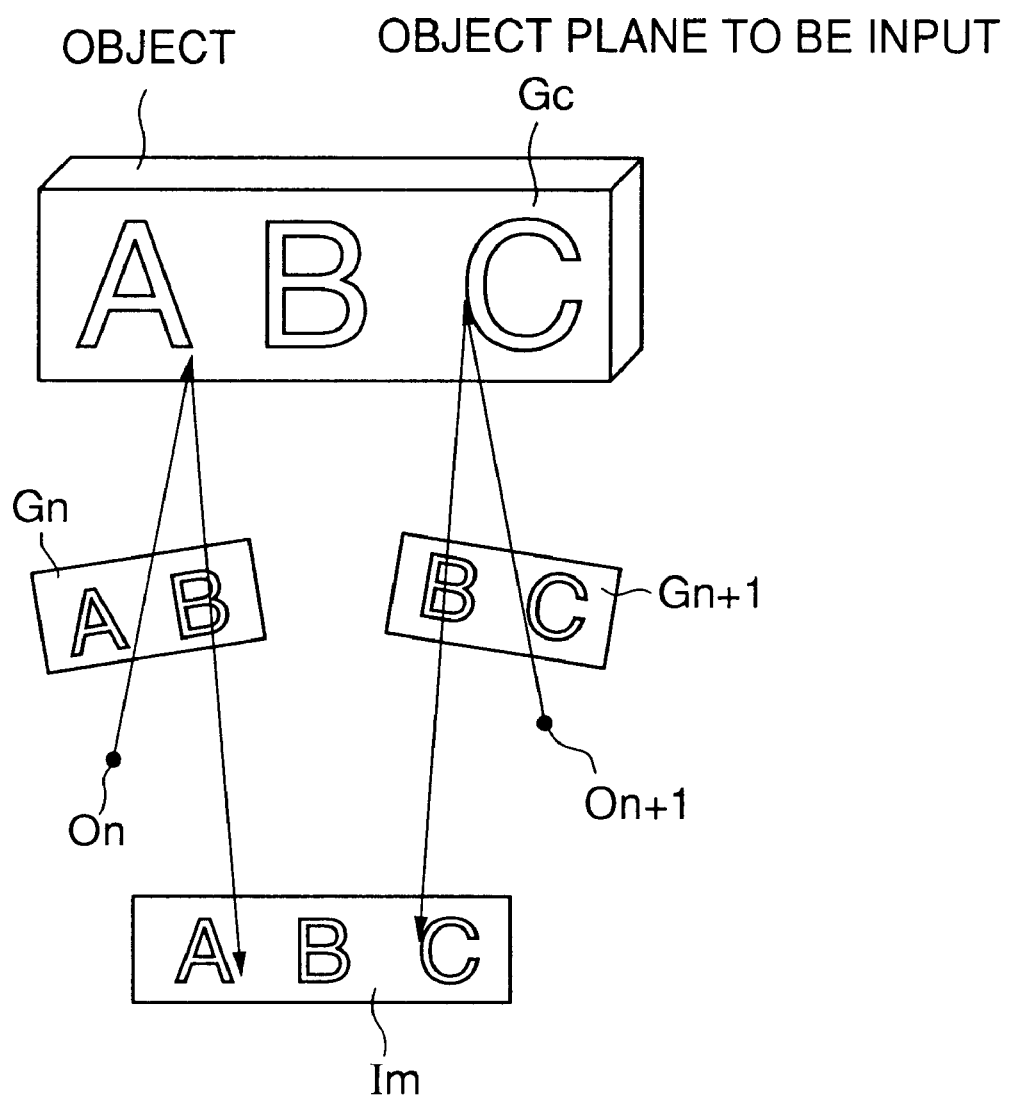
FIG. 18 illustrates a principle of synthesizing of images.

The point at which a straight line extending between a point Pn on an image plane Gn obtained from a point of view and the optical center On of this point of view intersects the plane Gc calculated by the plane calculating portion 105 is referred to as a point Pc. A virtual image plane on which a newly synthesized image is to be virtually projected is referred to as Im, and the optical center of the virtual image plane Im is referred to as Om. A pixel is mapped at the point Pm at which a straight line extending between the point Pc and the optical center Om intersects the virtual image plane Im. This operation is performed for all the necessary pixels, and thereby, as shown in FIG. 18, a new image is formed on the virtual image plane Im. This processing is performed for each image picked up by the image pickup portion 101, and the respective images picked up by the image pickup portion 101 are virtually projected on the same arbitrary virtual image plane Im. Thereby, the images picked up from the two points of view are synthesized. The thus-formed image may be stored in a storage device (not shown in the figures), may be indicated through a display device (not shown in the figure), or may be printed out through a printing device (not shown in the figures).

The adjusting portion 107 performs fine adjustment of the position, at which each image is to be projected, and the scale of each image to be projected, in a manner in which the cross-correlation value between the corresponding portions of the respective picked-up images (in the example of FIGS. 16A, 16B and 16C, the portions, each including the alphabet letter 'B', of the images on the image planes Gn and Gn+1), which portions are superimposed on the virtual image plane Im, is maximized when the respective images picked up by the image pickup portion 101 are projected on the virtual image plane Im. Because the images of the object plane to be input Gc are picked up in a manner, as shown in FIGS. 16A, 16B and 16C, in which a portion of one image corresponds to a portion of the other image, the portions of the picked-up images can be superimposed on the image plane Im when the picked-up images are projected on the virtual image plane Im. The image of the portion of the first image is expressed as Jn(x, y) and the image of the portion of the second image is expressed as Jm(x, y), the portion of the first image corresponding to the portion of the second image, as mentioned above. Then, δx and δy are obtained in the manner in which the following value S of the correlation function is maximized:

$$S = \sum_x \sum_y In(x, y) \times Im(x + \delta x, y + \delta y)$$

Then, the all pixels of the second image are shifted by δx and δy.

Figure 19:
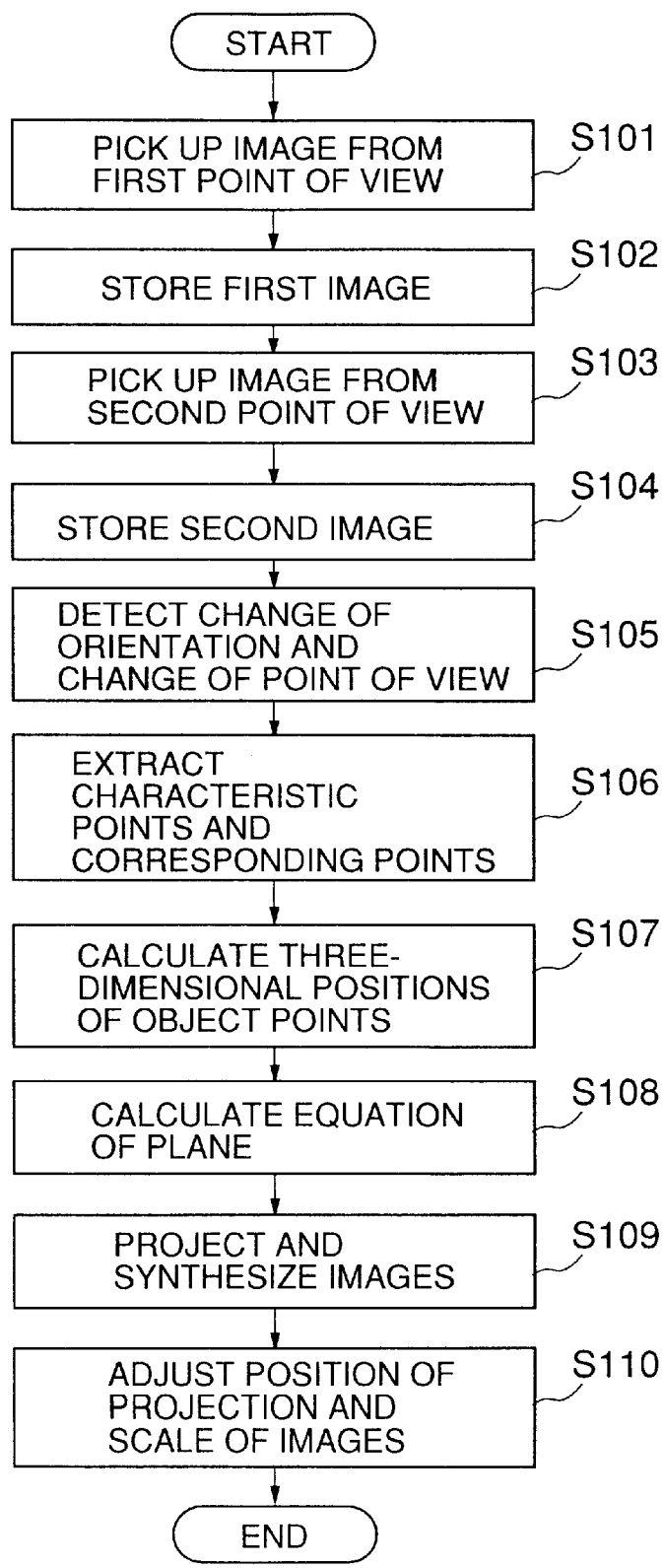
FIG. 19 shows a flowchart of an image pickup apparatus in the fifth embodiment of the present invention.

Operations of the above-described image pickup apparatus will now be described with reference to FIG. 19 which shows a flowchart of the operations.

The image pickup portion 101 picks up an image of the object plane to be input Gc from the first point of view and the picked-up image is stored in a storage device, as the first image (in steps S101, S102). Then, a user moves the image pickup portion 101 so that the image pickup portion 101 picks up an image of the object plane to be input Gc from the second point of view, a portion of the thus-picked-up image corresponding to a portion of the first image stored in the storage device in the step S102. The image picked up from the second point of view is stored in the storage device, as the second image (in steps S103, S104). Thus, the first and second images are picked up in the manner in which the portion of the first image corresponds to the portion of the second image as shown in FIGS. 16A, 16B and 16C. Thereby, it is easy to detect the relationship between the first and second images picked up by the image pickup portion 101.

The motion detecting portion 102 detects the change of the orientation and the change of the position of the point of view of the image pickup portion 101 occurring when the image pickup portion 101 moves from the position at which the image pickup portion 101 picks up the first image to the position at which the image pickup portion 101 picks up the second image (in a step S105). The correspondence relationship extracting portion 103 extracts the characteristic points Ai (corresponding to the object points Ci on the object plane to be input Gc, respectively) from the first image, and the corresponding points Bi from the second image, the extracted characteristic points Ai corresponding to the extracted corresponding points Bi, respectively (in a step S106). Thereby, it is possible to detect a correspondence relationship between the first image and the second image. (The method for extracting the characteristic points Ai and the corresponding points Bi may be, for example, the same as the method for extracting the characteristic points I1$n$ and the corresponding points I2$n$ in the first embodiment described above.) The three-dimensional-position measuring portion 104 calculates the three-dimensional position (Xio, Yio, Zio) of each object point Ci, based on the change of the orientation and the change of the position of the point of view of the image pickup portion 101 detected by the motion detecting portion 102, and the data of the characteristic points Ai and the corresponding points Bi extracted by the correspondence relationship extracting portion 103, as described above (in a step S107). The plane calculating portion 105 assumes that the positions of the respective object points Ci, measured by the three-dimensional-position measuring portion 104, are present on the same plane, and calculates the equation of the plane which fits the respective object points Ci, using the least-squares method, based on the three-dimensional positions of the respective object points Ci (Xio, Yio, Zio) measured by the three-dimensional-position measuring portion 104 (in a step S108).

Based on the change of the orientation and the change of the position of the point of view of the image pickup portion 101 detected by the motion detecting portion 102 and the equation of the plane calculated by the plane calculating portion 105, the projection calculating portion 106 performs calculations so as to virtually project each image, picked up by the image pickup portion 101, on the same arbitrary virtual image plane Im, and synthesizes the respective images, picked up from the two points of view (in a step S109). Thereby, it is possible to prevent distortion from occurring in the thus-obtained image on the virtual image plane Im due to influence of translation operation of the image pickup portion 101 from the position at which the first image is picked up to the position at which the second image is picked up. Further, it is also possible to prevent the rotation of the image pickup portion 101, occurring when the image pickup portion 101 moves from the position at which the first image is picked up to the position at which the second image is picked up, from causing distortion in the image formed on the virtual image plane Im.

The adjusting portion 107 performs fine adjustment of the position, at which each image is to be projected, and the scale of each image to be projected, so that the cross-correlation value between the corresponding portions of the respective picked-up images, which portions are superimposed on the virtual image plane Im, is maximized when the respective images picked up by the image pickup portion 101 are projected on the virtual image plane Im, as described above (in a step S110). Thereby, the respective picked-up images can be appropriately superimposed, when these images are projected on the virtual image plane Im, without mis-alignment of these images. (In the example of FIGS. 16A, 16B, 16C and 18, as a result of the two images from the image planes Gn and Gn+1 being projected on the virtual image plane Im, the alphabet letter 'B' of the image from the image plane Gn can be accurately aligned with the alphabet letter 'B' of the image from the image plane Gn+1.) Thus, the two images can be accurately synthesized.

Figure 20:
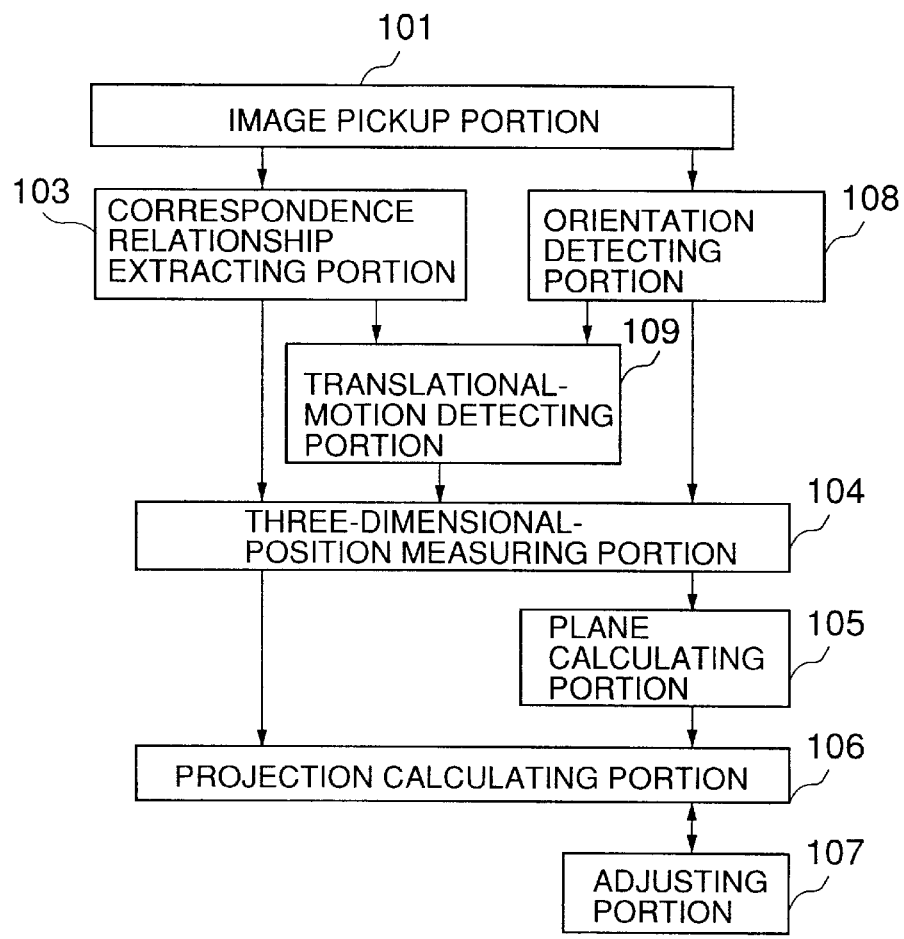
FIG. 20 shows a block diagram of a sixth embodiment of the present invention.

A case, as a sixth embodiment of the present invention, will now be described, where an image pickup apparatus includes, as shown in FIG. 20, the image pickup portion 101, an orientation detecting portion 108, the correspondence relationship extracting portion 103, a translational-motion detecting portion 109, the three-dimensional-position measuring portion 104, the plane calculating portion 105, the projection calculating portion 106 and the adjusting portion 107.

Figure 21:
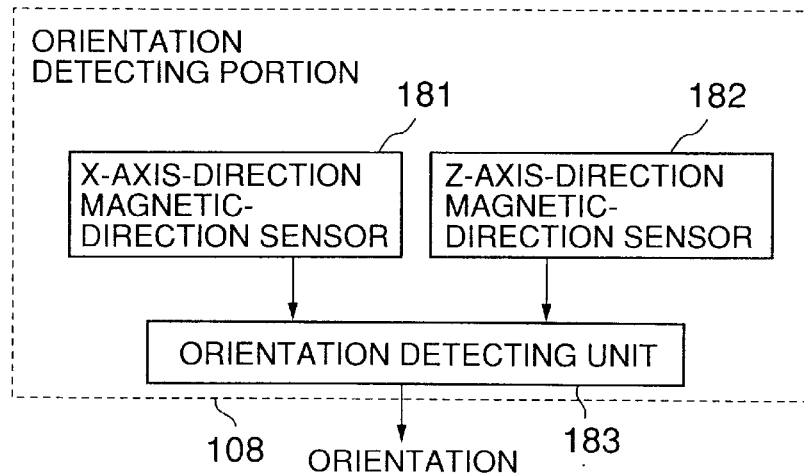
FIG. 21 shows an arrangement of an orientation detecting portion shown in FIG. 20.

The orientation detecting portion 108 includes, for example, as shown in FIG. 21, an x-axis-direction magnetic-direction sensor 181, a z-axis-direction magnetic-direction sensor 182 and an orientation detecting unit 183. The x-axis-direction magnetic-direction sensor 181 detects the magnetism in the x-axis direction, when the z axis extends perpendicular to the image plane of the image pickup portion 101 and the x axis extends in the lateral direction of the image plane of the image pickup portion 101, and outputs a signal expressing the detected magnetism. The z-axis-direction magnetic-direction sensor 182 detects the magnetism in the z-axis direction, when the z axis extends perpendicular to the image plane of the image pickup portion 101 and the x axis extends in the lateral direction of the image plane of the image pickup portion 101, and outputs a signal expressing the detected magnetism. The magnetism to be detected by the x-axis-direction magnetic-direction sensor 181 and the z-axis-direction magnetic-direction sensor 182 may be the terrestrial magnetism. Instead, the magnetism to be detected by the x-axis-direction magnetic-direction sensor 181 and the z-axis-direction magnetic-direction sensor 182 may be an artificially generated magnetic field. The orientation detecting unit 183 detects the orientation (angle) of the image pickup portion 101, in which the image pickup portion 101 picks up an image from a point of view, based on the signals output from the x-axis-direction magnetic-direction sensor 181 and the z-axis-direction magnetic-direction sensor 182.

Figure 22:
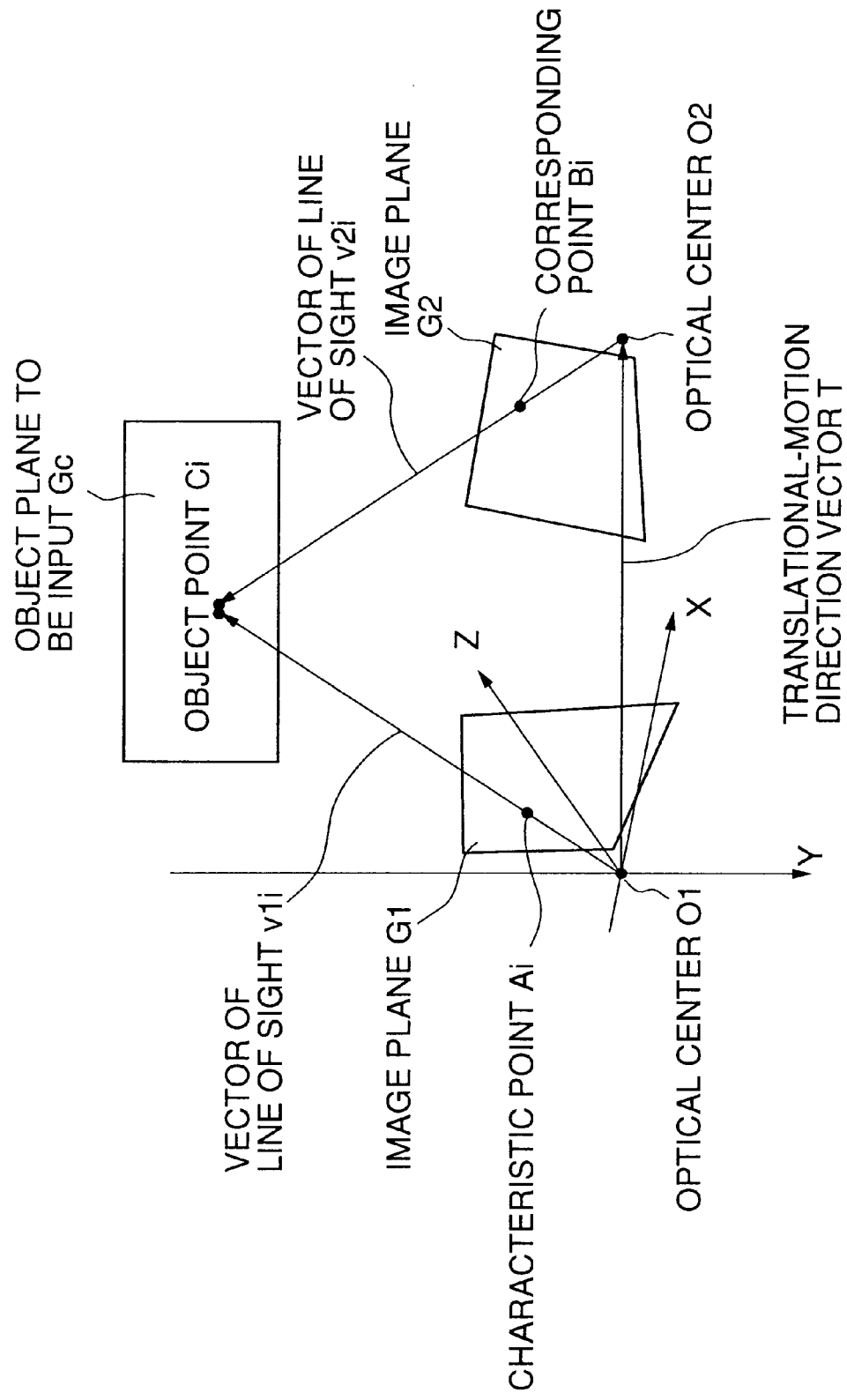
FIG. 22 illustrates a principle of calculating a translational-motion direction vector.

The translational-motion detecting portion 109 calculates a translational-motion-direction vector T based on the orientations of the image pickup portion 101 detected by the orientation detecting portion 108 and the data of the characteristic points Ai and the corresponding points Bi extracted by the corresponding relationship extracting portion 103. In order to calculate the translational-motion-direction vector T, for example, the translational-motion detecting portion 109 calculates the change of the orientation of the image pickup portion 101 using the orientation of the image pickup portion 101, in which the image pickup portion 101 picks up a first image, and the orientation of the image pickup portion 101, in which the image pickup portion 101 picks up a second image. Then, the translational-motion calculating portion 109 calculates the vectors of lines of sight v1$i$ passing through the characteristic points Ai, respectively, and the vectors of lines of sight v2$i$ passing through the corresponding points Bi, respectively, in the same coordinate system such as that shown in FIG. 22. Ideally, each scalar triple product of a respective one of the vectors of lines of sight v1$i$, a respective one of the vectors of lines of sight v2$i$ and the translational-motion-direction vector T is 0. Therefore, the translational-motion-direction vector T can be calculated as a vector T with which the sum of the scalar triple products for the respective object points Ci, calculated by the following expression, is minimized.

$$\sum_i \|(v1i \times T, v2i)\|$$

Thus, the translational-motion detecting portion 109 calculates the translational-motion-direction vector T.

The three-dimensional-position measuring portion 104 calculates the three-dimensional positions of the objective points Ci, respectively, on the objective plane to be input Gc, using the principle of triangulation, based on the orientations detected by the orientation detecting portion 108, the data of the characteristic points Ai and the corresponding points Bi extracted by the corresponding relationship extracting portion 103, and the translational-motion direction vector T detected by the translational-motion detection portion 109 for the object points Ci, respectively.

Figure 23:
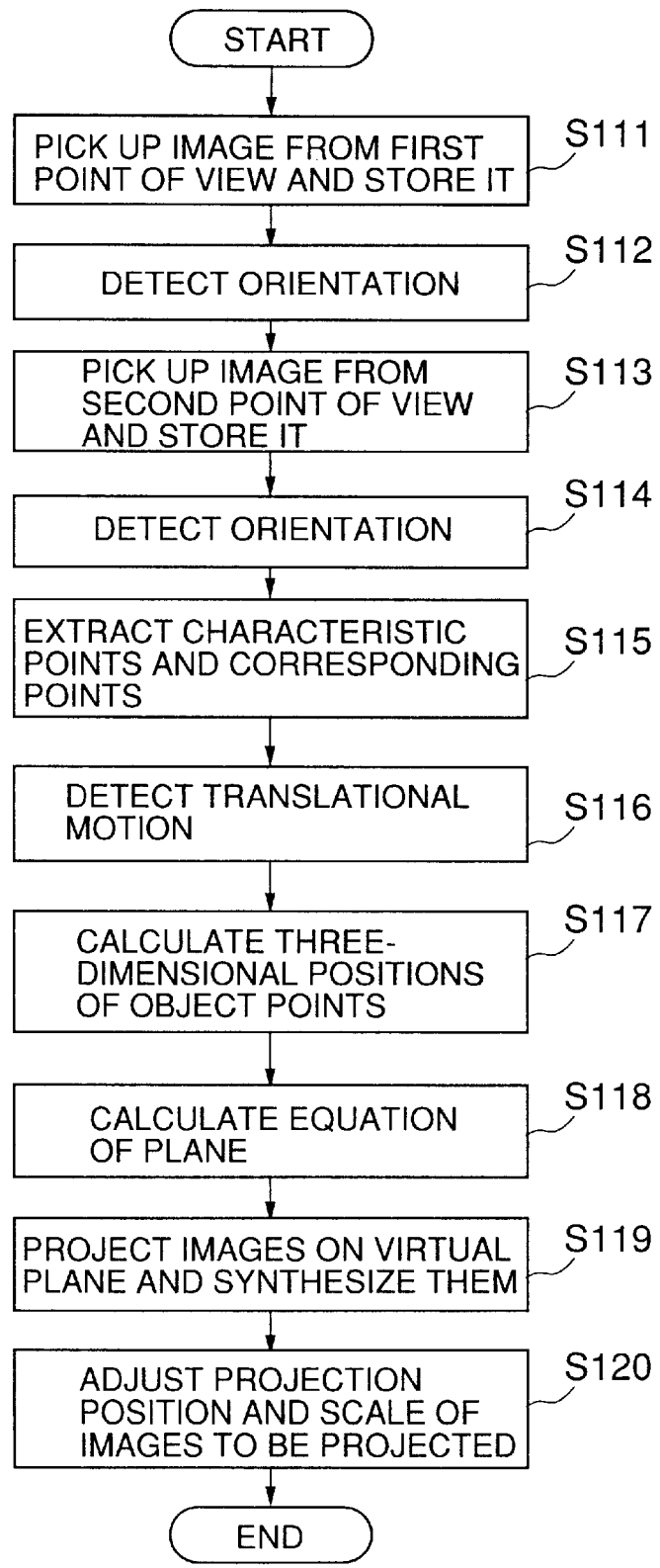
FIG. 23 shows a flowchart of operations of an image pickup apparatus in the sixth embodiment of the present invention.

Operations of the image pickup apparatus having the above-described arrangement will now be described with reference to FIG. 23.

As described above, the image pickup portion 101 picks up the first image of the object plane to be input Gc from the first point of view, and stores the thus-picked-up image in a storage device (in step S111). The orientation detecting portion 108 detects the orientation in which the image pickup portion 101 picks up the first image from the first point of view (in a step S112). Then, the image pickup portion 101 picks up the second image of the object plane to be input Gc from the second point of view after a user moves the image pickup portion 101 so that a portion of the first image corresponds to a portion of the second image. Then the thus-picked-up second image is stored in the storage device (in a step 113). Similarly to the case where the image pickup portion 101 picks up the first image from the first point of view, the orientation detecting portion 108 detects the orientation of the image pickup portion 101 in which the image pickup portion 101 picks up the second image from the second point of view, and also, detects the change of the orientation of the image pickup portion 101 between the time at which the image pickup portion 101 picks up the first image from the first point of view and the time at which the image pickup portion 101 picks up the second image from the second point of view (in a step S114). Thus, the first image and second image are picked up so that the portion of the second image corresponds to the portion of the first image. Further, the orientation of the image pickup portion 101 in which the image pickup portion 101 picks up the first image from the first pint of view and the orientation of the image pickup portion 101 in which the image pickup portion 101 picks up the second image from the second point of view are detected. Thereby, it is possible to easily detect the relationship between the respective images picked up by the image pickup portion 101, and also, it is possible to prevent the change of the orientation of the image pickup portion 101 from affecting an image to be formed as a result of the first and second images being synthesized.

The correspondence relationship extracting portion 103 extracts the characteristic points Ai (corresponding to the object points Ci on the object plane to be input Gc, respectively) from the first image, and extracts the corresponding points Bi from the second images, the corresponding points Bi corresponding to the characteristic points Ai, respectively (in a step 115). Thereby, the relationship between the first and second images can be detected. The translational-motion detecting portion 109 calculates the translational-motion direction vector T for the object points Ci, based on the orientations detected by the orientation detecting portion 108, and the characteristic points Ai and the corresponding points Bi extracted by the correspondence relationship extracting portion 103 (in a step S116). The three-dimensional-position measuring portion 104 calculates the three-dimensional positions (Xio, Yio, Zio) of the object points Ci on the objective plane to be input Gc, using the principle of triangulation, based on the orientations detected by the orientation detecting portion 108, the data of the characteristic points Ai and the corresponding points Bi extracted by the corresponding relationship extracting portion 103, and the translational-motion direction vector T detected by the translational-motion detection portion 109, for the object points Ci, respectively, as described above (in a step S117). The plane calculating portion 105 assumes that the positions of the object points Ci calculated by the three-dimensional-position measuring portion 104 are present on the same plane, and calculates the equation of the plane which fits the object points Ci, the positions of which are calculated by the three-dimensional-position measuring portion 104, respectively, using the least-square method, based on the three-dimensional positions (Xio, Yio, Zio) of the object points Ci calculated by the three-dimensional-position measuring portion 104 (in a step S118).

The projection calculating portion 106 performs a calculation so as to virtually project the respective images picked up by the image pickup portion 101 on the same arbitrary virtual image plane Im, based on the orientations detected by the orientation detecting portion 108, the translational-motion direction vector T detected by the translational-motion detecting portion 109 and the equation of the plane calculated by the plane calculating portion 105. Thus, the projection calculating portion 106 synthesizes the respective images, picked up from the two points of view, on the virtual image plane Im (in a step S119). Thereby, it is possible to prevent distortion from occurring in the thus-obtained image on the virtual image plane Im due to an influence of a translation operation of the image pickup portion 101 from the position at which the first image is picked up to the position at which the second image is picked up. Further, it is also possible to prevent the rotation of the image pickup portion 101, occurring when the image pickup portion 101 moves from the position at which the first image is picked up to the position at which the second image is picked up, from causing distortion in the image formed on the virtual image plane Im. The adjusting portion 107 performs fine adjustment of the position, at which each image is to be projected on the virtual image plane Im, and the scale of each image to be projected on the virtual image plane Im, so that the value of the cross-correlation between the portions of the respective picked-up images (first and second images), which portions correspond to each other, as mentioned above, and are superimposed on the virtual image plane Im, is maximized when the respective images picked up by the image pickup portion 101 are projected on the virtual image plane Im, as described above (in a step S120). Thereby, the respective picked-up images can be appropriately superimposed, when these images are projected on the virtual image plane Im, without mis-alignment of these images. (In the example of FIGS. 16A, 16B, 16C and 18, as a result of the two images from the image planes Gn and Gn+1 being projected on the virtual image plane Im, the alphabet letter 'B' of the image from the image plane Gn can be accurately aligned with the alphabet letter 'B' of the image from the image plane Gn+1.) Thus, the two images can be accurately synthesized.

In the sixth embodiment described above, the orientation detecting portion 108 includes the x-axis-direction magnetic-direction sensor 181, z-axis-direction magnetic-direction sensor 182 and orientation detecting unit 183. However it is also possible that the orientation detecting portion 108 further includes a y-axis-direction magnetic-direction sensor.

Figure 24:
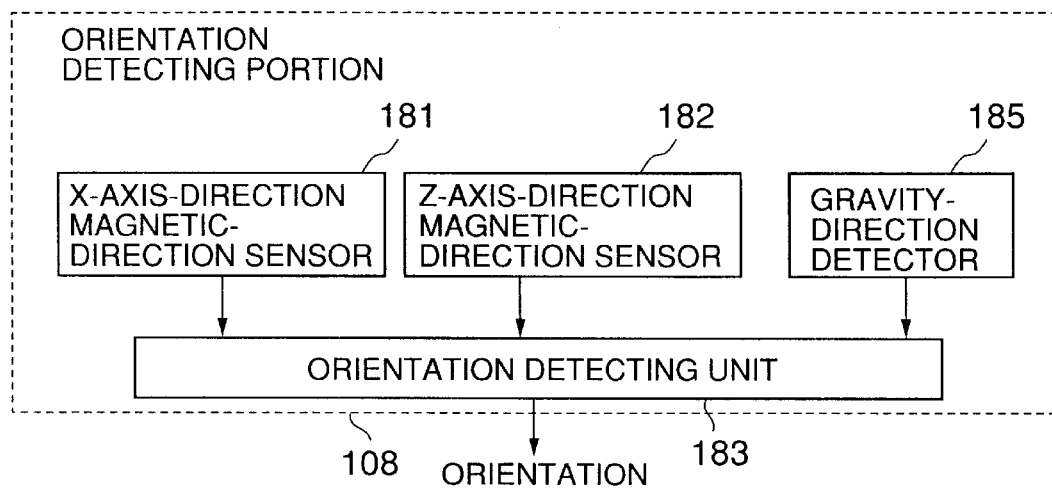
FIG. 24 shows an arrangement of the orientation detecting portion provided with a gravity-direction detector.

Further, it is advantageous that, as shown in FIG. 24, the orientation detecting portion 108 includes, for example, the x-axis-direction magnetic-direction sensor 181, the z-axis-direction magnetic-direction sensor 182, a gravity-direction detector 185 and the orientation detecting unit 183. The gravity-direction detector 185 may use, for example, acceleration sensors (not shown in the figures) for detecting the accelerations for the x axis, y axis and z axis, so as to detect the gravity direction. Instead, the gravity-direction detector 185 may use, for example, a level (a device for establishing a horizontal plane) so as to detect the gravity direction. In this arrangement, the orientation detecting portion 108 can detect the inclination of the image pickup portion 108 with respect to the gravity direction through the gravity-direction detector 185, and detect the rotation angle about the gravity direction through the x-axis-direction magnetic-direction sensor 181 and the z-axis-direction magnetic-direction sensor 182. As a result, it is possible to detect the orientations of the image pickup portion 101 with higher accuracy. The orientation detecting portion 108 detects the magnetism in the two-axis (x-axis and z-axis) directions through the arrangement shown in FIG. 24 as mentioned above. However, when the image pickup portion 101 inclines greatly, it is advantageous that the orientation detecting portion 108 has an arrangement in which the magnetism in the three-axis (x axis, y axis and z axis) directions is detected.

Figure 25:
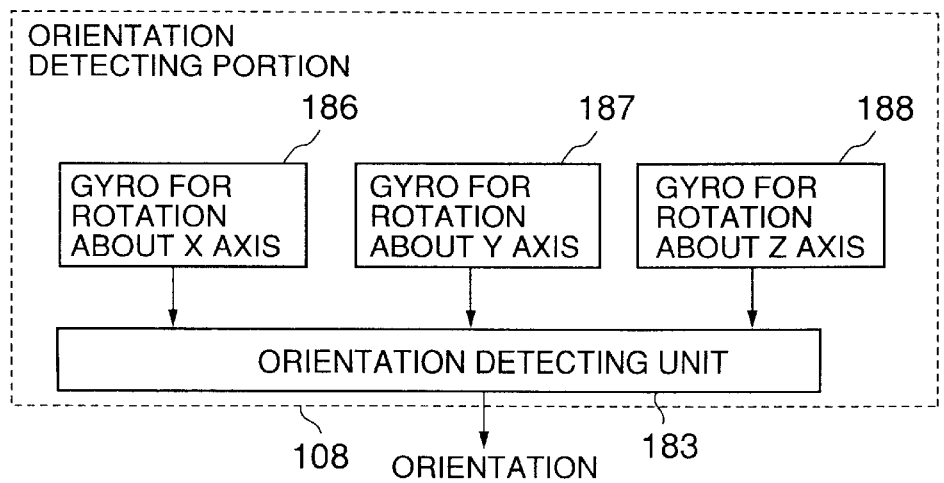
FIG. 25 shows an arrangement of the orientation detecting portion provided with gyros.

Instead, as shown in FIG. 25, the orientation detecting portion 108 may include, for example, a gyro for rotation about x axis 186, a gyro for rotation about y axis 187, and a gyro for rotation about z axis 188. The gyro for rotation about x axis 186 has a function as an angular-speed detecting portion which detects the rotation angular speed about the x axis, and outputs a signal expressing the detected rotation angular speed about the x axis. The gyro for rotation about y axis 187 has a function as an angular-speed detecting portion which detects the rotation angular speed about the y axis, and outputs a signal expressing the detected rotation angular speed about the y axis. The gyro for rotation about z axis 188 has a function as an angular-speed detecting portion which detects the rotation angular speed about the z axis, and outputs a signal expressing the detected rotation angular speed about the z axis. In this case, the orientation detecting unit 183 converts each of the signals output from the gyro for rotation about x axis 186, gyro for rotation about y axis 187 and gyro for rotation about z axis 188 into a digital signal and integrates the thus-obtained digital signals. Thus, the orientation detecting unit 183 detects the orientation of the image pickup portion 101. Thereby, even in a case where the orientation of the image pickup portion 101 is detected in a place in which the magnetism is unstable or it is difficult to detect the magnetism, it is possible to detect the orientations of the image pickup portion 101 precisely. In a case where one of the rotations about the x axis and z axis is negligible, it is possible that only the gyros for rotations for two axes are included in the orientation detecting portion 108. In a case where each of the rotations about the x axis and z axis is negligible, it is possible that only the gyro for rotation for one axes is included in the orientation detecting portion 108.

Each of the fifth and sixth embodiments has been described assuming that the images of the object plane to be input are picked up from the two points of view. However, the present invention can be applied to a case where images of an object plane to be input are picked up from more than two points of view. In such a case, for example, a right portion of a first picked-up image corresponds to a left portion of a secondly picked-up image, a right portion of the secondly picked-up image corresponds to a left portion of a thirdly picked-up image, . . . , and a right portion of an image, picked up immediately before a lastly picked-up image is picked up, corresponds to a left portion of the lastly picked-up image. In this case, characteristic points Ai are extracted from the right portion of the first picked-up image and corresponding points Bi are extracted from the left portion of the secondly picked-up image, characteristic points Ai are extracted from the right portion of the secondly picked-up image and corresponding points Bi are extracted from the left portion of the thirdly picked-up image, . . . , and characteristic points Ai are extracted from the right portion of the image, picked up immediately before the lastly picked-up image is picked up, and corresponding points Bi are extracted from the left portion of the lastly picked-up image.

The above-described calculations performed by the image pickup apparatus in each embodiment can be performed by a general-purpose computer that is specially configured by software executed therein to carry out these calculations.

Thus, according to the present invention, images of the object plane to be input are picked up from a plurality of points of view in a manner in which a portion of each image corresponds to a portion of another image. Then, the change of the orientation and the change of the position of the point of view of the image pickup portion when the images of the object plane to be input are picked up are detected. Then, the characteristic points, corresponding to the object points on the object plane to be input, respectively, are extracted from the previously picked-up image, and the corresponding points, corresponding to the characteristic points, respectively, are extracted from the currently picked-up image. Then, the three-dimensional positions of the object points are calculated, respectively, based on the change of the orientation and the change of the position of the point of view of the image pickup portion, and the data of the characteristic points and the corresponding points. Then, it is assumed that the thus-calculated positions of the object points are present on the same plane, and an equation of the plane which fits the calculated positions of the object points is calculated based on the calculated three-dimensional positions of the object points. Then, the picked-up images of the object plane to be input are virtually projected on the same arbitrary virtual image plane, based on the change of the orientation and the change of the position of the point of view of the image pickup portion, and the calculated equation of the plane. Thus, the images picked up from the plurality of points of view are synthesized. As a result, the influence of the change of the orientation can be removed, the images picked-up from the plurality of points of view can be precisely synthesized, and thus, the image of the entire object plane to be input can be obtained.

Further, as a result of the image of the entire object plane to be input being obtained as a result of the images picked up from the plurality of points of view being synthesized, the image of the entire object plane to be input can be obtained even when the object plane to be input cannot be moved and/or the object having the object plane to be input is large.

Further, according to another aspect of the present invention, the translational-motion direction vector for the object points is calculated based on the orientations of the image pickup portion and the data of the characteristic points and the corresponding points. Then, the three-dimensional positions of the respective object points are calculated based on the orientations of the image pickup portion, the data of the characteristic points and corresponding points, and the calculated translational-motion direction vector for the object points. Then, the respective picked-up images of the object plane to be input are virtually projected on the same arbitrary virtual image plane, based on the orientations of the image pickup portion, the calculated equation of the plane and the translational-motion direction vector for the object points. As a result, the influence of the change of the orientation of the image pickup portion can be removed, and the images picked up from the plurality of points of view can be synthesized further precisely.

Further, as a result of the magnetism in two-axis directions or three-axis directions orthogonal to one another being detected, the orientations of the image pickup portion, in which the respective images are picked up, can be detected easily and precisely.

Further, as a result of the gravity direction being detected and also the magnetism in two-axis directions or three-axis directions orthogonal to one another being detected, the orientations of the image pickup portion, in which the respective images are picked up, can be detected further precisely.

Further, as a result of the angular speeds about the two-axis directions or three-axis directions orthogonal to one another being detected, respectively, the orientations of the image pickup portion, in which the respective images are picked up, can be detected easily, even in a case where detection of the magnetism is difficult.

Further, as a result of fine adjustment of the position, at which each image is to be projected, and the scale of each image to be projected being performed so that the value of the cross-correlation between the corresponding portions of the respective picked-up images, which portions are superimposed on the virtual image plane, is maximized when the respective images picked up by the image pickup portion from the respective points of view are projected on the virtual image plane, it is possible to obtain a distortion-free, high-accuracy image of the entire object plane to be input.

The present invention is not limited to the above-described embodiments, and variations and modifications may be made without departing from the scope of the present invention.

The contents of the basic Japanese Patent Application No.9-144498, filed on May 20, 1997, No.9-237854, filed on Aug. 20, 1997 and No.9-303371, filed on Oct. 20, 1997, are hereby incorporated by reference.

What is claimed is:

1. A three-dimensional-position measuring method, comprising the steps of:
   a) inputting images of an object viewed from a plurality of points of view through image inputting means;
   b) detecting change of orientation of said image inputting means, occurring when said step a) is performed;
   c) detecting change of position of point of view, occurring when said step a) is performed;
   d) extracting characteristic points from the image which is input in said step a) previously, each of said characteristic points corresponding to a respective one of objects points on said object;
   e) extracting corresponding points from the image which is input in said step a) currently, each of said corresponding points corresponding to a respective one of said characteristic points; and
   d) calculating the three-dimensional position of each of said object points, based on the change of orientation and the change of position of point of view of said image inputting means and said characteristic points and said corresponding points.

2. A three-dimensional-position measuring apparatus, comprising:
   image inputting means for inputting images of an object viewed from a plurality of points of view;
   means for detecting change of orientation of said image inputting means, occurring when said image inputting means inputs the images viewed from the plurality of points of view;
   means for detecting change of position of point of view, occurring when said image inputting means inputs the images from the plurality of points of view;
   means for extracting characteristic points from the image which is input by said image inputting means previously, each of said characteristic points corresponding to a respective one of objects points on said object;
   means for extracting corresponding points from the image which is input by said image inputting means currently, each of said corresponding points corresponding to a respective one of said characteristic points; and
   means for calculating the three-dimensional position of each of said object points, based on the change of orientation and the change of position of point of view of said image inputting means and said characteristic points and said corresponding points.

3. A three-dimensional-position measuring apparatus, comprising:
   an image pickup portion which picks up images of an object from a plurality of points of view;
   a motion detecting portion which detects change of orientation of said image pickup portion occurring when said image pickup portion picks up the images from the plurality of points of view;
   said image detecting portion also detecting change of position of point of view occurring when said image pickup portion picks up the images from the plurality of points of view;
   a correspondence relationship extracting portion which extracts characteristic points from the image which is picked up by said image pickup portion previously, each of said characteristic points corresponding to a respective one of objects points on said object;
   said correspondence relationship extracting portion also extracting corresponding points from the image which is picked up by said image pickup portion currently, each of said corresponding points corresponding to a respective one of said characteristic points; and
   a three-dimensional-position calculating portion which calculates the three-dimensional position of each of said object points based on the change of orientation and the change of position of point of view of said image pickup portion and said characteristic points and said corresponding points.

4. A three-dimensional-shape measuring method, comprising the steps of:
   a) inputting images of an object to be measured viewed from different first and second points of view through image inputting means;
   b) extracting a plurality of characteristic points from the input image of said object viewed from the first point of view;
   c) extracting corresponding points from the input image of said object viewed from the second point of view, the corresponding points corresponding to the characteristic points, respectively;
   d) inputting the gravity direction with respect to the orientation of said image inputting means for each point of view from which said image inputting means views said object so as to input the image of said object;
   e) inputting the rotation angle about the gravity direction of said image inputting means for each point of view from which said image inputting means views said object so as to input the image of said object;
   f) detecting the orientation of said image inputting means, for each point of view from which said image inputting means views said object, so as to input the image of said object, using the gravity direction and the rotation angle about the gravity direction;

g) calculating vectors of lines of sight for the first and second points of view, respectively, the vectors of lines of sight passing through the characteristic points and corresponding points, respectively, using the characteristic points and corresponding points, and the orientations of said image inputting means;

h) calculating a translational-motion direction vector extending from said first point of view to said second point of view, using the vectors of lines of sight; and i) calculating the three-dimensional positions of object points on said object, using the translational-motion direction vector and the vectors of lines of sight, so as to obtain the three-dimensional shape of said object.

5. A three-dimensional-shape measuring method, comprising the steps of:

a) inputting images of an object to be measured viewed from different first and second points of view through image inputting means;

b) extracting a plurality of characteristic points from the input image viewed from the first point of view;

c) extracting corresponding points from the input image viewed from the second point of view, the corresponding points corresponding to the characteristic points, respectively;

d) inputting the gravity direction with respect to the orientation of said image inputting means for each point of view from which said image inputting means views said object, so as to input the image of said object;

e) inputting the rotation angle about the gravity direction of said image inputting means for each point of view from which said image inputting means views said object so as to input the image of said object;

f) detecting the orientation of said image inputting means, for each point of view from which said image inputting means views said object, so as to input the image of said object, using the gravity direction and the rotation angle about the gravity direction;

g) calculating vectors of lines of sight for the first and second points of view, respectively, the vectors of lines of sight passing through the characteristic points and corresponding points, respectively, using the characteristic points and corresponding points, and the orientations of said image inputting means;

h) calculating a translational-motion direction vector extending from said first point of view to said second point of view, using the vectors of lines of sight;

i) repeating correction of the positions of the corresponding points using the translational-motion direction vector, calculation of the vectors of lines of sight using the corrected positions of the corresponding points and calculation of the translational-motion direction vector using the calculated vectors of lines of sight, until the amount of change of the positions of the corresponding points when the positions of the corresponding points are corrected becomes less than a fixed value or the number of the repetitions reaches a fixed value; and j) calculating the three-dimensional positions of object points on said object, using the translational-motion direction vector and the vectors of lines of sight, finally obtained in said step i), so as to obtain the three-dimensional shape of said object.

6. A three-dimensional-shape measuring method, comprising the steps of:

a) inputting images of an object to be measured viewed from different first and second points of view through image inputting means;

b) extracting a plurality of characteristic points from the input image viewed from the first point of view;

c) extracting a plurality of candidates of each corresponding point from the input image viewed from the second point of view, each corresponding point corresponding to a respective one of the characteristic points;

d) inputting the gravity direction with respect to the orientation of said image inputting means for each point of view from which said image inputting means views said object so as to input the image of said object;

e) inputting the rotation angle about the gravity direction of said image inputting means for each point of view from which said image inputting means views said object so as to input the image of said object;

f) detecting the orientation of said image inputting means, for each point of view from which said image inputting means views said object, so as to input the image of said object, using the gravity direction and the rotation angle about the gravity direction;

g) calculating vectors of lines of sight for the first and second points of view, respectively, the vectors of lines of sight passing through the characteristic points and corresponding points, respectively, using the characteristic points and corresponding points, and the orientations of said image inputting means;

h) calculating a translational-motion direction vector extending from said first point of view to said second point of view, using the vectors of lines of sight;

i) repeating correction of the position of each corresponding point among the candidates using the translational-motion direction vector, calculation of the orientation of said image inputting means for the second point of view using the corrected corresponding points, calculation of the vectors of lines of sight for the second point of view using the thus-calculated orientation of said image inputting means and calculation of the translational-motion direction vector using the thus-calculated vectors of lines of sight for the second point of view and the vectors of lines of sight for the first point of view, until the amount of change of the positions of the corresponding points when the positions of the corresponding points are corrected becomes less than a fixed value or the number of the repetitions reaches a fixed value; and j) calculating the three-dimensional positions of object points on said object, using the translational-motion direction vector and the vectors of lines of sight finally obtained in said step i), so as to obtain the three-dimensional shape of said object to be measured.

7. A three-dimensional-shape measuring method, comprising the steps of:

a) inputting images of an object to be measured viewed from different first and second points of view through image inputting means;

b) extracting a plurality of characteristic points from the input image viewed from the first point of view;

c) extracting corresponding points from the input image viewed from the second point of view, the corresponding points corresponding to the characteristic points, respectively;

d) inputting the gravity direction with respect to the orientation of said image inputting means for each point of view from which said image inputting means views said object so as to input the image of said object;

e) inputting the rotation angle about the gravity direction of said image inputting means for each point of view from which said image inputting means views said object so as to input the image of said object;

f) detecting the orientation of said image inputting means, for each point of view from which said image inputting means views said object, so as to input the image of said object, using the gravity direction and the rotation angle about the gravity direction;

g) calculating vectors of lines of sight for the first and second points of view, respectively, the vectors of lines of sight passing through the characteristic points and corresponding points, respectively, using the characteristic points and corresponding points, and the orientations of said image inputting means;

h) calculating a translational-motion direction vector extending from said first point of view to said second point of view, using the vectors of lines of sight;

i) repeating detection of erroneous correspondences between characteristic points and corresponding points, respectively, using the translational-motion direction vector, removal of the characteristic points and the corresponding points, the correspondences therebetween having been determined to be erroneous, respectively, and calculation of the translational-motion direction vector using the remaining characteristic points and corresponding points, until it is determined that the translational-motion direction vector has converged; and j) calculating the three-dimensional positions of object points on said object, using the translational-motion direction vector and the vectors of lines of sight, finally obtained in said step i), so as to obtain the three-dimensional shape of said object to be measured.

8. A three-dimensional-shape measuring apparatus, comprising:

image inputting means for inputting images of an object to be measured viewed from different first and second points of view;

correspondence relationship extracting means for extracting a plurality of characteristic points from the input image viewed from the first point of view, said correspondence relationship extracting means also extracting corresponding points from the input image viewed from the second point of view, the corresponding points corresponding to the characteristic points, respectively;

gravity-direction detecting means for detecting the gravity direction with respect to the orientation of said image inputting means for each point of view from which said image inputting means views said object so as to input the image of said object;

means for detecting the rotation angle about the gravity direction of said image inputting means for each point of view from which said image inputting means views said object so as to input the image of said object;

orientation calculating means for calculating the orientation of said image inputting means, for each point of view from which said image inputting means views said object, so as to input the image of said object, using the gravity direction and the rotation angle about the gravity direction;

means for calculating vectors of lines of sight for the first and second points of view, respectively, the vectors of lines of sight passing through the characteristic points and corresponding points, respectively, using the characteristic points and corresponding points, and the orientations of said image inputting means;

translational-motion calculating means for calculating a translational-motion direction vector extending from said first point of view to said second point of view, using the vectors of lines of sight; and three-dimensional-position calculating means for calculating the three-dimensional positions of object points on said object, using the translational-motion direction vector and the vectors of lines of sight, so as to obtain the three-dimensional shape of said object.

9. The three-dimensional-shape measuring apparatus, according to claim 8, wherein said gravity-direction detecting means comprises three-axis acceleration sensors.

10. The three-dimensional-shape measuring apparatus, according to claim 8, wherein said gravity-direction detecting means detects the gravity direction using the input images.

11. The three-dimensional-shape measuring apparatus, according to claim 8, wherein said means for detecting the rotation angle about the gravity direction comprises magnetism sensors.

12. The three-dimensional-shape measuring apparatus, according to claim 8, wherein said means for detecting the rotation angle about the gravity direction comprises magnetism sensors and the gravity-direction detecting means.

13. The three-dimensional-shape measuring apparatus, according to claim 8, wherein:

said correspondence relationship extracting means further calculates the values of weights for the respective characteristic points and corresponding points; and said translational-motion calculating means calculates the translational-motion direction vector in consideration of the values of the weights for the respective characteristic points and corresponding points.

14. A three-dimensional-shape measuring apparatus, comprising:

image inputting means for inputting images of an object to be measured viewed from different first and second points of view;

correspondence relationship extracting means for extracting a plurality of characteristic points from the input image viewed from the first point of view, said correspondence relationship extracting means also extracting corresponding points from the input image viewed from the second point of view, the corresponding points corresponding to the characteristic points, respectively;

gravity-direction detecting means for detecting the gravity direction with respect to the orientation of said image inputting means for each point of view from which said image inputting means views said object so as to input the image of said object;

means for inputting the rotation angle about the gravity direction of said image inputting means for each point of view from which said image inputting means views said object so as to input the image of said object;

orientation calculating means for calculating the orientation of said image inputting means, for each point of view from which said image inputting means views said object, so as to input the image of said object, using the gravity direction and the rotation angle about the gravity direction;

means for calculating vectors of lines of sight for the first and second points of view, respectively, the vectors of lines of sight passing through the characteristic points and corresponding points, respectively, using the characteristic points and corresponding points, and the orientations of said image inputting means;

translational-motion calculating means for calculating a translational-motion direction vector extending from said first point of view to said second point of view, using the vectors of lines of sight, said means for calculating vectors of lines of sight correcting the positions of the corresponding points using the translational-motion direction vector, and calculating the vectors of lines of sight using thus-corrected positions of the corresponding points;

convergence-signal generating means for generating a convergence signal when the amount of change of the positions of the corresponding points when the positions of the corresponding points are corrected becomes less than a fixed value or the number of repetitions reaches a fixed value during the repetitions of correction of the positions of the corresponding points using the translational-motion direction vector, calculation of the vectors of lines of sight using the corrected positions of the corresponding points and calculation of the translational-motion direction vector using the thus-calculated vectors of lines of sight; and three-dimensional-position calculating means for calculating the three-dimensional positions of object points on said object, using the translational-motion direction vector and the vectors of lines of sight, obtained when said convergence-signal generating means generates the convergence signal, so as to obtain the three-dimensional shape of said object to be measured.

15. The three-dimensional-shape measuring apparatus, according to claim 14, wherein said convergence-signal generating means generates the convergence signal when the amount of the change of the translational-motion direction vector comes to be less than a fixed value during the repetitive calculation of the translational-motion direction vector.

16. The three-dimensional-shape measuring apparatus, according to claim 14, wherein said gravity-direction detecting means comprises three-axis acceleration sensors.

17. The three-dimensional-shape measuring apparatus, according to claim 14, wherein said gravity-direction detecting means detects the gravity direction using the input images.

18. The three-dimensional-shape measuring apparatus, according to claim 14, wherein said means for detecting the rotation angle about the gravity direction comprises magnetism sensors.

19. The three-dimensional-shape measuring apparatus, according to claim 14, wherein said means for detecting the rotation angle about the gravity direction comprises magnetism sensors and the gravity-direction detecting means.

20. The three-dimensional-shape measuring apparatus, according to claim 14, wherein:

said correspondence relationship extracting means further calculates the values of weights for the respective characteristic points and corresponding points; and said translational-motion calculating means calculates the translational-motion direction vector in consideration of the values of the weights for the respective characteristic points and corresponding points.

21. A three-dimensional-shape measuring apparatus, comprising:

image inputting means for inputting images of an object to be measured viewed from different first and second points of view;

correspondence relationship extracting means for extracting a plurality of characteristic points from the input image viewed from the first point of view, said correspondence relationship extracting means also extracting a plurality of candidates of each corresponding point from the input image viewed from the second point of view, each corresponding point corresponding to a respective one of the characteristic points;

gravity-direction detecting means for detecting the gravity direction with respect to the orientation of said image inputting means for each point of view from which said image inputting means views said object so as to input the image of said object;

means for detecting the rotation angle about the gravity direction of said image inputting means for each point of view from which said image inputting means views said object so as to input the image of said object;

orientation calculating means for calculating the orientation of said image inputting means, for each point of view from which said image inputting means views said object, so as to input the image of said object, using the gravity direction and the rotation angle about the gravity direction;

means for calculating vectors of lines of sight for the first and second points of view, respectively, the vectors of lines of sight passing through the characteristic points and corresponding points, respectively, using the characteristic points and corresponding points, and the orientations of said image inputting means;

translational-motion calculating means for calculating a translational-motion direction vector extending from said first point of view to said second point of view, using the vectors of lines of sight, said means for calculating vectors of lines of sight correcting each corresponding point among the candidates thereof using the translational-motion direction vector and calculating the vectors of lines of sight using the corrected corresponding points and the characteristic points;

convergence-signal generating means for generating a convergence signal when the amount of change of the positions of the corresponding points when the positions of the corresponding points are corrected becomes less than a fixed value or the number of repetitions reaches a fixed value during the repetitions of correction of the positions of the corresponding points using the translational-motion direction vector, calculation of the orientation of said image inputting means for the second point of view using the corrected corresponding points, calculation of the vectors of lines of sight for the second point of view using the thus-calculated orientation of said image inputting means and calculation of the translational-motion direction vector using the thus-calculated vectors of lines of sight for the second point of view and the vectors of lines of sight for the first point of view; and three-dimensional-point calculating means for calculating the three-dimensional positions of object points on said object, using the translational-motion direction vector and the vectors of lines of sight obtained when said convergence-signal generating means generates the convergence signal, so as to obtain the three-dimensional shape of said object.

22. The three-dimensional-shape measuring apparatus, according to claim 21, wherein said convergence-signal generating means generates the convergence signal when the amount of the change of the translational-motion direction vector comes to be less than a fixed value during the repetitive calculation of the translational-motion direction vector.

23. The three-dimensional-shape measuring apparatus according to claim 21, wherein said convergence-signal generating means detects the convergence of the translational-motion direction vector using an error curve which expresses the changes of the translational-motion direction vector T during the repetitive calculation of the translational-motion direction vector.

24. The three-dimensional-shape measuring apparatus, according to claim 21, wherein said gravity-direction detecting means comprises three-axis acceleration sensors.

25. The three-dimensional-shape measuring apparatus, according to claim 21, wherein said gravity-direction detecting means detects the gravity direction using the input images.

26. The three-dimensional-shape measuring apparatus, according to claim 21, wherein said means for detecting the rotation angle about the gravity direction comprises magnetism sensors.

27. The three-dimensional-shape measuring apparatus, according to claim 21, wherein said means for detecting the rotation angle about the gravity direction comprises magnetism sensors and the gravity-direction detecting means.

28. The three-dimensional-shape measuring apparatus, according to claim 21, wherein:
said correspondence relationship extracting means further calculates the values of weights for the respective characteristic points and corresponding points; and
said translational-motion calculating means calculates the translational-motion direction vector in consideration of the values of the weights for the respective characteristic points and corresponding points.

29. A three-dimensional-shape measuring apparatus, comprising:
image inputting means for inputting images of an object to be measured viewed from different first and second points of view;
correspondence relationship extracting means for extracting a plurality of characteristic points from the input image viewed from the first point of view,
said correspondence relationship extracting means also extracting corresponding points from the input image viewed from the second point of view, the corresponding points corresponding to the characteristic points, respectively;
gravity-direction detecting means for detecting the gravity direction with respect to the orientation of said image inputting means for each point of view from which said image inputting means views said object so as to input the image of said object;
means for detecting the rotation angle about the gravity direction of said image inputting means for each point of view from which said image inputting means views said object so as to input the image of said object;
orientation calculating means for calculating the orientation of said image inputting means, for each point of view from which said image inputting means views said object, so as to input the image of said object, using the gravity direction and the rotation angle about the gravity direction;
means for calculating vectors of lines of sight for the first and second points of view, respectively, the vectors of lines of sight passing through the characteristic points and corresponding points, respectively, using the characteristic points and corresponding points, and the orientations of said image inputting means;
translational-motion calculating means for calculating a translational-motion direction vector extending from said first point of view to said second point of view, using the vectors of lines of sight;
erroneous correspondence detecting means for detecting erroneous correspondences between characteristic points and corresponding points, respectively, using the translational-motion direction vector;
erroneous correspondence removing means for removing of the characteristic points and the corresponding points, the correspondences therebetween having been determined to be erroneous, respectively;
convergence-signal generating means for generating a convergence signal when it is determined that the translational-motion direction vector has converged during repetitions of the detection of the erroneous correspondences between characteristic points and corresponding points, respectively, using the translational-motion direction vector, the removal of the characteristic points and the corresponding points, the correspondences therebetween having been determined to be erroneous, respectively, and the calculation of the translational-motion direction vector using the remaining characteristic points and corresponding points; and
three-dimensional-position calculating means for calculating the three-dimensional positions of object points on said object, using the translational-motion direction vector and the vectors of lines of sight, obtained when the convergence signal is generated, so as to obtain the three-dimensional shape of said object.

30. The three-dimensional-shape measuring apparatus according to claim 29, wherein said convergence-signal generating means detects the convergence of the translational-motion direction vector using an error curve which expresses the changes of the translational-motion direction vector T during the repetitive calculation of the translational-motion direction vector.

31. The three-dimensional-shape measuring apparatus, according to claim 29, wherein said gravity-direction detecting means comprises three-axis acceleration sensors.

32. The three-dimensional-shape measuring apparatus, according to claim 29, wherein said gravity-direction detecting means detects the gravity direction using the input images.

33. The three-dimensional-shape measuring apparatus, according to claim 29, wherein said means for detecting the rotation angle about the gravity direction comprises magnetism sensors.

34. The three-dimensional-shape measuring apparatus, according to claim 29; wherein said means for detecting the rotation angle about the gravity direction comprises magnetism sensors and the gravity-direction detecting means.

35. The three-dimensional-shape measuring apparatus, according to claim 29, wherein:
said correspondence relationship extracting means further calculates the values of weights for the respective characteristic points and corresponding points; and
said translational-motion calculating means calculates the translational-motion direction vector in consideration of the values of the weights for the respective characteristic points and corresponding points.

36. A three-dimensional-shape measuring apparatus, comprising:

an image pickup portion which picks up images of an object to be measured from different first and second points of view;

a correspondence relationship extracting portion which extracts a plurality of characteristic points from the image picked-up from the first point of view, said correspondence relationship extracting portion also extracting corresponding points from the image picked up from the second point of view, the corresponding points corresponding to the characteristic points, respectively;

a gravity-direction detecting portion which detects the gravity direction with respect to the orientation of said image pickup portion for each point of view from which said image pickup portion picks up the image of said object;

a portion for detecting rotation angles about the gravity direction which detects the rotation angle about the gravity direction of said image pickup portion for each point of view from which said image pickup portion picks up the image of said object;

an orientation calculating portion which calculates the orientation of said image pickup portion, for each point of view from which said image pickup portion picks up the image of said object, using the gravity direction and the rotation angle about the gravity direction;

a portion for calculating vectors of lines of sight which calculates vectors of lines of sight for the first and second points of view, respectively, the vectors of lines of sight passing through the characteristic points and corresponding points, respectively, using the characteristic points and corresponding points, and the orientations of said image pickup portion;

a translational-motion calculating portion which calculates a translational-motion direction vector extending from said first point of view to said second point of view, using the vectors of lines of sight; and a three-dimensional-position calculating portion which calculates the three-dimensional positions of object points on said object, using the translational-motion direction vector and the vectors of lines of sight, so as to obtain the three-dimensional shape of said object.

37. A three-dimensional-shape measuring apparatus, comprising:

an image pickup portion which picks up images of an object to be measured from different first and second points of view;

a correspondence relationship extracting means for extracting a plurality of characteristic points from the image picked up from the first point of view, said correspondence relationship extracting portion also extracting corresponding points from the image picked up from the second point of view, the corresponding points corresponding to the characteristic points, respectively;

a gravity-direction detecting portion which detects the gravity direction with respect to the orientation of said image pickup portion for each point of view from which said image pickup portion picks up the image of said object;

a portion for detecting rotation angles about the gravity direction which detects the rotation angle of said image pickup portion about the gravity direction for each point of view from which said image pickup portion picks up the image of said object;

an orientation calculating portion which calculates the orientation of said image pickup portion, for each point of view from which said image pickup portion picks up the image of said object, using the gravity direction and the rotation angle about the gravity direction;

a portion for calculating vectors of lines of sight which calculates vectors of lines of sight for the first and second points of view, respectively, the vectors of lines of sight passing through the characteristic points and corresponding points, respectively, using the characteristic points and corresponding points, and the orientations of said image pickup portion;

a translational-motion calculating portion which calculates a translational-motion direction vector extending from said first point of view to said second point of view, using the vectors of lines of sight, said portion for calculating vectors of lines of sight correcting the positions of the corresponding points using the translational-motion direction vector, and calculating the vectors of lines of sight using thus-corrected positions of the corresponding points;

a convergence-signal generating portion which generates a convergence signal when the amount of change of the positions of the corresponding points when the positions of the corresponding points are corrected becomes less than a fixed value or the number of repetitions reaches a fixed value during the repetitions of correction of the positions of the corresponding points using the translational-motion direction vector, calculation of the vectors of lines of sight using the corrected positions of the corresponding points and calculation of the translational-motion direction vector using the thus-calculated vectors of lines of sight; and a three-dimensional-position calculating portion which calculates the three-dimensional positions of object points on said object, using the translational-motion direction vector and the vectors of lines of sight, obtained when said convergence-signal generating means generates the convergence signal, so as to obtain the three-dimensional shape of said object to be measured.

38. A three-dimensional-shape measuring apparatus, comprising:

an image pickup portion which picks up images of an object to be measured from different first and second points of view;

a correspondence relationship extracting portion which extracts a plurality of characteristic points from the image picked up from the first point of view;

said correspondence relationship extracting portion also extracting a plurality of candidates of each corresponding point from the image picked up from the second point of view, each corresponding point corresponding to a respective one of the characteristic points;

a gravity-direction detecting portion which detects the gravity direction with respect to the orientation of said image pickup portion for each point of view from which said image pickup portion picks up the image of said object;

a portion for detecting rotation angles about the gravity direction which detects the rotation angle of said image pickup portion about the gravity direction for each point of view from which said image pickup portion picks up the image of said object;

an orientation calculating portion which calculates the orientation of said image pickup portion, for each point of view from which said image pickup portion picks up the image of said object, using the gravity direction and the rotation angle about the gravity direction;

a portion for calculating vectors of lines of sight which calculates vectors of lines of sight for the first and second points of view, respectively, the vectors of lines of sight passing through the characteristic points and corresponding points, respectively, using the characteristic points and corresponding points, and the orientations of said image pickup portion;

a translational-motion calculating portion which calculates a translational-motion direction vector extending from said first point of view to said second point of view, using the vectors of lines of sight;

said portion for calculating vectors of lines of sight correcting each corresponding point among the candidates thereof using the translational-motion direction vector and calculating the vectors of lines of sight using the data of the corrected corresponding points and the characteristic points;

a convergence-signal generating portion which generates a convergence signal when the amount of change of the positions of the corresponding points when the positions of the corresponding points are corrected becomes less than a fixed value or the number of repetitions reaches a fixed value during the repetitions of correction of the positions of the corresponding points using the translational-motion direction vector, calculation of the orientation of said image pickup portion for the second point of view using the data of the corrected corresponding points, calculation of the vectors of lines of sight for the second point of view using the thus-calculated orientation of said image pickup portion and calculation of the translational-motion direction vector using the thus-calculated vectors of lines of sight for the second point of view and the vectors of lines of sight for the first point of view; and a three-dimensional-point calculating portion which calculates the three-dimensional positions of object points on said object, using the translational-motion direction vector and the vectors of lines of sight obtained when said convergence-signal generating means generates the convergence signal, so as to obtain the three-dimensional shape of said object.

39. A three-dimensional-shape measuring apparatus, comprising:

an image pickup portion which picks up images of an object to be measured from different first and second points of view;

a correspondence relationship extracting portion which extracts a plurality of characteristic points from the image picked up from the first point of view;

said correspondence relationship extracting portion also extracting corresponding points from the image picked up from the second point of view, the corresponding points corresponding to the characteristic points, respectively;

a gravity-direction detecting portion which detects the gravity direction with respect to the orientation of said image pickup portion for each point of view from which said image pickup portion picks up the image of said object;

a portion for detecting rotation angles about the gravity direction which detects the rotation angle of said image pickup portion for each point of view from which said image pickup portion picks up the image of said object;

an orientation calculating portion which calculates the orientation of said image pickup portion, for each point of view from which said image pickup portion picks up the image of said object, using the gravity direction and the rotation angle about the gravity direction;

a portion for calculating vectors of lines of sight which calculates vectors of lines of sight for the first and second points of view, respectively, the vectors of lines of sight passing through the characteristic points and corresponding points, respectively, using the characteristic points and corresponding points, and the orientations of said image pickup portion;

a translational-motion calculating portion which calculates a translational-motion direction vector extending from said first point of view to said second point of view, using the vectors of lines of sight;

an erroneous correspondence detecting portion which detects erroneous correspondences between characteristic points and corresponding points, respectively, using the translational-motion direction vector;

an erroneous correspondence removing portion which removes the characteristic points and the corresponding points, the correspondences therebetween having been determined to be erroneous, respectively;

a convergence-signal generating portion which generates a convergence signal when it is determined that the translational-motion direction vector has converged during repetitions of the detection of the erroneous correspondences between characteristic points and corresponding points, respectively, using the translational-motion direction vector, the removal of the characteristic points and the corresponding points, the correspondences therebetween being determined to be erroneous, respectively, and the calculation of the translational-motion direction vector using the remaining characteristic points and corresponding points; and a three-dimensional-position calculating portion which calculates the three-dimensional positions of object points on said object, using the translational-motion direction vector and the vectors of lines of sight, obtained when the convergence signal is generated, so as to obtain the three-dimensional shape of said object.

40. An image pickup apparatus, comprising:

an image pickup portion which picks up images of an object plane to be input from a plurality of points of view in a manner in which a portion of each picked-up image corresponds to a portion of another picked-up image;

a motion detecting portion which detects change of the orientation and change of the position of point of view of said image pickup portion, occurring when said image pickup portion picks up the images of said object plane from the respective points of view;

a correspondence relationship extracting portion which extracts characteristic points from one of the picked-up images, the characteristic points corresponding to object points on said object plane, respectively, said corresponding relationship extracting portion also extracting corresponding points from another one of the picked-up images, which is picked up immediately after said one of the picked-up images from which the characteristic points are extracted is picked up, the corresponding points corresponding to the characteristic points, respectively;

a three-dimensional-position measuring portion which calculates the three-dimensional positions of the object points, based on the detected change of the orientation, the detected change of the position of point of view, the data of the extracted characteristic points and corresponding points;

a plane calculating portion which assumes that the calculated positions of the object points are present on the same plane and calculates an equation of the plane which fits the calculated positions of the object points, based on the calculated three-dimensional positions of the object points;

a projection calculating portion which performs a calculation so as to virtually project the respective images picked up by said image pickup portion on the same arbitrary virtual image plane so as to synthesize the respective images picked up from the plurality of points of view on the virtual image plane, based on the detected change of the orientation and the detected change of the position of the point of view, and the calculated equation of the plane.

41. The image pickup apparatus, according to claim 40, further comprising an adjusting portion which performs fine adjustment of the position, at which each picked-up image is to be projected, and the scale of each picked-up image to be projected, in a manner in which the cross-correlation value between the corresponding portions of the respective picked-up images, which portions are superimposed on the virtual image plane, is maximized when the respective images picked up by said image pickup portion are projected on the virtual image plane.

42. An image pickup apparatus, comprising:

an image pickup portion which picks up images of an object plane to be input from a plurality of points of view in a manner in which a portion of each picked-up image corresponds to a portion of another picked-up image;

an orientation detecting portion which detects the orientation of said image pickup portion, in which said image pickup portion picks up the image of said object plane from each point of view;

a correspondence relationship extracting portion which extracts characteristic points from one of the picked-up images, the characteristic points corresponding to object points on said object plane, respectively, said corresponding relationship extracting portion also extracting corresponding points from another one of the picked-up images, which is picked up immediately after said one of the picked-up images from which the characteristic points are extracted is picked up, the corresponding points corresponding to the characteristic points, respectively;

a translational-motion detecting portion which detects a translational-motion direction vector for the respective object points, based on the detected orientations, and the extracted characteristic points and corresponding points;

a three-dimensional-position measuring portion which calculates the three-dimensional positions of the respective object points, based on the detected orientations, the data of the extracted characteristic points and corresponding points, and the detected translational-motion direction vector;

a plane calculating portion which assumes that the calculated positions of the object points are present on the same plane and calculates an equation of the plane which fits the calculated positions of the object points, based on the calculated three-dimensional positions of the object points;

a projection calculating portion which performs a calculation so as to virtually project the respective images picked up by said image pickup portion on the same arbitrary virtual image plane so as to synthesize the respective images picked up from the plurality of points of view on the virtual image plane, based on the detected orientations, the detected translational-motion direction vector, and the calculated equation of the plane.

43. The image pickup apparatus, according to claim 42, wherein said orientation detecting portion is provided with a magnetism detecting portion which detects magnetism in one of two-axis directions and three-axis directions, orthogonal to each other.

44. The image pickup apparatus, according to claim 42, wherein said orientation detecting portion is provided with a magnetism detecting portion which detects the magnetism in one of two-axis directions and three-axis directions, orthogonal to each other, and a gravity-direction detecting portion which detects the gravity direction.

45. The image pickup apparatus, according to claim 42, wherein said orientation detecting portion is provided with an angular-speed detecting portion which detects the rotation angular speeds of said image pickup portion about one of two-axis directions and three-axis directions, orthogonal to each other, respectively.

46. The image pickup apparatus, according to claim 42, further comprising an adjusting portion which performs fine adjustment of the position, at which each picked-up image is to be projected, and the scale of each picked-up image to be projected, in a manner in which the cross-correlation value between the corresponding portions of the respective picked-up images, which portions are superimposed on the virtual image plane, is maximized when the respective images picked up by said image pickup portion are projected on the virtual image plane.

47. An image inputting apparatus, comprising:

image inputting means for inputting images of an object plane to be input viewed from a plurality of points of view in a manner in which a portion of each input image corresponds to a portion of another input image;

motion detecting means for detecting change of the orientation and change of the position of point of view of said image inputting means, occurring when said image inputting means inputs the images of said object plane viewed from the respective points of view;

correspondence relationship extracting means for extracting characteristic points from one of the input images, the characteristic points corresponding to object points on said object plane, respectively, said corresponding relationship extracting means also extracting corresponding points from another one of the input images, which is input immediately after said one of the input images from which the characteristic points are extracted is input, the corresponding points corresponding to the characteristic points, respectively;

three-dimensional-position measuring means for calculating the three-dimensional positions of the object points, based on the detected change of the orientation, the detected change of the position of point of view, the data of the extracted characteristic points and corresponding points;

plane calculating means for assuming that the calculated positions of the object points are present on the same plane and calculating an equation of the plane which fits the calculated positions of the object points, based on the calculated three-dimensional positions of the object points;

projection calculating means for performing a calculation so as to virtually project the respective images input by said image inputting means on the same arbitrary virtual image plane so as to synthesize the respective images, viewed from the plurality of points of view, so as to be input, on the virtual image plane, based on the detected change of the orientation and the detected change of the position of the point of view, and the calculated equation of the plane.

48. The image inputting apparatus, according to claim 47, further comprising adjusting means for performing fine adjustment of the position, at which each input image is to be projected, and the scale of each input image to be projected, in a manner in which the cross-correlation value between the corresponding portions of the respective input images, which portions are superimposed on the virtual image plane, is maximized when the respective images input by said image inputting means are projected on the virtual image plane.

49. An image inputting apparatus, comprising:

image inputting means for inputting images of an object plane to be input viewed from a plurality of points of view in a manner in which a portion of each input image corresponds to a portion of another input image;

orientation detecting means for detecting the orientation of said image inputting means, in which said image inputting means inputs the image of said object plane viewed from each point of view;

correspondence relationship extracting means for extracting characteristic points from one of the input images, the characteristic points corresponding to object points on said object plane, respectively, said corresponding relationship extracting means also extracting corresponding points from another one of the input images, which is input immediately after said one of the picked-up images from which the characteristic points are extracted is input, the corresponding points corresponding to the characteristic points, respectively;

translational-motion detecting means for detecting a translational-motion direction vector for the respective object points, based on the detected orientations, and the extracted characteristic points and corresponding points;

three-dimensional-position measuring means for calculating the three-dimensional positions of the respective object points, based on the detected orientations, the extracted characteristic points and corresponding points, and the detected translational-motion direction vector;

plane calculating means for assuming that the calculated positions of the object points are present on the same plane and calculating an equation of the plane which fits the calculated positions of the object points, based on the calculated three-dimensional positions of the object points;

projection calculating means for performing a calculation so as to virtually project the respective images input by said image inputting means on the same arbitrary virtual image plane so as to synthesize the respective images, viewed from the plurality of points of view so as to be input, on the virtual image plane, based on the detected orientations, the detected translational-motion direction vector, and the calculated equation of the plane.

50. The image inputting apparatus, according to claim 49, further comprising adjusting means for performing fine adjustment of the position, at which each input image is to be projected, and the scale of each input image to be projected, in a manner in which the cross-correlation value between the corresponding portions of the respective input images, which portions are superimposed on the virtual image plane, is maximized when the respective images input by said image inputting means are projected on the virtual image plane.

51. An image inputting method, comprising the steps of:

a) inputting images of an object plane to be input viewed from a plurality of points of view in a manner in which a portion of each input image corresponds to a portion of another input image;

b) detecting change of the orientation and change of the position of point of view, occurring when said step a) is performed;

c) extracting characteristic points from one of the input images, the characteristic points corresponding to object points on said object plane, respectively;

d) extracting corresponding points from another one of the input images, which is input immediately after said one of the input images from which the characteristic points are extracted is input, the corresponding points corresponding to the characteristic points, respectively;

e) calculating the three-dimensional positions of the object points, based on the detected change of the orientation, the detected change of the position of point of view, the extracted characteristic points and corresponding points;

f) assuming that the calculated positions of the object points are present on the same plane and calculating an equation of the plane which fits the calculated positions of the object points, based on the calculated three-dimensional positions of the object points; and g) performing a calculation so as to virtually project the respective images input in said step a) on the same arbitrary virtual image plane so as to synthesize the respective images, viewed from the plurality of points of view, so as to be input, on the virtual image plane, based on the detected change of the orientation and the detected change of the position of the point of view, and the calculated equation of the plane.

52. The image inputting method, according to claim 51, further comprising the step h) performing fine adjustment of the position, at which each input image is to be projected, and the scale of each input image to be projected, in a manner in which the cross-correlation value between the corresponding portions of the respective input images, which portions are superimposed on the virtual image plane, is maximized when the respective images input in said step a) are projected on the virtual image plane.

53. An image inputting method, comprising the steps of:

a) inputting images of an object plane to be input viewed from a plurality of points of view in a manner in which a portion of each input image corresponds to a portion of another input image;

b) detecting the orientations, in which said step a) is performed;

c) extracting characteristic points from one of the input images, the characteristic points corresponding to object points on said object plane, respectively;

d) extracting corresponding points from another one of the input images, which is input immediately after said one of the picked-up images from which the characteristic points are extracted is input, the corresponding points corresponding to the characteristic points, respectively;

e) detecting a translational-motion direction vector for the respective object points, based on the detected orientations, and the data of the extracted characteristic points and corresponding points;

f) calculating the three-dimensional positions of the respective object points, based on the detected orientations, the extracted characteristic points and corresponding points, and the detected translational-motion direction vector;

g) assuming that the calculated positions of the object points are present on the same plane and calculating an equation of the plane which fits the calculated positions of the object points, based on the calculated three-dimensional positions of the object points;

h) performing a calculation so as to virtually project the respective images input in said step a) on the same arbitrary virtual image plane so as to synthesize the respective images, viewed from the plurality of points of view, so as to be input, on the virtual image plane, based on the detected orientations, the detected translational-motion direction vector, and the calculated equation of the plane.

54. The image inputting method, according to claim 53, further comprising the step i) performing fine adjustment of the position, at which each input image is to be projected, and the scale of each input image to be projected, in a manner in which the cross-correlation value between the corresponding portions of the respective input images, which portions are superimposed on the virtual image plane, is maximized when the respective images input in said step a) are projected on the virtual image plane.

* * * * *